(12) United States Patent
Inoue et al.

(10) Patent No.: US 7,103,663 B2
(45) Date of Patent: Sep. 5, 2006

(54) LICENSE MANAGEMENT SERVER, LICENSE MANAGEMENT SYSTEM AND USAGE RESTRICTION METHOD

(75) Inventors: Mitsuhiro Inoue, Osaka (JP); Ryuichi Okamoto, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 793 days.

(21) Appl. No.: 10/164,574

(22) Filed: Jun. 10, 2002

(65) Prior Publication Data
US 2003/0005135 A1   Jan. 2, 2003

(30) Foreign Application Priority Data
Jun. 11, 2001   (JP)   .............................. 2001-175138

(51) Int. Cl.
*G06F 15/16*   (2006.01)
(52) U.S. Cl. ...................................... 709/225
(58) Field of Classification Search ................ 709/225, 709/203, 219, 218
See application file for complete search history.

(56) References Cited

U.S. PATENT DOCUMENTS

| | | | |
|---|---|---|---|
| 4,554,584 A | | 11/1985 | Elam et al. |
| 5,706,507 A | | 1/1998 | Schloss |
| 5,915,067 A | | 6/1999 | Nonomura et al. |
| 5,969,748 A | | 10/1999 | Casement et al. |
| 6,037,934 A | * | 3/2000 | Himmel et al. ............. 715/760 |
| 6,041,360 A | * | 3/2000 | Himmel et al. ............. 709/245 |
| 6,211,871 B1 | * | 4/2001 | Himmel et al. ............. 715/744 |
| 6,226,618 B1 | | 5/2001 | Downs et al. |
| 6,286,001 B1 | * | 9/2001 | Walker et al. ................. 707/9 |
| 6,505,300 B1 | * | 1/2003 | Chan et al. ................. 713/164 |
| 6,934,753 B1 | * | 8/2005 | Kim ........................... 709/225 |

FOREIGN PATENT DOCUMENTS

| | | |
|---|---|---|
| EP | 0 715 247 | 6/1996 |
| WO | 99/44361 | 9/1999 |
| WO | 00/04707 | 1/2000 |
| WO | 01/04727 | 1/2001 |

\* cited by examiner

*Primary Examiner*—David Y. Eng
(74) *Attorney, Agent, or Firm*—Wenderoth, Lind & Ponack, L.L.P.

(57) ABSTRACT

A right management server manages usage of a content on a parent terminal and a child terminal. The right management server includes content usage right database that stores right information indicating a usage rule of a content for each terminal ID or user ID, and a parental control information management unit that acquires, from the parent terminal or the parent user, parental control information that is an instruction to put a restriction on usage of a content on the child terminal or by a child user, and stores the parental control information in a parental control information database. The right management server also includes a license ticket generation unit that acquires a license ticket issuance request from the child terminal or the child user, generates a license ticket that is information for permitting usage of the content on the child terminal or by the child user, under a usage rule with a restriction indicated by the parental control information which is held in the parental control information management unit, and sends the license ticket to the child terminal or the child user.

38 Claims, 27 Drawing Sheets

Fig.2A

| | | |
|---|---|---|
| header | user information header size | 201 |
| | user ID | 202 |
| | user information data size | 203 |
| user information data | name | 211 |
| | zip code | 212 |
| | address | 213 |
| | telephone number | 214 |
| | e-mail address | 215 |
| | ... | 216 |
| | authentication user ID | 217 |
| | password | 218 |
| | credit card number | 219 |
| | | 210 |

Fig.2B — 200

| | |
|---|---|
| xxxxx | 202 |
| USO800 | 203 |
| xxxxx | 211 |
| Nagaharu Edogawa | 212 |
| 5718501 | 213 |
| Kadomatsu-cho 1006, Kadomatsu-shi | 214 |
| 083581101 | 215 |
| nagaharu@ndrm.jp | 216 |
| ... | |
| DRM27439 | 217 |
| NA*I*SHO | 218 |
| 4901690091946374 | 219 |

Fig. 3

| user ID | terminal ID | terminal name | |
|---|---|---|---|
| US0800 | PAP111<br>PAL222 | PANET-V3<br>PANAPANA1 | |
| US0817 | PAN333 | PANAPANA1 | |
| US0871 | PAL444 | PANANA-L | |
| ⋮ | ⋮ | ⋮ | |

Fig.4

| user ID | right information ID | details of right information |
|---|---|---|
| US0800 | 10000001 | |
| US0817 | 10000002 | |
| US0871 | 10000003 | |
| ... | 10000006 | |
| | ... | |

203 — user ID column
403 — right information ID column
right information 400

| | Field | # | Value |
|---|---|---|---|
| right information header (401) | right information header size | 402 | XXXXXX |
| | right information ID | 403 | 10000003 |
| | effective period start time | 404 | 200205010900 |
| | effective period end time | 405 | 200304300900 |
| | moving permission flag | 406 | 0 |
| | issuable LT number | 407 | 10 |
| | LT issuing terminal ID | 408 | PAN333 |
| | action information number | 409 | 1 |
| action information #1 (410) | action information size | 411 | XXXXXX |
| | action ID | 412 | View01 |
| | longest usage duration | 413 | 180 |
| | one-time decision threshold·number counter/cumulative usage time | 414 | 1, —·—/1800 |
| | plug-in rule #1 | 415 | — |
| | ⋮ | | ⋮ |
| | plug-in rule #n | 415 | — |
| ⋮ | ⋮ | | ⋮ |
| action information #n (410) | | | — |
| content group information (420) | content group ID | 423 | VANI0805 "Animation: Planet of the Cats" series |
| | content number | 421 | 10 |
| | content ID #1 | 422 | VANI08050(#1) "Animation: Planet of the Cats" Vol. 1 |
| | ⋮ | | ⋮ |
| | content ID #n | 422 | VANI08059(#10) "Animation: Planet of the Cats" Vol. 10 |

Fig.6

| authentication information (authentication userID/password) | terminal ID 301 | right information ID 403 | parental control information 600 ||||| 
| --- | --- | --- | --- | --- | --- | --- | --- |
| 610 | | | usage period restriction start time 601 | usage period restriction end time 602 | usage number restriction 603 | continuous usage duration restriction 604 | cumulative usage time restriction 605 |
| DRM27439/ NA*I*SHO | PAN333 | 10000003 | 200207200900 | 200208311900 | — | 60 | — |
| DRM27439/ NA*I*SHO | PAL444 | 10000006 | — | — | — | — | — |
| ... | ... | ... | ... | ... | ... | ... | ... |

Fig. 7A

| terminal ID (301) | right information ID (403) | parental control information (600) |
|---|---|---|
|  |  |  |
|  |  |  |

Fig. 7B

| user ID (203) | right information ID (403) | parental control information (600) |
|---|---|---|
|  |  |  |
|  |  |  |

Fig. 7C

| terminal ID (301) | parental control information (600) |
|---|---|
|  |  |
|  |  |

Fig. 7D

| user ID (203) | parental control information (600) |
|---|---|
|  |  |
|  |  |

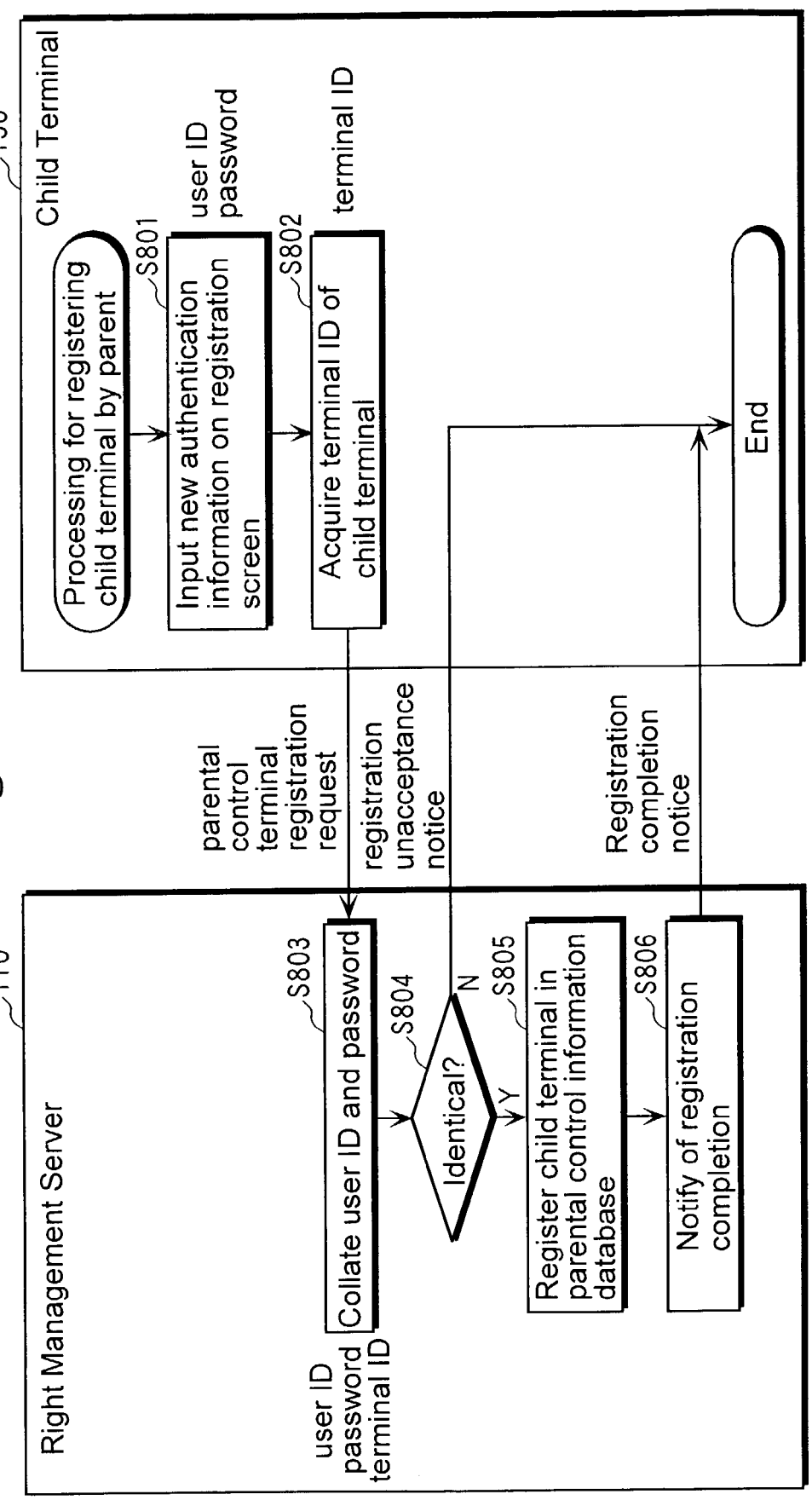

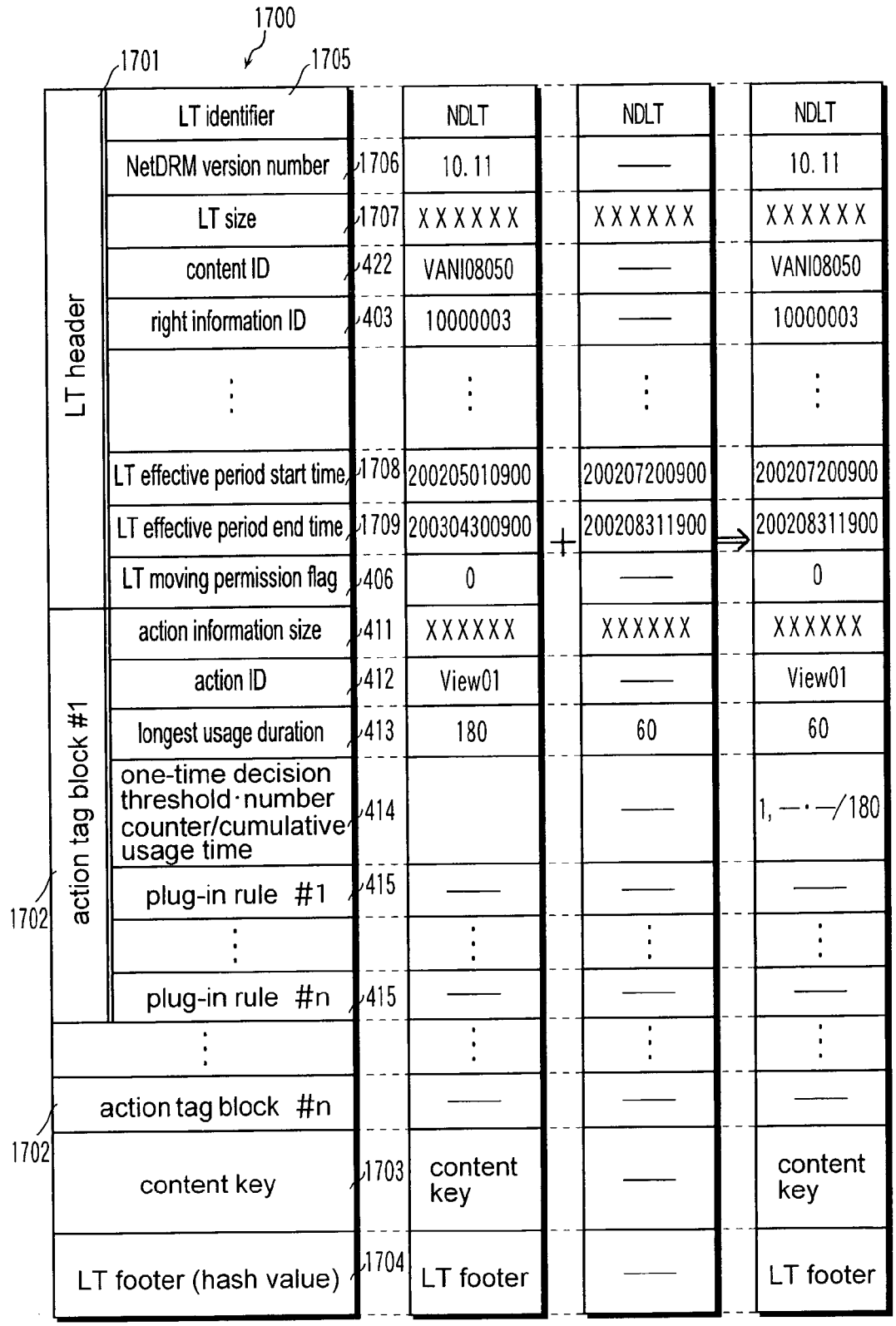

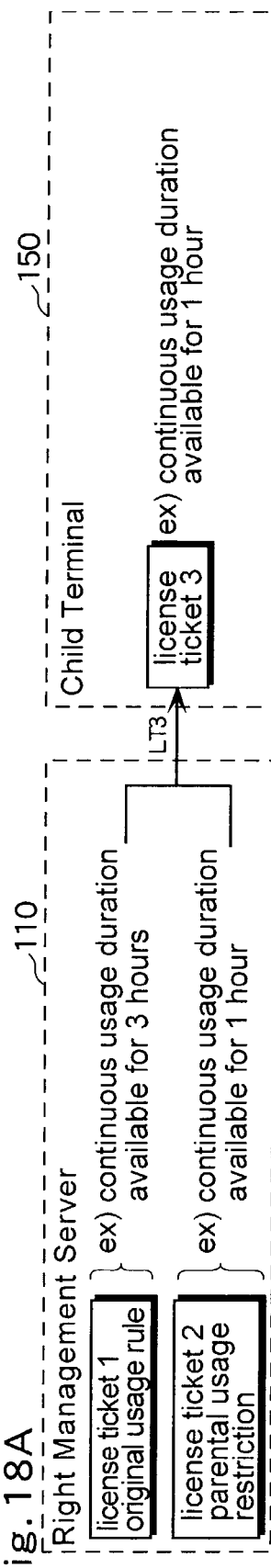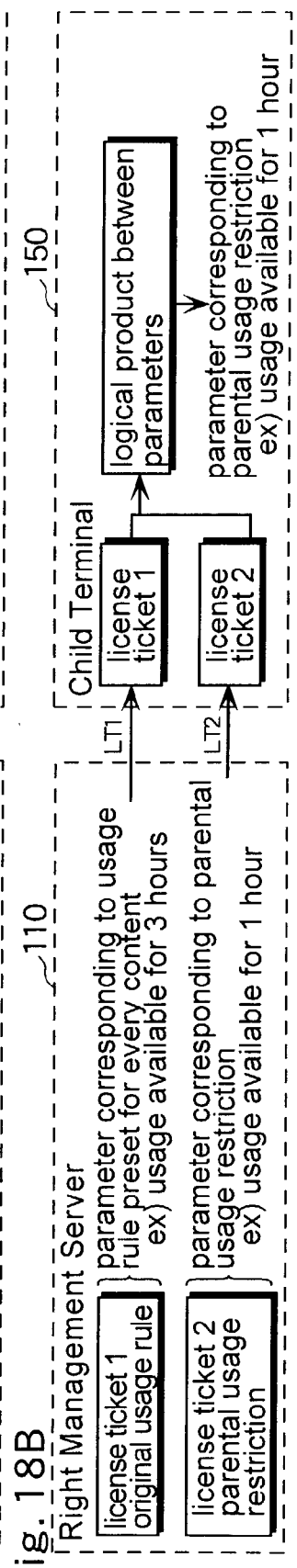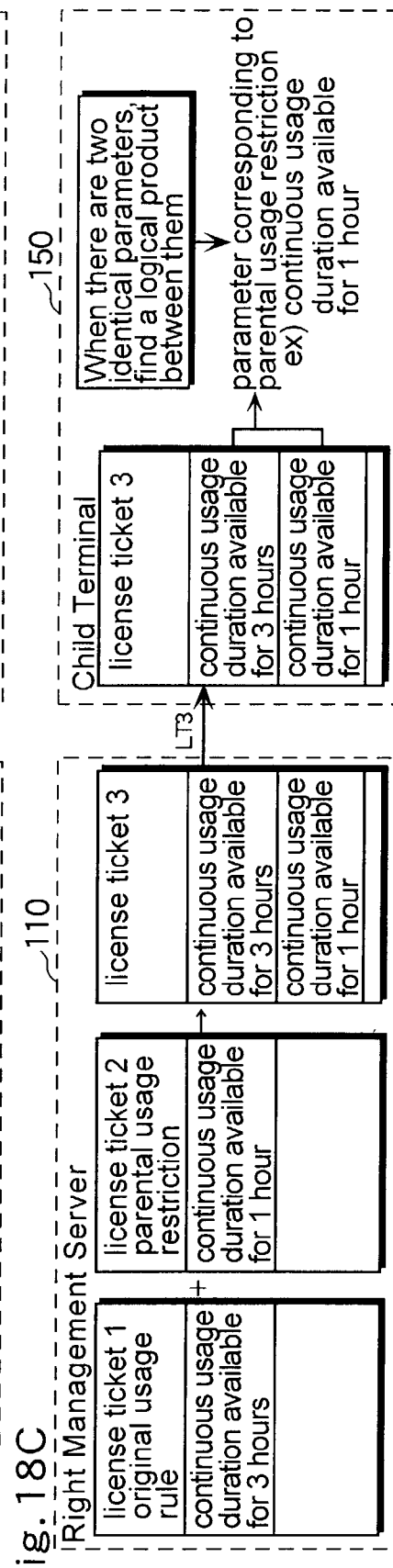

Fig.23 temporary usage restriction 2300

| terminal ID 301 | temporary user's ID 2310 | right owner user's ID 2311 | right information ID 403 | right expiration date 2303 | terminal operation restriction 2301 | terminal registration expiration date 2302 |
|---|---|---|---|---|---|---|
| PAN2 | US0086 | US0450 | 101 102 | 20020506 | LT issuance request only | 20020506 |
| PAN2 | US0086 | US0086 | 103 104 | — | LT issuance request only | 20020506 |
| ... | ... | ... | ... | ... | ... | ... |

LICENSE MANAGEMENT SERVER, LICENSE MANAGEMENT SYSTEM AND USAGE RESTRICTION METHOD

BACKGROUND OF THE INVENTION

(1) Field of the Invention

The present invention relates to a license management system in which a license management server centrally manages usage of a content on a terminal device. Particularly, it relates to a parental control system in which a parent sets a usage restriction on a child's usage of a content in the home and a temporary usage restriction system in which a restriction is set on usage of a content by a temporary user who uses the content using another's terminal device temporarily.

(2) Description of the Related Art

In recent years, since people of all ages have been able to view and enjoy contents such as TV and radio programs, videos, CDs (compact discs) and comic books easily on their personal computers or the like in their homes, children have had increasing opportunities to view adult or violent scenes in these pictures. So, in these homes, consideration is required to preventing the children from viewing these inappropriate scenes included in the pictures so that they do not have a bad influence on the children's mental development. It is a parental control system that gains the spotlight from this viewpoint.

In the conventional content distribution system, schemes to prevent the selling of an adult content to an underage user by checking the user's age in purchasing the content or regarding the user who offers to purchase the content by a credit card as an adult. Also, as for a DVD (digital versatile disc) video, parental control codes represented as numbers of 1~8 are preset on a DVD disc for sale, and a parent presets the code indicating a rating level of the video that can be reproduced on a reproduction device in his home.

And, when the code value set on the reproduction device is smaller than that of the DVD disc, the DVD video cannot be reproduced on the reproduction device. For example, when the parental control code of the DVD disc is 3 and the code of the reproduction device is 2, the DVD video cannot be reproduced on the reproduction device. Since a 4-digit password is necessary to change the code of the reproduction device, a child cannot change the code by himself.

However, most of these conventional systems control the reproduction device only to reproduce or not to reproduce a content, and cannot put detailed restrictions such as the restriction on a usage duration or a usage number of the content. There is also a problem that although only a violent scene can be cut out of a DVD video, a parent cannot set restriction rules and details individually such as which scene should be cut out or how a rating level of a parental control code should be set. All he can do is put restrictions under the predetermined rules.

SUMMARY OF THE INVENTION

Accordingly, the present invention is available to solve these problems, and it is the object of the present invention to provide a license management system and a usage restriction control method that allow a parent of each home to set usage restrictions suitable for a development of each child who uses a content using more multi-aspect methodology.

The license management server device according to the present invention manages content usage on a terminal device, and comprises: a license information storage unit operable to store license information indicating a usage rule of a content for each terminal device or user; a usage restriction information management unit operable to acquire from a first terminal device or a first user an instruction to put a restriction on content usage on a second terminal device or by a second user, and usage restriction information indicating details of the restriction, and hold the usage restriction information; and a ticket issuance unit operable to acquire an instruction to request the content usage from the second terminal device or the second user, generate a license ticket that is information for permitting the content usage on the second terminal device or by the second user, under a usage rule with the restriction indicated by the usage restriction information which is held in the usage restriction information management unit, and send the license ticket to the second terminal device or the second user.

When an ordinary server puts a restriction on content usage by a child based on common sense, irrespective of a parent's request, or a content producing company presets a usage restriction on the content for the child, the restriction is apt to be one-sided or uniform. On the other hand, since the license management server device of the present invention centrally manages the content usage in the content distribution system, it allows the child to use the content using the license ticket with a restriction indicated by parental control information which is requested from the first terminal device or the first user, the parent of the child. Therefore, there is an effect that the first user can put various restrictions on the content usage of the second user, his child, in accordance with the child's development. Also, the first user prepares the parental control information for each child, and thereby, he can put various usage restrictions in accordance with the development of each child of the family, individually.

Furthermore, according to the license management server device of the present invention, if the first terminal device is identical to the second terminal device, the first user, the original user, of the first terminal device (or the second terminal device) can put many different restrictions for each of the second users who are permitted to use the first terminal device (or the second terminal device) temporarily. In other words, there is an effect that the first user can put a variety of usage restrictions depending upon the relationship between the first user and the second user.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2A is a diagram that shows a sample of a data structure of user information stored in a user database as shown in FIG. 1.

FIG. 2B is a diagram that shows the user information of Mr. "Nagaharu Edogawa," a parent user of the parental control system, as an actual example.

FIG. 3 is a block diagram that shows a sample of a data structure of terminal information stored in a terminal information database as shown in FIG. 1.

FIG. 4 is a diagram that shows how to store right information in a content usage right database as shown in FIG. 1.

FIG. 5A is a diagram that shows a sample of a data structure of the right information in the content usage right database as shown in FIG. 4.

FIG. 5B is a diagram that shows the right information of an right information ID "10000003" owned by a user "Konatsu Edogawa" of a user ID "USO817" as an actual example.

FIG. 6 is a diagram that shows a sample of a data structure of parental control information stored in a parental control information database as shown in FIG. 1.

FIG. 7A is a diagram that shows another sample of how to store the parental control information in the parental control information database as shown in FIG. 1.

FIG. 7B is a diagram that shows further another sample of how to store the parental control information in the parental control information database as shown in FIG. 1.

FIG. 7C is a diagram that shows further another sample of how to store the parental control information in the parental control information database as shown in FIG. 1.

FIG. 7D is a diagram that shows further another sample of how to store the parental control information in the parental control information database as shown in FIG. 1.

FIG. 8 is a flow chart that shows a processing procedure executed when the parent user "Nagaharu Edogawa" registers a child terminal in the parental control information database.

FIG. 17A is a diagram that shows a sample of a data structure of a license ticket which is generated by a license ticket generation unit.

FIG. 17B is a diagram that shows a license ticket 1 which is generated in response to the license ticket issuance request from the child terminal (with the terminal ID "PAN333") as an actual example.

FIG. 17C is a diagram that shows a license ticket 2 which is generated under the parental usage restrictions which is set on the child terminal (with the terminal ID "PAN333") as an actual example.

FIG. 17D is a diagram that shows a license ticket 3 which is generated by integrating the license ticket 1 and the license ticket 2.

FIG. 18A is a diagram that shows a sample of a license ticket issuance method to the child terminal under the parental control.

FIG. 18B is a diagram that shows another sample of the license ticket issuance method to the child terminal under the parental control.

FIG. 18C is a diagram that shows further another sample of the license ticket issuance method to the child terminal under the parental control.

FIG. 23 is a diagram that shows a sample of a data structure of a temporary usage restriction stored in a temporary usage restriction database as shown in FIG. 22.

DESCRIPTION OF THE PREFERRED EMBODIMENTS

The First Embodiment

The first embodiment of the present invention will be explained in detail below with reference to the figures.

Figure 1:
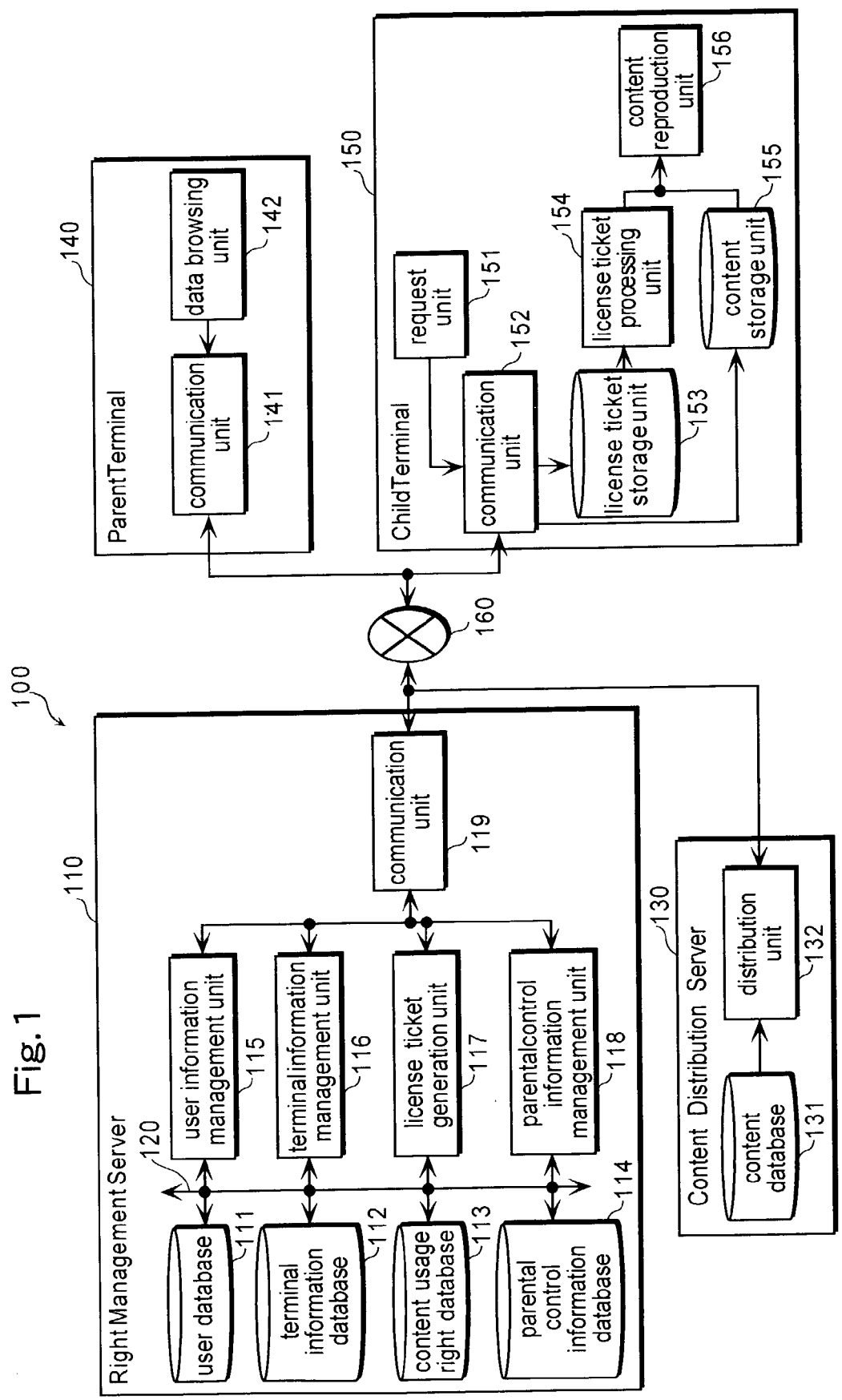
FIG. 1 is a block diagram that shows a structure of a parental control system according to the first embodiment of the present invention.

FIG. 1 is a block diagram that shows the structure of the parental control system according to the first embodiment of the present invention. In a content distribution system using NetDRM (Network Digital Rights Management), a license management system in which a right management server centrally controls licensing of a content such as music, a video, a game, a book, a printing material or a composite of these, (hereinafter referred to as a NetDRM content distribution system), the right management server puts restrictions on a usage range of the content distributed to a child, in response to a request by a user (the child's parent), in order to prevent ill effect on the child's mental development, and thereby, the parental control system 100 is realized. The parental control system 100 includes a right management server 110, a content distribution server 130, a parent terminal 140, a child terminal 150 and a communication network 160. Here, the parent terminal 140 is exclusively used by a parent, and the child terminal 150 is exclusively used by a child. The communication network 160 connects the content distribution server 130, the right management server 110, the parent terminal 140 and the child terminal 150 with each other at a high speed in security via the Internet or the like by ADSL (Asymmetric Digital Subscriber Line) that is a broadband high-speed public network and SSL (Secure Sockets Layer).

The right management server 110 issues a license ticket that is information for allowing a user to use a content in response to a license ticket issuance request from the user. Furthermore, the right management server 110 is a computer system that adds usage restrictions set by a parent request to the license ticket to issue it in response to the license ticket issuance request from a child user. The license ticket, which is issued in response to the license ticket issuance request from the user who purchases the content, is the information including mainly a content key for decrypting the content and a content usage rule for licensing the content for a requested usage duration or usage number in every use of the content within a range of a content usage right purchased by the user. Also, the license ticket issuance request is a command for requesting issuance of the license ticket, and usually includes an ID of a terminal which makes the request, an ID of a content which the user of the terminal wants to reproduce, and his desired usage rule indicating how long or how many times the user wants to use the content. The right management server 110 roughly includes four databases such as hard disks (a user database 111, a terminal information database 112, a content usage right database 113 and a parental control information database 114), five processing units which are realized by a program or the like (a user information management unit 115, a terminal information management unit 116, a license ticket generation unit 117, a parental control information management unit 118 and a communication unit 119).

The user database 111 stores personal information of a user per user of the parental control system 100. The terminal information database 112 stores terminal information indicating the user who uses the terminal and the information on the terminal per terminal registered in the right management server 110. The content usage right database 113 roughly stores right information and a content key. The right information is prepared per user who purchases the content usage right, and further is the information describing the content usage rule of each user in each predetermined content group. Also, the content key is a decryption key for decrypting each content which is encrypted at the time of distribution. The parental control information database 114 stores parental control information indicating usage restrictions which a parent requests to set for a content use by a child user per child terminal 150 which is registered in the parental control information database 114 in advance. The user information management unit 115, in the parental control terminal registration processing and the parental usage restriction setting processing, searches user information using a user ID for the parent's authentication and a password included in each of the request, examines whether the user information describing the authentication user ID and the password exist in the user database 111, and if they exist, authenticates the user who owns the legitimate right. Further, the user information management unit 115 collates the credit card number of the child user corresponding to the terminal ID which is appended to the parental control terminal registration request with the credit card number in the user information of the parent user including the authentication user ID and the password so as to confirm the parent-child relationship. Furthermore, the user information management unit 115 usually registers the personal information which is inputted when the user purchases the content usage right in the user database 111, and updates the user information by adding information to, deleting information from, or modifying the registered user information so as to manage it. When the communication unit 119 receives various requests except for the parental control terminal registration request, the terminal information management unit 116 searches the terminal information in the terminal information database 112 using the terminal ID appended to the received request so as to identify the user of the concerned terminal. Also, the terminal information management unit 116 registers the information on the terminal which is inputted when the user purchases the content usage right or read out and directly sent from the user terminal, and adds information to, deletes information from, or modifies the registered terminal information so as to manage it.

The license ticket generation unit 117 notifies the parental control information management unit 118 of the terminal ID appended to the license ticket issuance request made by the terminal, and has it search the parental control information database 114 using that terminal ID as a key. If the terminal which makes the request is not registered in the parental control information database 114 as a result of the search by the parental control information management unit 118, the license ticket generation unit 117 regards it as a request from a terminal which is not under the parental control, searches the right information of the user stored in the content usage right database 113 based on the ID of the user identified by the terminal information management unit 116, and reads out the content usage rule corresponding to the ID of the requested content. Further, the license ticket generation unit 117 subtracts the usage duration or usage number in this request from the read-out content usage rule so as to calculate the remaining usage duration or usage number, and updates the right information using the calculation result. Next, once generating the license ticket on which the usage duration or usage number in this request and the content key received from the content distribution server 130 are written, the license ticket generation unit 117 appends the terminal ID indicating where the license ticket should be sent and sends it via the communication unit 119.

On the other hand, if the terminal which makes the license ticket issuance request is registered in the parental control information database 114, the license ticket generation unit 117 regards this terminal as the child terminal 150 under the parental control. Here, what is different from the case where the license ticket generation unit 117 issues a license ticket to the terminal not under the parental control is that it adds the usage restriction received from the parental control information management unit 118 to the usage rule of the concerned content corresponding to the usage duration or usage number in this request so as to generate a new content usage rule for a child. After that, it generates a child license ticket by adding a content key to the child content usage rule. Next, the license ticket generation unit 117 sends the generated child license ticket to the child terminal 150 via the communication unit 119. Furthermore, in addition to the above processing, the license ticket generation unit 117 performs processing in response to various right requests from each terminal except for the parental control setting request. For example, it performs billing processing in response to the right purchase request from the terminal, or a processing for updating the right information such as addition of information to, deletion of information from, or modification of the right information in the content usage right database 113.

The parental control information management unit 118 registers the ID of the terminal which is to be under parental control in the parental control information database 114 in response to a parental control terminal registration request from a parent user. More specifically, it registers the terminal ID appended to the parental control terminal registration request in the parental control information database 114. This request is made only by the parent user who is authenticated by the user information management unit 115. However, the terminal that is to be registered in the parental control information database 114 is limited to the child terminal 150 of the child user who is set to make payment using the credit card number of the parent user. Also, the parental control information management unit 118 prepares new parental control information or modifies the parental control information of the registered child terminal 150 in response to the parental control setting request from the parent terminal 140, or deletes the parental control information in response to the parental control cancel request from the parent user so as to update the parental control information in the parental control information database 114.

Furthermore, in addition to the above, when the license ticket generation unit 117 receives the license ticket issuance request, the parental control information management unit 118 searches the parental control information database 114 using the terminal ID passed from the license ticket generation unit 117, and notifies the license ticket generation unit 117 of whether the child terminal 150 is registered or not as the search result. When the terminal ID passed from the license ticket generation unit 117 is registered, the parental control information management unit 118 reads out the usage restrictions which are preset for the user of the child terminal 150 among the parental control information in the parental control information database 114 based on the terminal ID of the child terminal 150 and the right information ID passed by the license ticket generation unit 117, and passes the read-out usage restrictions to the license ticket generation unit 117.

The communication unit 119 receives the license ticket issuance request, the parental control setting request and other requests from the parent terminal 140 or the child terminal 150, and sends back the license ticket or the child license ticket which is generated by the license ticket generation unit 117 in response to the license ticket issuance request to the parent terminal 140 or the child terminal 150 which makes the request. The bus 120 is an internal bus for communicating parallel data at a high speed between each unit in the right management server 110.

The content distribution server 130 is a computer system such as a broadcasting station or a Web site on the Internet, which encrypts a content received from a content producing company to store it and sends an encryption key to the right management server 110, and distributes the encrypted content in response to a user's content distribution request. The content distribution server 130 includes a content database 131 and a distribution unit 132. The content distribution request is a command from the terminals in each home (the parent terminal 140 and the child terminal 150) to request the content distribution server 130 to distribute a content desired by the user, and includes mainly an ID or an Internet address of the terminal which makes the request and an ID of the requested content. The content database 131 is a storage area such as a hard disk that stores encrypted contents. The distribution unit 132 is a processing unit having a communication function that is realized by a program and the like. It reads out the content requested by the parent terminal 140 and the child terminal 150 from the content database 131, and distributes it to the parent terminal 140 or the child terminal 150 via the communication network 160 such as the Internet.

A home terminal includes the parent terminal 140 and the child terminal 150, which are respectively connected to the right management server 110 and the content distribution server 130 via the communication network 160 such as the Internet.

In the parental control system of the present invention, the parent terminal 140 is a terminal which is exclusively used in a home by a parent who is a registered user, that is, a personal computer or a terminal which is designed specifically for a NetDRM content distribution system, connected to the communication network 160, and is used for a parent to request the right management server 110 to set the usage restrictions on each child terminal 150 of his child. The parent terminal 140 roughly includes two processing units which are realized by a program or the like (a communication unit 141 and a data browsing unit 142), and has a storage unit not shown in this figure which is realized by a hard disk or the like in itself.

The communication unit 141 sends the parental setting request inputted on the parent terminal 140 by the parent of the home to the right management server 110. The data browsing unit 142 is a processing unit that is realized by a software exclusive for connecting NetDRM server which is stored in a hard disk of the parent terminal 140. The data browsing unit 142 displays a menu screen that is an initial screen for the NetDRM content distribution system on a display such as a CRT (cathode ray tube) and a liquid crystal display panel (not shown in this figure) of the parent terminal 140, receives interactively, in response to a user's input on the displayed menu screen, input screens for various requests such as the parental control usage restriction setting request from the right management server 110, displays the received input screen for the user, and further sends various requests from the parent terminal 140 that are the input data on the display screen to the right management server 110 via the communication unit 141. Furthermore, the data browsing unit 142 reproduces the content faithfully according to the content usage rule of the license ticket issued from the right management server 110, as in the case of the child terminal 150, by a software exclusive for reproducing the NetDRM content stored in itself.

The child terminal 150 is a terminal exclusive for content reproduction which is used by a child in each home. Since it is connected to the communication network 160, the child user can himself receive a content distributed from the content distribution server 130 and purchase the right from the right management server 110. However, the child terminal 150 which is registered in the parental control information database 114 reproduces a content faithfully according to the content usage rule of the child license ticket under the usage restrictions set by the parent. This child terminal 150 roughly includes two storage units that are realized by a hard disk and others (a license ticket storage unit 153 and a content storage unit 155) and four processing units that are realized by a program and others (a request unit 151, a communication unit 152, a license ticket processing unit 154 and a content reproduction unit 156).

The request unit 151 is connected to an input operation unit such as a controller not shown in this figure, and accesses the right management server 110 via the communication network 160 in response to the input on the input operation unit, displays the menu screen stored in itself for the user, accepts the user's input on the displayed screen, and sends various requests of the child terminal 150 including the accepted input data to the communication unit 152. The communication unit 152 sends the license ticket issuance request or the content distribution request prepared by the request unit 151 to the right management server 110 or the content distribution server 130, and receives the content corresponding to the request or the child license ticket from the right management server 110 or the content distribution server 130. When the communication unit 152 sends various requests to the right management server 110 or the content distribution server 130, it reads out a terminal ID stored in a ROM or the like in the child terminal 150, and sends the requests appended with the read-out terminal ID. The license ticket storage unit 153 is a storage area for storing license tickets which need not be consumed right away among the issued license tickets. The license ticket processing unit 154 interprets the child license ticket and passes the content key of the license ticket to the content reproduction unit 156, and with referring to the content usage rule in the issued license ticket at regular time intervals, controls the content reproduction unit 156 so that the content reproduction unit 156 reproduces the content faithfully according to the content usage rule indicated in the license ticket. The content storage unit 155 is a storage area for storing a content distributed to the child terminal 150 regardless of whether the license ticket is issued or not. The content reproduction unit 156, having a secure and tamper-resistant reproduction module such as a MPEG decoder, decrypts the encrypted content by the content key passed from the license ticket processing unit 154 and reproduces the content under the control of the license ticket processing unit 154.

FIG. 2A is a diagram that shows a sample of a data structure of the user information 200 stored in the user database 111 as shown in FIG. 1. FIG. 2B is a diagram that shows the user information 200 of "Nagaharu Edogawa," a parent user of the parental control system 100, as an actual example. As shown in FIG. 2A, the user information 200 includes a header 201 and user information data 210 that is actual data portion of the user information 200, and the header 201 further includes a user information header size 202 that indicates the data size of the header 201 and a user ID 203 that is set uniquely for handling each user in the parental control system itself. Also, the user information data 210 includes a user information data size 211, a name 212, a zip code 213, an address 214, a telephone number 215, an e-mail address 216, an authentication user ID 217, a password 218, and a credit card number 219. The user information data size 211 indicates the data size of the user information data 210. The name 212 indicates the notation of the user name identified with the user ID 203. The zip code 213 indicates the zip code of the address shown as the next item, the address 214. The address 214 indicates the address of the user identified with the user ID 203. The telephone number 215 indicates the telephone number of the user. The e-mail address 216 indicates the e-mail address of the user.

The authentication user ID 217 is a user ID for authentication used when the user registers the child terminal 150 in the parental control information database 114 and the user sets the parental control usage rule for the registered child terminal 150. The user himself registers the authentication user ID in advance. The password 218 is used for authentication when the user registers the child terminal 150 in the parental control information database 114 and the user sets the parental control usage rule for the child terminal 150, as in the case of the authentication user ID 217. The user himself registers the password in advance. In this parental control system 100, only one user of the users who are registered with a common credit card number 219 is regarded as a parent who can set parental control over the terminals of the other users, and can set the authentication user ID 217 and the password 218. Accordingly, the items for the authentication user ID 217 and the password 218 for the child user are blank. The credit card number 219 indicates the credit card number that is used by the user when he purchases the content usage right from the right management server 110.

As shown in FIG. 2B, as for the user information 200 for the parent user "Nagaharu Edogawa", a numerical value indicating the data size of the header 201 is described in the user information header size 202. Also, in the user ID 203, data of "USO800", an ID for the right management server 110 and the content distribution server 130 to identify "Nagaharu Edogawa" in the parental control system 100 is described. This user information 200 is prepared not only for the parent user like "Nagaharu Edogawa" but also all the users including the child user who operates the child terminal 150, and is respectively under management with the user ID 203.

Furthermore, in the user information data size 211, a numerical value indicating the data size of the user information data 210 is described. In the name 212, the data of "Nagaharu Edogawa", the notation of his name identified with the user ID 203 "USO800" is described. In the zip code 213, the zip code "5718501" of his address "Kadomatsu-cho 1006, Kadomatsu-shi" indicated in the address 214 is described. "083581101," the telephone number of "Nagaharu Edogawa" and his e-mail address "nagaharu@ndrm.jp" are described in the telephone number 215 and the e-mail address 216, respectively. In the authentication user ID 217, "DRM27439", an authentication user ID that is in advance registered by "Nagaharu Edogawa" for the parental control setting is written, and in the password 218, "NA*I*SHO", an authentication password that is in advance registered by "Nagaharu Edogawa" for the parental control setting is described. In the credit card number 219, "4901 6900 9194 6374", a credit card number by which the payment is made for the content usage right purchased by "Nagaharu Edogawa" is described.

The personal information of the user as described above is registered in the user database 111 when each user purchases a content under this parental control system for the first time. After that, the user information 200 is updated according to the user information update request from the registered terminal. For example, the user information is added due to a new child user's registration, the address 214 is changed due to moving, and others. The right management server 110 can authenticate a user, perform billing processing, specify a parent-child relationship, and so on using this user information 200.

On the other hand, at least one terminal operated by the user is registered in the terminal information database 112 along with the above-mentioned registration of the user information. FIG. 3 is a diagram that shows a sample of a data structure of terminal information 300 stored in the terminal information database 112 as shown in FIG. 1. As shown in this figure, in the terminal information 300, a user ID 203 and the corresponding terminal ID 301 are indicated. In the user ID 203, a user ID identical to the user ID 203 described in the user information 200 is described. In the terminal ID 301, a terminal ID that the parental control system 100 sets uniquely on each terminal for handling the concerned terminal in the system itself is described. When the terminal is designed specifically for reproducing a content in the NetDRM content distribution system, this terminal ID 301 is determined uniquely in the system and is written in a built-in IC chip or a ROM during manufacturing. When the terminal is a personal computer or the like for general purpose, the terminal ID 301 is written in a communication IC card or the like exclusive for the NetDRM content distribution system. Furthermore, in the terminal name 302, a manufacturer's code or a name of each terminal is described.

For example, it is found that a terminal identified with the terminal ID 301 "PAP111" and a terminal identified with the terminal ID 301 "PAL222" are registered for the user "Nagaharu Edogawa" identified with the user ID 203 "USO800". Also, in the terminal names 302 corresponding to the terminal IDs 301 "PAP111" and "PAL222", "PANET-V3" and "PANAPANA1", the names of the terminals, are described. Likewise, when a user identified with the user ID 203 "USO817" is "Konatsu Edogawa", an elder daughter of "Nagaharu Edogawa", and a user identified with the user ID 203 "USO871" is his younger daughter, "Koaki Edogawa", the terminal ID 301 "PAN333" of the terminal name 302 "PANAPANA1" is registered in correspondence to the child user "Konatsu Edogawa", and the terminal ID 301 "PAL444" of the terminal name 302 "PANANA-L is registered in correspondence to the child user "Koaki Edogawa".

The terminal information 300 is registered in the terminal information database 112 when each user purchases a content under this parental control system 100 for the first time. After that, when a child terminal 150 is added on or a terminal exclusive for a parent is re-registered as a child terminal 150, the terminal information 300 is updated, that is, added, deleted or modified by the terminal information management unit 116 according to the terminal information update request from the registered terminal. The right management server 110 can specify the user IDs 203 of various requests which are sent from each home along with the respective terminal IDs 301 using this terminal information 300, and further examine information such as user information and right information which is managed by the user ID 203.

In the NetDRM content distribution system with the parental control system 100, when each user uses the distributed content, he receives issuance of the license ticket based on the content usage right purchased from the right management server 110. It is the right information stored in the content usage right database 113 that represents the content usage right based on which the license ticket is issued. FIG. 4 is a diagram that shows how to store right information 400 in the content usage right database 113 as shown in FIG. 1. The right information 400 is stored in the content usage right database 113 along with the corresponding user ID 203, and managed with the right information ID 403. The right information ID 403 is uniquely determined by the license ticket generation unit 117 in order to specify each right information 400 in the right management server 110. For example in FIG. 4, it is shown that the user "Nagaharu Edogawa" of the user ID 203 "USO800" owns the content usage right which is indicated by the right information 400 identified with the right information ID 403 "10000001" and the content usage right which is indicated by the right information 400 identified with the right information ID 403 "10000002". It is also shown that the user "Konatsu Edogawa" of the user ID 203 "USO817" owns the content usage right which is indicated by the right information 400 identified with the right information ID 403 "10000003", and the user "Koaki Edogawa" of the user ID 203 "USO871" owns the content usage right which is indicated by the right information 400 identified with the right information ID 403 "10000006".

FIG. 5A is a diagram that shows a sample of a data structure of the right information 400 in the content usage right database 113 as shown in FIG. 4. FIG. 5B is a diagram that shows the right information 400 of the right information ID 403 "10000003" owned by the user "Konatsu Edogawa" of the user ID 203 "USO817" as an actual example. As shown in FIG. 5A, the right information 400 roughly includes a right information header 401, action information 410, and content group information 420. The right information header 401 is information indicating each right information 400 itself, and includes items such as a right information header size 402, a right information ID 403, an effective period start time 404, an effective period end time 405, a moving permission flag 406, an issuable LT (License Ticket) number 407, an LT issuing terminal ID 408, an action information number 409, etc.

In the right information header size 402, a numerical value indicating the data size of the right information header 401 is described. In the right information ID 403, above-mentioned right information ID is described. For example, the right information ID 403 "10000003" that identifies the right information 400 indicating the content usage right owned by the user "Konatsu Edogawa" is described here. The effective period start time 404 is an item in which information indicating the date and time when the concerned right information 400 comes into effect. Here, the effective period start time 404 "200205010900" is described in a 24-hour notation, and indicates that the content usage right represented by this right information 400 comes into effect at 9 o'clock on May 1, 2002. The effective period end time 405 is an item in which information indicating the date and time when the effective period of the concerned right information 400 ends. Here, the effective period end time 405 "200304300900" is described in a 24-hour notation, and indicates that the content usage right represented by this right information 400 is effective until 9'oclock on Apr. 30, 2003.

In the moving permission flag 406, a flag is described indicating whether it is permitted or not to move a license ticket generated based on the right information 400 to another NetDRM terminal owned by the identical user. Here, the moving permission flag 406 "0" is described, and the license ticket issued based on the right information 400 cannot be moved to a terminal other than the ones specified even if the user "Konatsu Edogawa" registers two terminals in the terminal information database 112. In the issuable LT number 407, a number of license tickets that can be issued based on the right indicated by the concerned right information 400 is described. Here, the issuable LT number 407 "10" is described, and it is found that the user "Konatsu Edogawa" can receive issuance of 10 more license tickets based on this right information 400. In the LT issuing terminal ID 408, a terminal ID 301 of a terminal that may issue the license tickets generated based on the right information 400 in response to the license ticket issuance request. Here, in the LT issuing terminal ID 408, the terminal ID 301 "PAN333" of the terminal registered for the user "Konatsu Edogawa" is described. In the action information number 409, a numerical value indicating the number of the action information 410 is described. For example, the action information number 409 "1" is described here, and it is found that "one" action (operation mode) of a content group is used according to the right information 400.

The action information 410 indicates a content usage rule according to an operation mode of each content group, and the number of the action information 410 is same as that of operation modes of a content group. A content group is a group of contents which can be used by a same operation mode, for example, a group of tunes recorded on one CD as a music content, and a series of movies or animations as a video content. An operation mode of the content is a usage manner determined according to the details of the content. For example, there are usage manners for a video content such as "View" for displaying the content video on a display device like a TV, "Print" for printing a still image included in the displayed video, and "Reproduction" for reproducing music and sounds only to output them from a loudspeaker. There are also usage manners for a music content such as "Reproduction" for reproducing music to output it from a loudspeaker, and "Print" for printing lyrics. Furthermore, there are various usage manners for a game content such as "Play" for playing a game, "Reproduction" for reproducing a theme music of the game to output it from a loudspeaker, and "Print" for printing a game screen. As a content usage rule according to an operation mode, the content usage rule for viewing is described if the operation mode is "View", and the content usage rule for printing is described if it is "Print".

The action information 410 includes an action information size 411, an action ID 412, a longest usage duration 413, a one-time decision threshold• number counter/cumulative usage time 414, and a plug-in rule 415. In the action information size 411, a numerical value indicating data size of the action information 410 is described. In the action ID 412, an action ID indicating to which operation mode the action information 410 corresponds is described. The action ID 412 "View01" is described here, and it indicates that this action information 410 is a content usage rule which should be followed when a content group is used in the operation mode of the action ID 412 "View01". In the longest usage duration 413, the longest duration for which the content can be used continuously is described. The longest usage duration 413 "180" is described here, and it indicates that the content group can be continuously used for three hours.

In the one-time decision threshold•number counter/cumulative usage time 414, a flag indicating of which rule will be specified, a number counter or a cumulative usage time, and the usage rule specified with the flag are described. For example, the flag "1" and the cumulative usage time corresponding to the flag "1", "1800" are described here. It shows that the user "Konatsu Edogawa" can use a content in the corresponding content group for 30 hours in total based on this right information 400. On the other hand, when the flag is "0", a content usage rule is described using the one-time decision threshold• number counter. The one-time decision threshold indicates how long of a usage should be counted as one time, and when the one-time decision threshold is described as "30", for example, 30-minute usage is counted as one time. Also, the number counter counts the usage number of a content using the one-time decision threshold, and indicates how many times at most the content in the content group can be used using this right information 400. When the one-time decision threshold is "30", the number counter does not decrement even if usage of 29 minutes or less is repeated. The number counter is used for a content to which this usage measuring method is more suitable than the cumulative usage time. In the plug-in rule 415, details of a content and rules applied specifically for reproduction processing are described. For example, rules such as a quantization number, a sampling frequency and a channel number of music data are described as the plug-in rules specifically for a music content.

The content group information 420 specifies a group of a content whose usage right range is specified according to the content usage rule described in the right information 400 and which can be reproduced according to the license ticket based on the right information 400, and includes a content group ID 423, a content number 421 and a content ID 422. In the content group ID 423, an ID for identifying the content group is described. For example, the content group ID 423 "VANI0805" indicates that this content group is a series of "Animation: Planet of the Cats". In the content number 421, a number of contents in the content group which can be used based on the right information 400 is described. For example, if this content group includes 10 volumes of the series of "Animation: Planet of the Cats", the number of contents of this content group "10" is described in the content number 421. Accordingly, 10 content IDs 422 follow. In the content ID 422, a content ID of each content included in the content group is described. For example, the content ID 422 #1, "VANI08050", indicates the first content of the content group is the volume 1 of the series of "Animation: Planet of the Cats" which is identified with the content ID 422, "VANI08050". Also, the content ID 422, "VANI08059", of #n (=#10) indicates that the tenth content of the content group is the volume 10 of the series of "Animation: Planet of the Cats" which is identified with the content ID 422, "VANI08059". As mentioned above, a user, a usage manner, usage time, and a usage number are defined in detail in the right information 400 in the content usage right database 113.

The right information 400 is prepared for a parent and a child, irrespective of a user. However, the parent user registered in the parental control system 100 can set usage restrictions on a content usage by the child at any time by registering the terminal for the child in the parental control information database 114 in advance. FIG. 6 is a diagram that shows a sample of a data structure of parental control information 600 stored in the parental control information database 114 as shown in FIG. 1. The parental control information 600 indicates details of a content usage restriction on each child user preset by a parent user, and is stored along with authentication information 610, that is, a group of the corresponding authentication user ID 217 included in the parental control terminal registration request and the password 218. The authentication information 610 is used when the parental usage restriction is added to, modified, and deleted from the parental control information 600 for the child terminal 150 registered by the parent user, and when the registered child terminal 150 is cancelled. Also, this parental control information 600 is managed per terminal ID 301 of the child terminal 150 registered in the parental control information database 114, and further managed per right information ID 403 of the content usage right used in the terminal.

The parental control information 600 is a usage rule indicating a usage range in which the child can use the content as a result of the usage restriction by the parent user, and includes a usage period restriction start time 601, a usage period restriction end time 602, a usage number restriction 603, a continuous usage duration restriction 604, and a cumulative usage time restriction 605. The usage period restriction start time 601 and the usage period restriction end time 602 are set for restricting the usage period of the child user, and the start date and time and end date and time of the restricted content usage period are described there, respectively. For example, they are set so that the child is allowed to use the content only during holidays such as summer and spring holidays. Here, the usage period restriction start time 601, "200207200900" and the usage period restriction end time 602, "200208311900" are set for the right information 400 of the right information ID 403, "10000003" which is used (by the child user, "Konatsu Edogawa" of the user ID 203, "USO817") on the child terminal 150 of the terminal ID 301, "PAN333". This indicates that the child terminal 150 of the terminal ID 301 "PAN333" is under the parental usage restriction that the right information 400 of the right information ID 403 "10000003" can be used only during a period between the usage period restriction start time 601, 9 o'clock on Jul. 20, 2002 and the usage period restriction end time 602, 19 o'clock on Aug. 31, 2002, that is, during the summer holidays.

In the usage number restriction 603, a restricted usage number is described when the right information 400 identified with the right information ID 403 is represented by the number counter. When the right information 400 is represented in a cumulative usage time, this item is blank. In the continuous usage duration restriction 604, a continuous usage duration restricted by the parent user is described. Here, the continuous usage duration restriction 604, "60" minutes, is described for the right information 400 of the right information ID 403, "10000003" used on the child terminal 150 of the terminal ID 301, "PAN333". Under these restrictions, the user "Konatsu Edogawa" of the child terminal 150 of the terminal ID 301, "PAN333" cannot use a content for more than one hour continuously using the right information 400 of the right information ID 403, "10000003". In the cumulative usage time restriction 605, restricted cumulative usage time is described when the right information 400 is represented in cumulative usage time.

Restrictions which are placed when the content is an animated movie have been explained above in this embodiment. However, if the content for the child is a continuously connected game, an item of usage price restriction for restricting connection price ceiling, or an item of usage time zone restriction for restricting a time zone of content usage can be additionally set.

As described above, various usage restrictions can be set in the parental control information 600 depending upon a user of the child terminal 150 or a content group (the right information 400) used by the user of the child terminal 150, as shown in FIG. 6. As a result, there are effects that the parent user cannot only relax, strengthen or cancel the usage restrictions according to each child user's development, but also select a more suitable method among various restriction methods to restrict the child's content usage.

FIG. 7A is a diagram that shows another sample of how to store the parental control information 600 in the parental control information database 114 as shown in FIG. 1. FIG. 7B is a diagram that shows further another sample of how to store the parental control information 600 in the parental control information database 114 as shown in FIG. 1. FIG. 7C is a diagram that shows further another sample of how to store the parental control information 600 in the parental control information database 114 as shown in FIG. 1. FIG. 7D is a diagram that shows further another sample of how to store the parental control information 600 in the parental control information database 114 as shown in FIG. 1. In these FIGS. 7A~7D, the item of the authentication information 610 is omitted. As shown in FIG. 7A, the parental control information 600 is stored correspondingly to the terminal ID 301 and right information ID 403, so the effective parental control information 600 can be applied to a specific right information 400 used on a specific child terminal 150.

Also, as shown in FIG. 7B, the parental control information 600 is stored correspondingly to the user ID 203 and right information ID 403, so the effective parental control information 600 can be applied to a specific right information 400 used by a specific user. As shown in FIG. 7C, the parental control information 600 is stored correspondingly to the terminal ID 301, so the common parental control information 600 can be applied to all the right information 400 used on a specific child terminal 150. Furthermore, as shown in FIG. 7D, the parental control information 600 is stored correspondingly to the user ID 203, so the common parental control information 600 can be applied to all the right information 400 used by a specific user. It has been explained here on the assumption that a parent user sets a usage restriction on each right information 400 which a child user can use. However, more specifically, the parent user may set a usage restriction on each action of a content which the child user can use with the right information 400.

Operations of above-mentioned parental control system 100 according to the first embodiment of the present invention will be explained with reference to FIGS. 8~21. FIG. 8 is a flow chart that shows a processing procedure executed when the parent user "Nagaharu Edogawa" registers the child terminal 150 in the parental control information database 114. The user of the NetDRM content distribution system, "Nagaharu Edogawa" purchased a new NetDRM terminal, "PANANA-L" for his younger daughter "Koaki Edogawa". On the condition of registering the new terminal, "PANANA-L" in the parental control information database 114, the user, "Nagaharu Edogawa" needs to register this terminal "PANANA-L" and the user "Koaki Edogawa" who uses this terminal exclusively in the right management server 110 in advance. More specifically, the user "Nagaharu Edogawa" performs user registration processing for registering personal information of the user "Koaki Edogawa" in the user database 111 and terminal registration processing for registering the terminal "PANANA-L" and the user "Koaki Edogawa" in the terminal information database 112.

When each of the registration requests is made in the user registration processing and the terminal registration processing, the terminal ID 301, "PAL444", stored in the terminal is automatically read out from the terminal "PANANA-L", and sent to the right management server 110 along with each registration request. As a result, the user ID 203 "USO871" is assigned to the terminal ID 301 "PAL444" in the right management server 110, and the user information 200 and the terminal information 300 of the user "Koaki Edogawa" corresponding to the user ID 203 "USO871" are generated. Also, the user "Nagaharu Edogawa" purchases the content usage right under the name of "Koaki Edogawa" for her viewing the series of the contents "Animation: Planet of the Cats", and then the right information 400 of the right information ID 403, "10000006" is generated. The user "Nagaharu Edogawa" has already registered one of the NetDRM terminals, "PANAPANA1" (the terminal ID 301 "PAN333") for his elder daughter "Konatsu Edogawa" (the user ID 203 "USO817"), a junior high school student. When he registered the user "Konatsu Edogawa", he additionally registered the authentication user ID 217 "DRM27439" and the password 218 "NA*I*SHO" for parental control setting and updated the user information 200 of "Nagaharu Edogawa" in order to set the parental usage restrictions on his children's usage of contents in the future.

Figure 9:
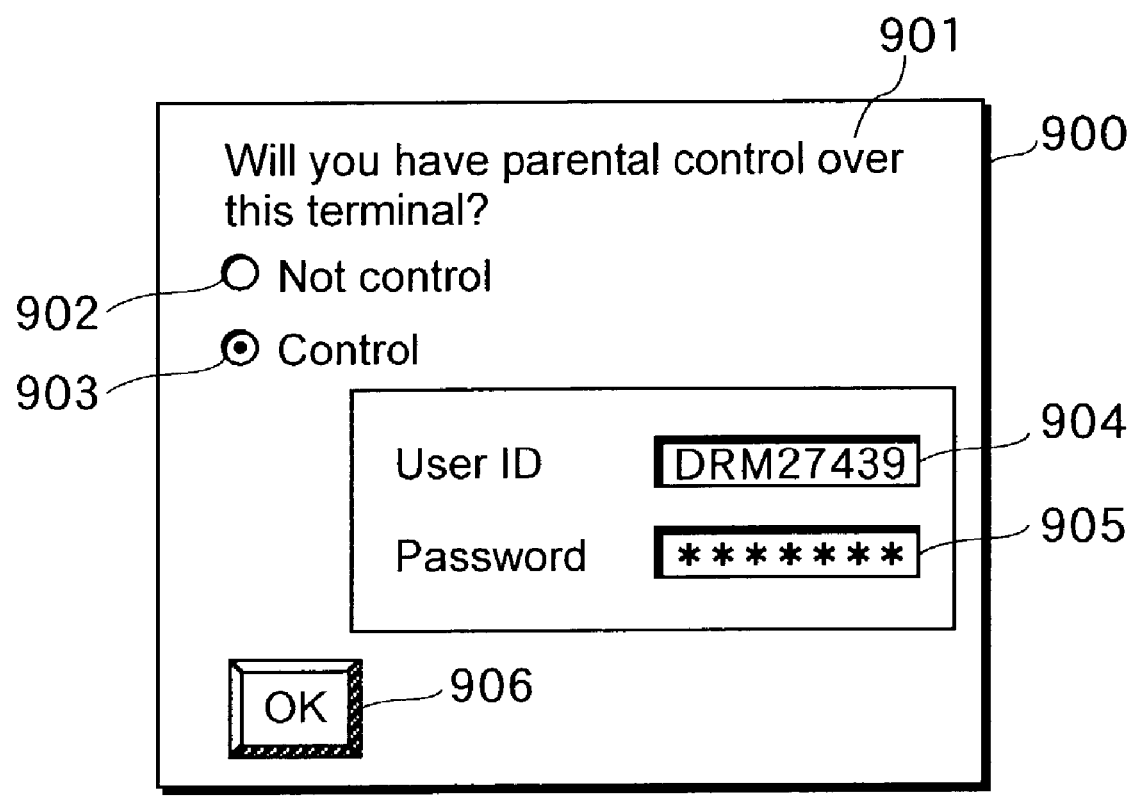
FIG. 9 is a diagram that shows a sample of a screen for "parental control terminal registration" which is displayed on a display panel of the child terminal.

After the above processing, "Nagaharu Edogawa" first calls up the screen for "parental control terminal registration" from the menu screen displayed on a display panel of the purchased child terminal 150, "PANANA-L" (not shown in this figure), operates it according to the guidance displayed on the screen using a remote controller, and sends the parental control registration request of the child terminal 150 to the right management server 110. FIG. 9 is a diagram that shows a sample of a screen 900 for "parental control terminal registration" which is displayed on a display panel of the child terminal 150. As shown in this figure, a guide message 901, "Will you have parental control over this terminal?" is displayed on the "parental control terminal registration" screen 900, and a check button 902 "Not control" and a check button 903 "Control" are also displayed. Also, a user ID input box 904 for accepting the input of the authentication user ID 217 for parental control setting and a password input box 905 for accepting the input of the password 218 are displayed on the center of the "parental control terminal registration" screen 900. Furthermore, in the bottom of the "parental control terminal registration" screen 900, an OK button 906 is displayed for sending the input results to the right management server 110 after the user confirms the input on the screen 900.

The user "Nagaharu Edogawa" checks the check button 903 indicating "Control" on the "parental control terminal registration" screen 900, inputs the authentication user ID 217, "DRM27439" and the password 218, "NA*I*SHO" as the authentication information 610 in the user ID input box 904 and the password input box 905, respectively, confirms whether these inputs are accurate or not, and then pushes the OK button 906. As a result, the request unit 151 of the child terminal 150 sends the parental control terminal registration request including the authentication user ID 217 "DRM27439" and the password 218 "NA*I*SHO" to the communication unit 152 (S801). The communication unit 152 automatically reads out the terminal ID 301 "PAL444" stored in a ROM or the like of the child terminal 150 "PANANA-L" (S802), appends it to the parental control terminal registration request acquired from the request unit 151 and sends it to the right management server 110.

In the right management server 110 which receives the parental control registration request from the child terminal 150, the user information management unit 115 first collates the authentication user ID 217 "DRM27439" and the password 218 "NA*I*SHO" included in the parental control registration request with the user information 200 in the user database 111 (S803), and, if there is the user information 200 whose authentication user ID and the password are identical to the authentication user ID 217 "DRM27439" and the password 218 "NA*I*SHO" (S804), authenticates the concerned parental control terminal registration request is made by the legitimate user. Also, the user information management unit 115 further examines the credit card number 219 "4901 6900 9194 6374" in the user information 200 (the user ID 203 "USO800" in which the authentication user ID 217 and the password 218 identical to the authentication user ID 217 "DRM27429" and the password 218 "NA*I*SHO" which are the authentication information 610 included in the parental control terminal registration request are described. On the other hand, it examines the user information 200 of the user ID 203 "USO871" identified with the terminal ID 301 "PAL444" appended to the parental control terminal registration request, and confirms whether the credit card number 219 described in the concerned user information 200 is identical or not to the credit card number 219 "4901 6900 9194 6374" of the user information 200 in which the authentication user ID 217 "DRM 27439" and the password 218 "NA*I*SHO" are registered. When the user information management unit 115 authenticates the parental control terminal registration request is made by the legitimate user and the credit card numbers 219 are identical, the parental control information management unit 118 registers the terminal ID 301 "PAL444" appended to the parental control terminal registration request and the corresponding authentication information 610 in the parental control information database 114 (S805), notifies the child terminal 150 that the registration of the terminal 150 "PANANA-L" is completed (S806), and completes the parental control registration processing.

Also, when there is no user information 200 whose authentication user ID 217 and the password 218 are identical to the authentication user ID 217 "DRM27439" and the password 218 "NA*I*SHO" included in the parental control terminal registration request, or the credit card number 219 of the user information 200 in which the authentication user ID 217 "DRM27439" and the password 218 "NA*I*SHO" included in the parental control terminal registration request are described is not identical to the credit card number 219 described in the user information 200 of the user ID 203 corresponding to the terminal ID 301 appended to the request (S804), the user information management unit 115 does not authenticate that the parental control terminal registration request is made by the legitimate user. When the user information management unit 115 does not authenticates that the parental control terminal registration request is made by the legitimate user, the parental control information management unit 118 sends a notice that the parental control terminal registration request has not been accepted to the child terminal 150, and completes the parental control terminal registration processing.

Figure 10:
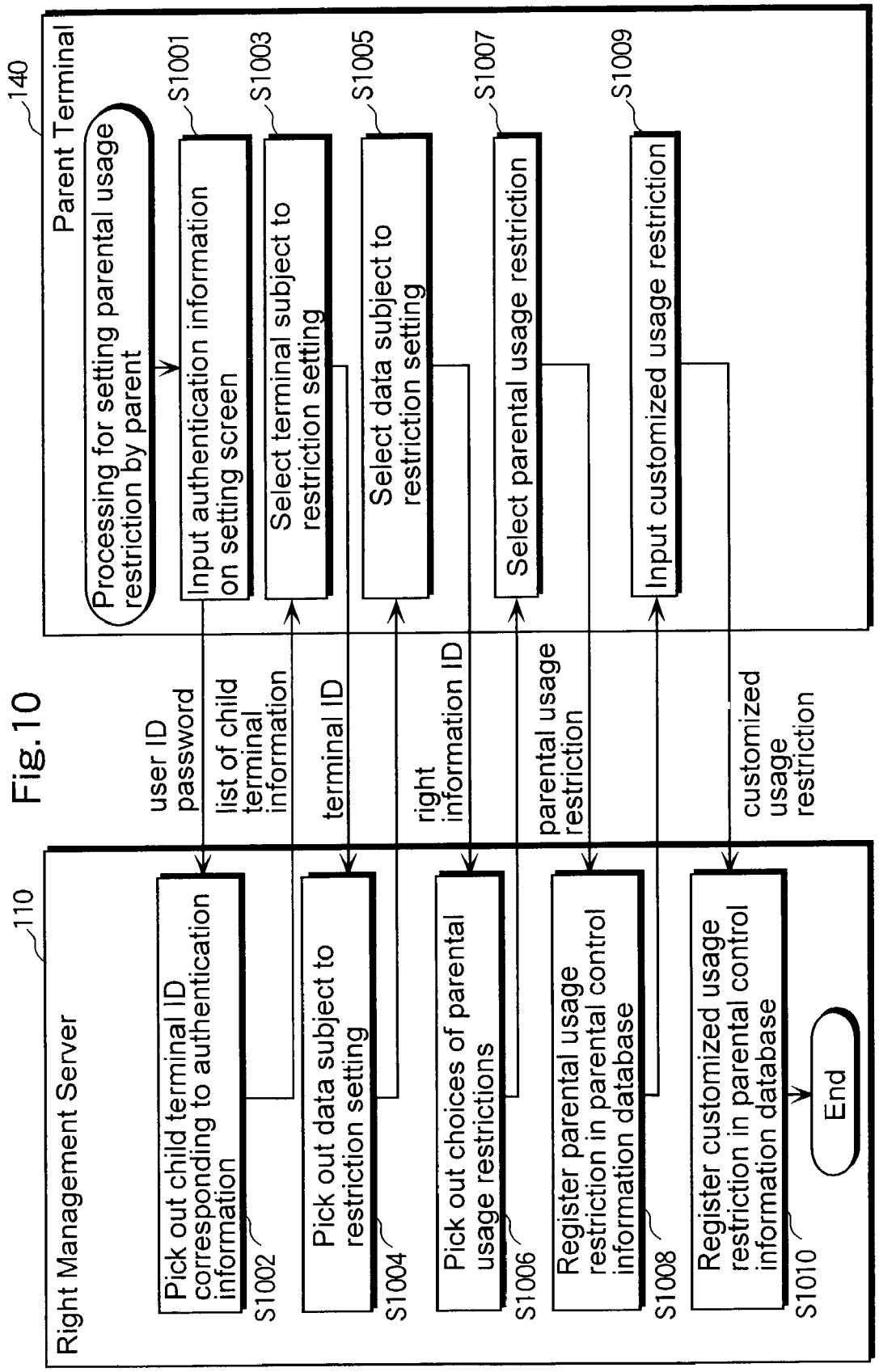
FIG. 10 is a flow chart that shows a processing procedure executed when the parent user "Nagaharu Edogawa" sets parental usage restrictions on the child terminal with a terminal ID "PAN333" which has been already registered according to the processing procedure as shown in FIG. 8.

FIG. 10 is a flow chart that shows a processing procedure executed when the parent user "Nagaharu Edogawa" sets parental usage restrictions on the child terminal 150 with the terminal ID 301 "PAN333" which has been already registered according to the processing procedure as shown in FIG. 8. In the parental control terminal registration processing as shown in FIG. 8, the parental control terminal registration request is sent from the child terminal 150 itself which is to be under the parental control to the right management server 110. However, when the parental usage restriction is set on the child terminal 150 registered in the parental control information database 114, for example, the child terminal 150 "PANAPANA1" (the terminal ID 301 "PAN333"), the request may be made from any terminal. Here, processing executed when the parental usage restriction is set on "PANAPANA1" (the terminal ID 301 "PAN333" used by the elder daughter "Konatsu Edogawa" using the parent terminal 140 "PANET-V3" of the personal computer registered by the parent user "Nagaharu Edogawa" for himself will be explained below.

For example, the parent user "Nagaharu Edogawa" decides to set the parental usage restriction on the content usage by his elder daughter "Konatsu Edogawa" because the entrance exams for high schools are at hand. The parent user "Nagaharu Edogawa" is considering setting the parental usage restriction so that his elder daughter "Konatu Edogawa" cannot view the contents, a series of "Planet of the Cats" which she is particularly absorbed in, for more than "one hour" although he wants to allow her to view them only during the summer holidays. On the other hand, he wants to have his younger daughter "Koaki Edogawa" get used to the personal computer and the content reproduction terminal without setting the parental usage restriction so that she will be able to operate these devices in the future as if she operates TV channels.

Figure 11:
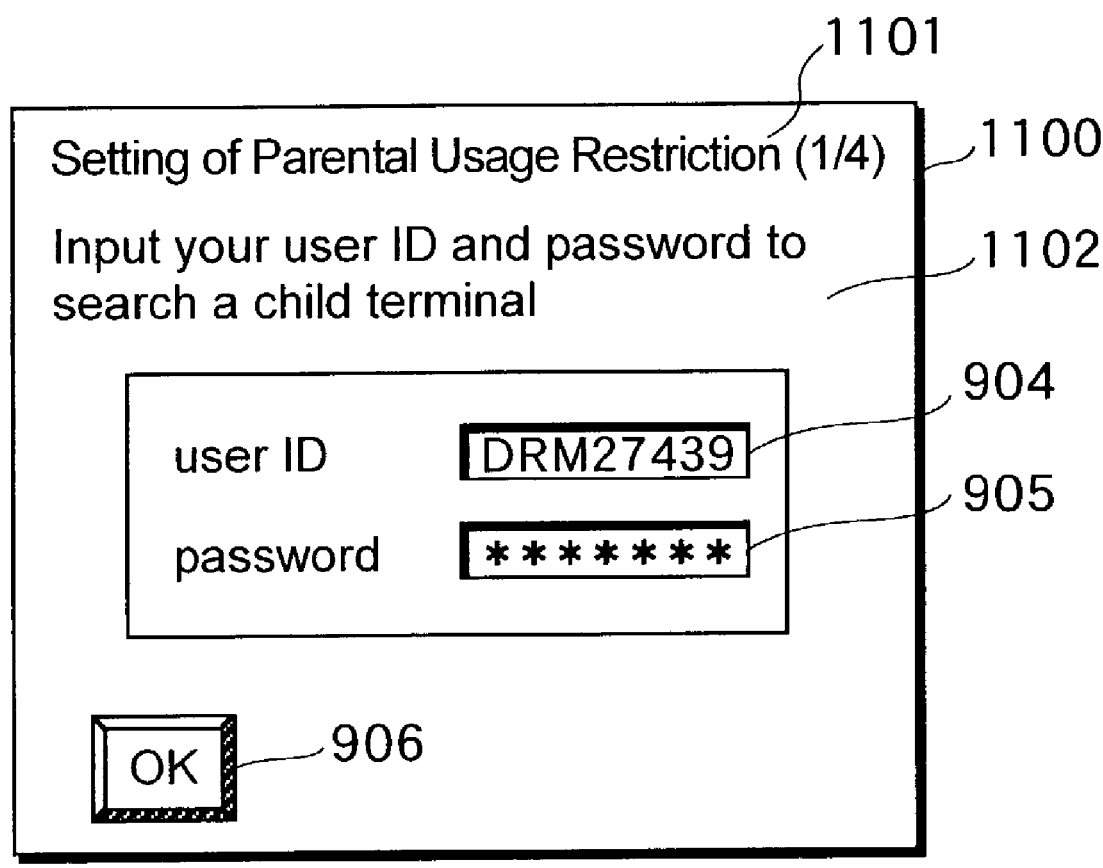
FIG. 11 is a diagram that shows a sample of a parental usage restriction setting screen which is displayed on a display panel of the parent terminal.

When the parent user "Nagaharu Edogawa" starts a NetDRM connection software stored on a hard disk of the parent terminal 140 "PANET-V3", the data browsing unit 142 that is realized by the NetDRM connection software starts up. Once starting up, the data browsing unit 142 first has the NetDRM menu screen display on a display panel or the like (not shown in this figure), so the user "Nagaharu Edogawa" selects the "parental usage restriction setting request" among the menu so as to display the parental usage restriction setting screen. FIG. 11 is a diagram that shows a sample of a parental usage restriction setting screen 1100 which is displayed on a display panel of the parent terminal 140. As shown in FIG. 11, a screen title 1101 "Setting of parental usage restriction (1/4)" is displayed on the parental usage restriction setting screen 1100, indicating that this screen 1100 is the first one of the four input screens for setting the parental usage restriction. Below the screen title 1101, a guide message 1102, "Input your user ID and password to search the child terminal" is displayed, and below the guide message 1102, a user ID input box 904, a password input box 905 and an OK button 906 are displayed. The functions of the user ID input box 904, the password input box 905 and the OK button 906 are same as those as described in FIG. 9.

"Nagaharu Edogawa" inputs the authentication user ID 217 "DRM27439" and the password 218 "NA*I*SHO" that are the authentication information 610 in the user ID input box 904 and the password input box 905 on the parental usage restriction setting screen 1100 according to the guide message 1102, confirms that there is not a mistake in the inputs, and pushes the OK button 906. Then, the data browsing unit 142 sends the parental usage restriction setting request including the authentication user ID 217 "DRM27439" and the password 218 "NA*I*SHO" to the right management server 110 via the communication unit 141 (S1001). The communication unit 141 of the parent terminal 140 also reads out the terminal ID 301 "PAP111" stored on a communication IC card or the like, appends it to the parental usage restriction setting request and sends it to the right management server 110, as in the case of the communication unit 152 of the child terminal 150. However, since the terminal ID 301 "PAP111" of the parent terminal 140 is not directly used for the parental usage restriction setting processing, an explanation and diagrammatic display of it is omitted here.

In the right management server 110 that receives the parental usage restriction request from the parent terminal 140, the parental control information management unit 118 searches the parental control information database 114 with a key of the authentication information 610 included in the parental usage restriction setting request (a combination of the authentication user ID 217 "DRM27439" and the password 218 "NA*I*SHO"), and if the terminal IDs 301 corresponding to the authentication information 610 are registered as a result of the search, picks out all the registered terminal IDs 301 (S1002). Furthermore, the parental control information management unit 118 notifies the terminal information management unit 116 of the picked-out terminal IDs 301 so as to have it specify the corresponding user IDs 203, notifies the user information management unit 115 of the specified user IDs 203 so as to have it search the user information 200, and thereby, acquires the user's name 212 corresponding to each terminal ID 301. The parental control information management unit 118 lists the child terminals 150 of the picked-out terminal IDs 301 on the second parental usage restriction setting screen indicating a list of the child terminal information, and sends them along with the users' names 212 corresponding to the child terminals 150 to the parent terminal 140.

Figure 12:
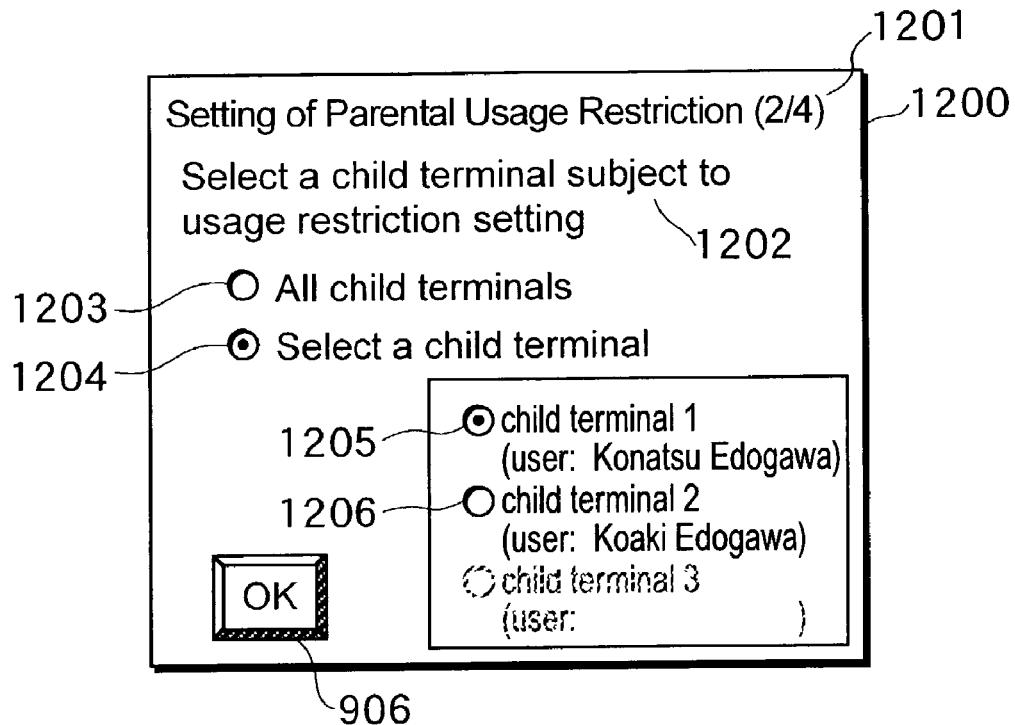
FIG. 12 is a diagram that shows a sample of a second parental usage restriction setting screen which is displayed on the display panel of the parent terminal in response to the input on the parental usage restriction setting screen as shown in FIG. 11.

FIG. 12 is a diagram that shows a sample of a second parental usage restriction setting screen 1200 which is displayed on the display panel of the parent terminal 140 in response to the input on the parental usage restriction setting screen 1100 as shown in FIG. 11. As shown in this figure, a screen title 1201 "Setting of parental usage restriction (2/4)" is displayed on the second parental usage restriction setting screen 1200, indicating that this second parental usage restriction setting screen 1200 is the second input screen for setting the parental usage restriction. Also, a guide message 1202, "Select a child terminal subject to usage restriction setting", is displayed, and below it, a check button 1203 "All child terminals" and a check button 1204 "Select a child terminal" are displayed. Further below them, the child terminals 150 which are registered in the parental control information database 114 along with the corresponding authentication information 610 of the parent user are listed together with the users' names 212. Here, "child terminal 1 (user: Konatsu Edogawa) and "child terminal 2 (user: Koaki Edogawa) are displayed. Check buttons 1205 and 1206 are displayed corresponding to respective child terminal 150 listed here. These check buttons 1205 and 1206 correspond to the terminal IDs 301 "PAN333" and "PAL444" of respective child terminals 150.

When the parent user "Nagaharu Edogawa" checks the check button 1203 indicating "All child terminals", both of the check buttons 1205 and 1206 corresponding to the listed child terminals 150 are checked. Also, when the parent user "Nagaharu Edogawa" checks the check button 1204 indicating "Select a child terminal", the check on either the check button 1205 or the check button 1206 (or both of them) corresponding to the listed child terminal 150 is accepted. In this case, "Nagaharu Edogawa" checks the check button 1204 indicating "Select a child terminal" and the check button 1205 indicating "child terminal 1 (user: Konatsu Edogawa) in order to select the child terminal 150 of his elder daughter "Konatsu Edogawa" only. When the parent user "Nagaharu Edogawa" confirms that the inputs on the second parental usage restriction setting screen 1200 are correct and then pushes the OK button 906 displayed on the bottom of the screen, the terminal ID 301 "PAN333" of the child terminal 150 which is selected by checking the check buttons 1204 and 1205 is sent to the right management server 110 via the communication unit 141 (S1003).

Figure 13:
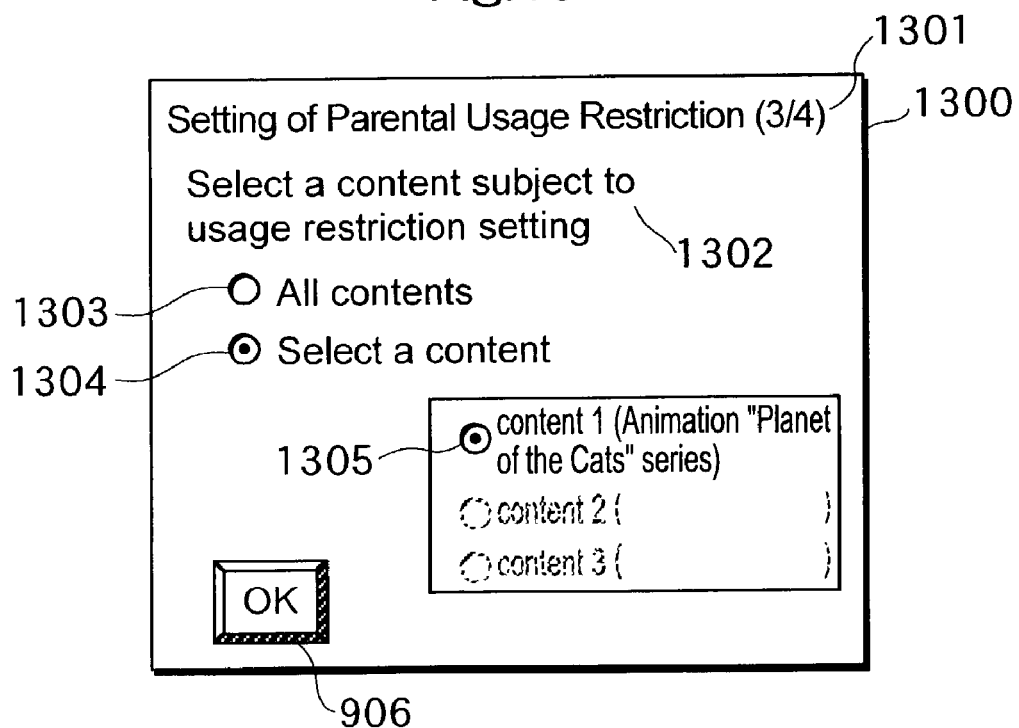
FIG. 13 is a diagram that shows a sample of a third parental usage restriction setting screen which is displayed on the display panel of the parent terminal in response to the input on the second parental usage restriction setting screen as shown in FIG. 12.

In the right management server 110 which receives the terminal ID 301 of the selected child terminal 150 from the parent terminal 140, the parental control information management unit 118 reads out the right information ID 403 corresponding to the received terminal ID 301 from the parental control information database 114 so as to have the license ticket generation unit 117 pick out the content group IDs 423 of the content groups subject to the parental usage restriction setting from the right information 400 (S1004), lists the names of the picked-out content groups on the third parental usage restriction setting screen indicating a list of content groups, and then sends it to the parent terminal 140. FIG. 13 is a diagram that shows a sample of the third parental usage restriction setting screen 1300 which is displayed on the display panel of the parent terminal 140 in response to the input on the second parental usage restriction setting screen 1200 as shown in FIG. 12. As shown in this figure, a screen title 1301 "Setting of parental usage restriction (3/4)" is displayed, as in the case of the above.

A guide message 1302 "Select a content subject to usage restriction setting." is displayed, and below it, a check button 1303 indicating "All contents" and a check button 1304 indicating "Select a content" are displayed. And further below it, the content group names corresponding to the right information 400, which can be used on the child terminal 150 (the terminal ID 301 "PAN333) selected on the second parental usage restriction setting screen 1200, are listed. "Content 1 (Animation "Planet of the Cats" series)" is displayed here. A check button 1305 is displayed corresponding to the listed content group (one content group in this sample). The check button 1305 corresponds to the right information ID 403 "10000003" of the right information 400 corresponding to the displayed content group "Content 1 (Animation "Planet of the Cats" series)".

Since one right information 400 is registered for the child user "Konatsu Edogawa" in this sample, the same result is obtained even if any check button is checked. However, when there are a plurality of right information 400 registered for the child user "Konatsu Edogawa", all the check buttons including the check button 1305 corresponding to the listed content groups are checked if the parent user "Nagaharu Edogawa" checks the check button 1303 "All contents". When the parent user "Nagaharu Edogawa" checks the check button 1304 "Select a content", the input to either the check button 1305 corresponding to the listed content group or other check buttons (or both of them) is accepted. In this sample, "Nagaharu Edogawa" checks the check button 1304 indicating "Select a content" and the check button 1305 indicating "Content 1 (Animation "Planet of the Cats" series)". When the parent user "Nagaharu Edogawa" confirms that the input on the third parental usage restriction setting screen 1300 is correct, and pushes the OK button 906, the right information ID 403 "10000003" of the right information 400 corresponding to the content group which is selected by checking the check buttons 1304 and 1305 is sent to the right management server 110 via the communication unit 141 (S1005).

Figure 14:
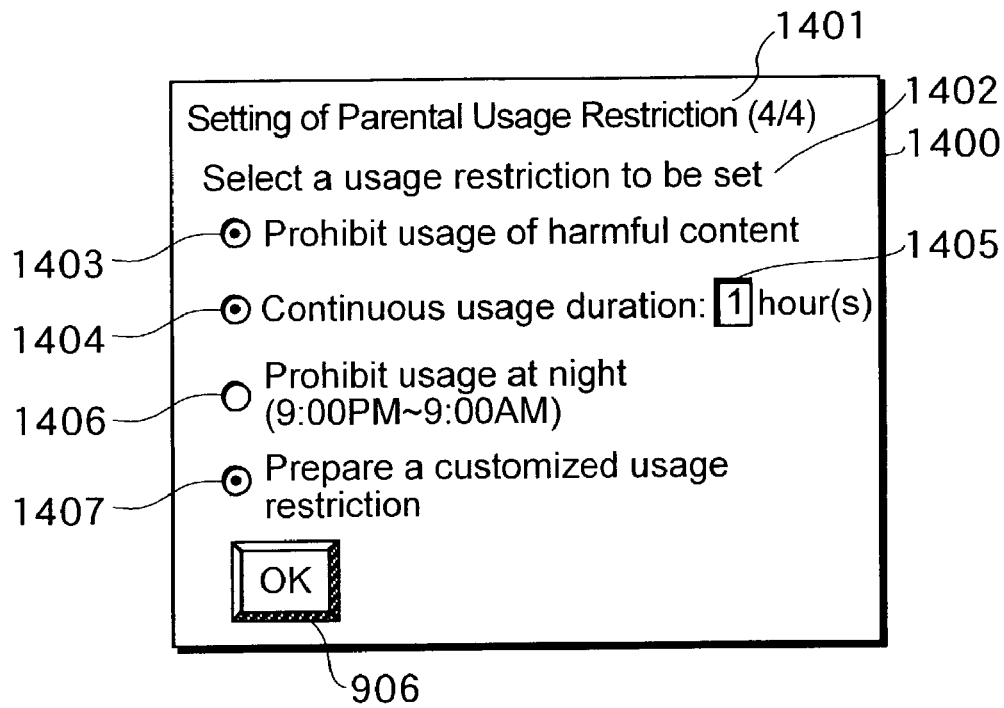
FIG. 14 is a diagram that shows a sample of a fourth parental usage restriction setting screen which is displayed on the display panel of the parent terminal in response to the input on the third parental usage restriction setting screen as shown in FIG. 13.

In the right management server 110 that receives the right information ID 403 of the selected right information 400 from the parent terminal 140, the parental control information management unit 118 reads out a usage restriction template showing a list of generally assumed parental usage restrictions which is stored in the parental control information database 114, picks out choices of the parental usage restriction in the usage restriction template (S1006), lists them on the fourth parental usage restriction setting screen, and then sends them to the parent terminal 140. FIG. 14 is a diagram that shows a sample of the fourth parental usage restriction setting screen 1400 which is displayed on the display panel of the parent terminal 140 in response to the input on the third parental usage restriction setting screen 1300 as shown in FIG. 13. As shown in this figure, on the fourth parental usage restriction setting screen 1400, a screen title 1401 "Setting of parental usage restriction (4/4)" is displayed, as in the case of the above.

Also, a guide message 1402 "Select a usage restriction to be set." is displayed, and below it, a check button 1403 indicating "Prohibit usage of harmful content", a check button 1404 indicating "Continuous usage duration: ☐ hour(s)", a check button 1406 indicating "Prohibit usage at night (9:00 PM~9:00 AM)", and a check button 1407 indicating "Prepare a customized usage restriction" are displayed. When the check button 1404 "Continuous usage duration: ☐ hour(s)" is checked, an input of a numerical value to a time input box 1405 ☐ corresponding to the check button 1404 is accepted. In this sample, "Nagaharu Edogawa" checks the check button 1403 "Prohibit usage of harmful content", the check button 1404 "Continuous usage duration: ☐ hour(s)" and the check button 1407 "Prepare a customized usage restriction", and inputs "1" in the time input box 1405. These check buttons 1403~1407 correspond to items of respective parental usage restrictions in the parental control information 600 stored in the parental control information database 114 with the usage restriction IDs or the like. For example, the check button 1404 of the fourth parental usage restriction setting screen 1400 corresponds to the item of the continuous usage duration restriction 604 of the parental control information 600. When "Nagaharu Edogawa" pushes the OK button 906 displayed on the bottom of the fourth parental usage restriction setting screen 1400, the ID of each parental usage restriction selected by checking the check buttons 1403, 1404 and 1407 and the data of "1" hour for the parental usage restriction indicating continuous usage duration restriction are sent to the right management server 110 via the communication unit 141 (S1007).

In the right management server 110 that receives the ID of each parental usage restriction selected on the parent terminal 140 and the data of "1" hour for the parental usage restriction indicating continuous usage duration restriction, the parental control information management unit 118 registers a flag for prohibiting usage of a content classified as an adult content in the parental control information 600 corresponding to the right information 400 of the right information ID 403 "10000003" selected on the third parental usage restriction setting screen 1300. Since the check button 1404 is checked, the parental control information management unit 118 registers "60" minutes corresponding to "1" hour inputted in the time input box 1405 in the continuous usage duration restriction 604 (S1008). The parental control information management unit 118 further sends the customized usage restriction setting screen to the parent terminal 140 because the check button 1407 indicating "Prepare a customized usage restriction" is checked on the fourth parental usage restriction setting screen 1400.

Figure 15:
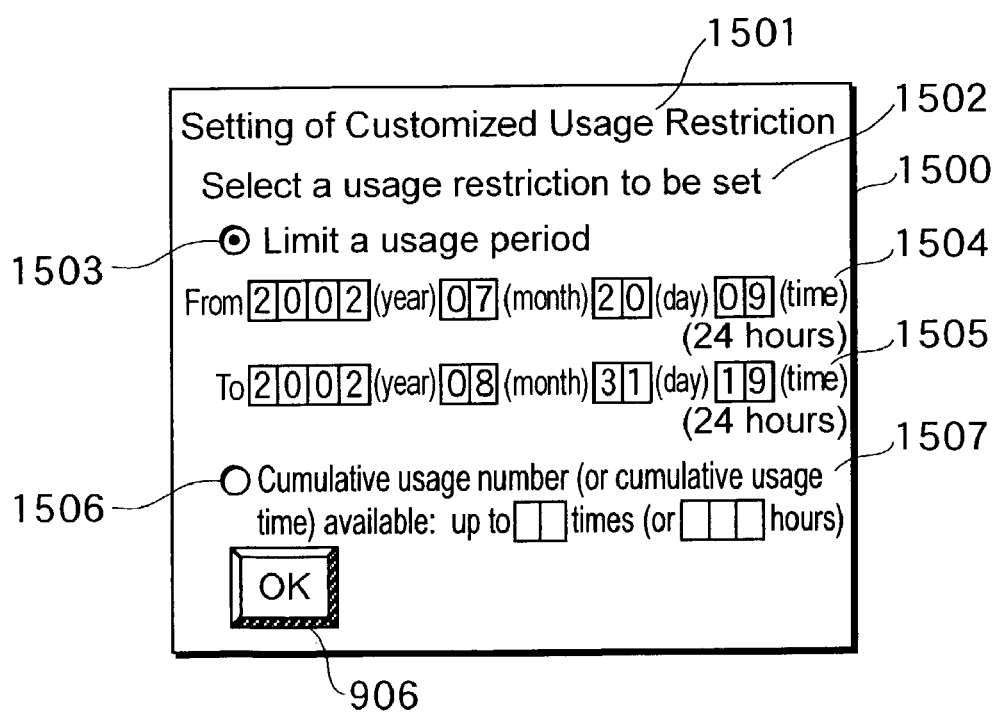
FIG. 15 is a diagram that shows a sample of a customized usage restriction setting screen which is displayed on the parent terminal.

FIG. 15 is a diagram that shows a sample of a customized usage restriction setting screen 1500 which is displayed on the parent terminal 140. All the items which can be subject to the usage restriction of the right information 400 available on the concerned child terminal 150 are sequentially listed on a plurality of the customized usage restriction setting screens 1500, and the inputs for selecting them and the corresponding supplementary information are accepted. As shown in this figure, on the customized usage restriction setting screen 1500, a screen title 1501 "Setting of customized usage restriction" and a guide message 1502 "Select a usage restriction to be set" for guiding a user to input his selection of the setting are displayed. Below it, a check button 1503 indicating "Limit a usage period", a start date and time input box 1504 indicating "☐ ☐ ☐ ☐ (year) (A.D.) ☐ ☐ (month) ☐ ☐ (day) ☐ ☐ (time) (24 hours) and an end date and time input box 1505 indicating "☐ ☐ ☐ ☐ (year) (A.D.) ☐ ☐ (month) ☐ ☐ (day) ☐ ☐ (time) (24 hours) are displayed. When the check button 1503 indicating "Limit a usage period" is checked, inputs of numerical values indicating a time and a date are accepted on the start date and time input box 1504 and the end date and time input box 1505. Below them, a check button 1506 indicating "cumulative usage number (or cumulative usage time) available: up to ☐ ☐ times (or ☐ ☐ ☐ hours)" and a cumulative usage number/cumulative usage time restriction input box 1507 are displayed. When the check button 1506 is checked, inputs of numerical values to the cumulative usage number/cumulative usage time restriction input box 1507 are accepted.

In this sample, the parent user "Nagaharu Edogawa" checks the check button 1503 indicating "Limit a usage period", and inputs "2002072009" and "2002083119" in the start date and time input box 1504 and the end date and time input box 1505, respectively. The items of the start date and time input box 1504 and the end date and time input box 1505 on the customized usage restriction setting screen 1500 corresponds to the usage period restriction start time 601 and the usage period restriction end time 602 of the parental control information 600, and the item of the cumulative usage number/cumulative usage time restriction input box 1507 corresponds to the items of the usage number restriction 603 and the cumulative usage time restriction 605 of the parental control information 600, respectively. When "Nagaharu Edogawa" pushes the OK button 906 displayed on the bottom of the customized usage restriction setting screen 1500, the IDs of the parental usage restrictions, "usage period restriction start time 601" and "usage period restriction end time 602" selected by checking the check button 1503, and the data, "2002072009" and "2002083119" corresponding to the items inputted in the start date and time input box 1504 and the end data and time input box 1505 are sent to the right management server 110 via the communication unit 141 (S1009).

The parental control information management unit 118 that receives the input results onto the customized usage restriction setting screen 1500 from the parent terminal 140 registers the usage period restriction start time 601 "200207200900" and the usage period restriction end time 602 "200208311900" in the parental control information 600 corresponding to the right information 400 of the right information ID 403 "10000003", and completes the processing (S1010).

As mentioned above, according to the parental control system 100 of the present embodiment, once registering the child terminal 150 subject to parental usage restriction in the parental control information database 114, a user can set the subsequent parental usage restrictions on any terminals. Also, a parent user can easily set the parental usage restriction depending upon his child's development by performing easy input operations according to the display on the parental usage restriction setting screen sent from the right management server 110.

Figure 16:
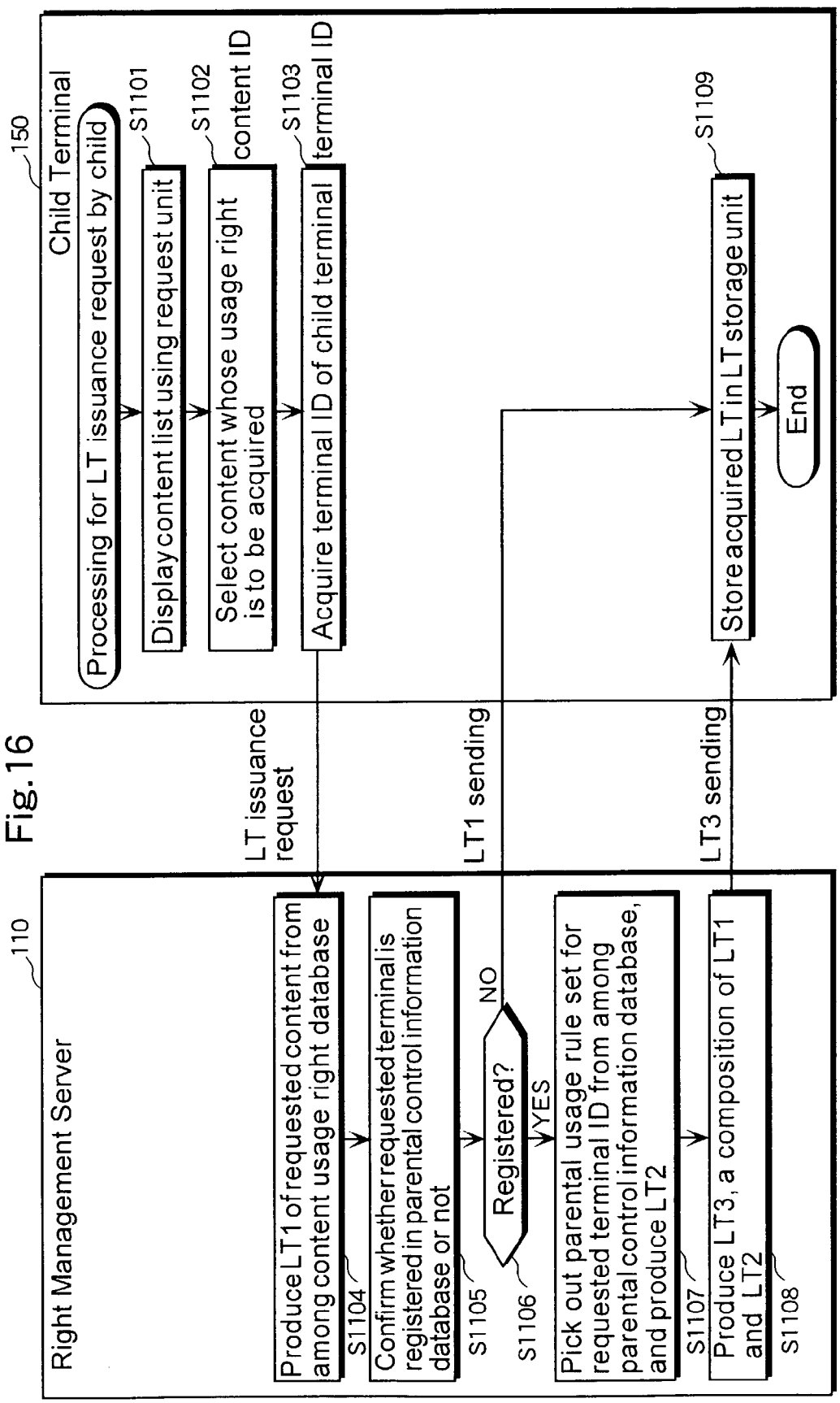
FIG. 16 is a flow chart that shows a processing procedure executed in the right management server and the child terminal when the child terminal (with the terminal ID "PAN333") on which the parental control information as shown in FIG. 6 is set makes a license ticket issuance request.

How a parental usage restriction works when a content is used on the child terminal 150 on which the parental usage restriction is put in the above manner will be explained below. FIG. 16 is a flow chart that shows a processing procedure executed in the right management server 110 and the child terminal 150 when the child terminal 150 (with the terminal ID 301 "PAN333") on which the parental control information 600 as shown in FIG. 6 is set makes a license ticket issuance request. In the following figures, a license ticket will be expressed in "LT". The child user "Konatsu Edogawa" who exclusively uses the child terminal 150 of the terminal ID 301 "PAN333" instructs the request unit 151 by operating a controller not shown here so as to have it display a list of available contents which have been downloaded from the right management server 110 on the display panel of the child terminal 150 (S1101). When "Konatsu Edogawa" selects her desired content "Animation: Planet of the Cats (Vol. 1)" among the displayed content list, inputs her desired usage number (or usage time) "3 hours", and pushes the OK button 906 as shown in FIG. 9, for example, the request unit 151 acquires a content ID "VANI08050" of each content selected among the content IDs corresponding to the listed contents and a usage number (or usage time) of the content (S1102). The request unit 151 further reads out the terminal ID 301 "PAN333" from a ROM or the like of the child terminal 150, appends it to the license ticket issuance request, and then sends it to the right management server 110 (S1103).

In the right management server 110 that receives the license ticket issuance request of the content ID "VANI08050" from the child terminal 150 of the terminal ID 301 "PAN333", the terminal information management unit 116 identifies the user ID 203 "USO817" of the child terminal 150 (the terminal ID 301 "PAN333") among the terminal information 300, and the license ticket generation unit 117 searches the right information 400 in the content usage right database 113 corresponding to the identified user ID 203 "USO817". If it is described in the right information 400 which is hit as a result of the search (the right information ID 403 "10000003") that more than "3 hours" of usage right of the requested content "Animation: Planet of the Cats (Vol. 1)" remains, the license ticket generation unit 117 updates the usage rule corresponding to the cumulative usage time among the items of the one-time decision threshold• number counter/cumulative usage time 414 of the right information 400 (the right information ID 403 "10000003") from "1800 minutes" to "1620 minutes" that is the balance after subtracting the requested "180 minutes", and then generates a license ticket 1 for the "3-hour" use of the requested content "Animation: Planet of the Cats (Vol. 1)" (S1104).

The license ticket generation unit 117 notifies the parental control information management unit 118 of the terminal ID 301 "PAN333" of the requesting child terminal 150 which is appended to the license ticket issuance request, and has it search the parental control information 600 in the parental control information database 114 using the terminal ID 301

"PAN 333" a key (S1105). If the requesting child terminal 150 is not registered in the parental control information database 114 as a result of the search by the parental control information management unit 118 (S1106), the license ticket generation unit 117 regards the request as that from a terminal which is not under the parental control, and sends the generated license ticket 1 to the child terminal 150. Once receiving the license ticket 1, the child terminal 150 stores the license ticket 1 in the license ticket storage unit 153 (S1109) and completes the processing.

In this sample, the child terminal 150 of the user "Konatsu Edogawa" (the terminal ID 301 "PAN333") is registered in the parental control information database 114 (S1106), the parental control information management unit 118 picks out the parental usage restriction set for the child terminal 150 (the terminal ID 301 "PAN333"), and passes the picked-out parental usage restriction to the license ticket generation unit 117. The license ticket generation unit 117 generates a license ticket 2 indicating the parental usage restriction passed from the parental control information management unit 118 (S1107). The license ticket generation unit 117 further integrates the generated license ticket 1 and license ticket 2 so as to generate one license ticket 3 (a child license ticket), and sends it to the requesting child terminal 150. Once receiving the license ticket 3 from the right management server 110, the child terminal 150 stores the license ticket 3 in the license ticket storage unit 153 (S1109) and completes the processing.

FIG. 17A is a diagram that shows a sample of a data structure of a license ticket 1700 which is generated by the license ticket generation unit 117. FIG. 17B is a diagram that shows the license ticket 1 which is generated in response to the license ticket issuance request from the child terminal 150 (with the terminal ID "PAN333") as an actual example. FIG. 17C is a diagram that shows the license ticket 2 which is generated under the parental usage restriction which is set on the child terminal 150 (with the terminal ID 301 "PAN333") as an actual example. FIG. 17D is a diagram that shows the license ticket 3 which is generated by integrating the license ticket 1 and the license ticket 2. As shown in FIG. 17A, the license ticket 1700 roughly includes an LT header 1701, an action tag block 1702, a content key 1703 and an LT footer 1704. The LT header 1701 is information indicating the license ticket 1700 itself, and includes an LT identifier 1705, a NetDRM version number 1706, an LT size 1707, a content ID 422, right information ID 403, an LT effective period start time 1708, an LT effective period end time 1709, and an LT moving permission flag 406.

In the LT identifier 1705, a character string indicating that this data is a license ticket handled in the NetDRM content distribution system, for example, "NDLT" is described. In the NetDRM version number 1706, the version information of this NetDRM content distribution system, for example, "10.11" is described. In the LT size 1707, the data size of the entire license ticket 1700 is described. The content ID 422, the right information ID 403 and the LT moving permission flag 406 are the same as those described in FIG. 5. Furthermore, the LT effective period start time 1708 and the LT effective period end time 1709 indicate the effective period of the right in the same manner as that indicated by the effective period start time 404 and the effective period end time 405 of the right information 400. However, when a content usage is permitted free of charge or at a bargain price during a sales campaign, the LT effective period start time 1708 and the LT effective period end time 1709 may set a period different from that set by the effective period start time 404 and the effective period end time 405 of the right information 400 in order to set a special effective period for the license ticket 1700.

The action tag block 1702 is same as the action information 410 of the right information 400 in FIG. 5, and includes the action information size 411, the action ID 412, the longest usage duration 413, the one-time decision threshold• number counter/cumulative usage time 414, the plug-in rule 415, and others. Since these have been explained in FIG. 5, explanation of these will be omitted here. In the content key 1703, a decryption key for decrypting a content identified with the content ID 422 is described. In the LT footer 1704, a hash value is described for checking whether the license ticket 1700 is tampered with or not when it is transmitted via the communication network 160 except for a secure communication network like SSL. The hash value is calculated for the portion from the head to just before the LT footer 1704 of the license ticket 1700.

In response to the license ticket issuance request from each terminal, the license ticket generation unit 117 first generates the license ticket 1 for permitting the requested content usage within the range of the content usage right as shown in the right information 400 for the user of the requesting terminal, irrespective of whether the parental usage restriction is set or not on the requesting terminal. More specifically, in response to the license ticket issuance request from the child terminal 150 of the terminal ID 301 "PAN333" on which the parental usage restriction is set, the license ticket generation unit 117 also generates the license ticket 1 indicating the request usage range as usual based on the right information 400 of the right information ID 403 "10000003" for the user "Konatsu Edogawa" of the user ID 203 "USO817", as shown in FIG. 17B. In other words, in this license ticket 1, the LT effective period start time 1708 "200205010900", the LT effective period end time 1709 "200304300900", and the longest usage duration 413 "180 minutes" are also described for the usage rule on which the parental usage restriction is set.

Next, the license ticket generation unit 117 generates the license ticket 2 indicating the parental usage restriction which is passed from the parental control information management unit 118 and set on the requesting child terminal 150 (the terminal ID 301 "PAN333"). More specifically, in the license ticket 2, only items minimally required for a license ticket as a matter of a format such as the LT identifier 1705 "NDLT", the LT size 1707 "xxxxxx" and the action information size 411 "xxxxxx", except for items on the parental usage restrictions, are described, as shown in FIG. 17C. The usage rule indicated by the license ticket 2 is the parental usage restriction themselves which is set on the requesting child terminal 150, and the content cannot actually be used with this license ticket 2 only. In this sample, the parental usage restrictions which are set on the child terminal 150 (the terminal ID 301 "PAN333") used by the child user "Konatsu Edogawa", that is, the LT effective period start time 1708 "200207200900", the LT effective period end time 1709 "200208311900", and the longest usage duration 413 "60 minutes" are described.

Finally, the license ticket generation unit 117 integrates the license ticket 1 and the license ticket 2 generated as described above into one by carrying out logical product between these license tickets 1 and 2, and generates the license ticket 3 for the child. As shown in FIG. 17D, the content can be used with the license ticket 3 as an ordinary license ticket. However, the details of the license ticket 2 are described in the items on which the parental usage restrictions are set, as shown in FIG. 17C. That is, the LT effective period start time 1708 "200207200900", the LT effective period end time 1709 "200208311900", and the longest usage duration 413 "60 minutes" are described in the license ticket 3.

FIG. 18A is a diagram that shows a sample of a license ticket issuance method to the child terminal 150 under the parental control. FIG. 18B is a diagram that shows another sample of the license ticket issuance method to the child terminal 150 under the parental control. FIG. 18C is a diagram that shows further another sample of the license ticket issuance method to the child terminal 150 under the parental control. As shown in FIGS. 16, 17B, 17C and 17D, FIG. 18A shows a license ticket issuance method, under which the license ticket generation unit 117 in the right management server 110 generates the ordinary license ticket 1 indicating the usage rule, "Continuous usage duration: 3 hours", for example, according to the license ticket issuance request within the range of the content usage right as shown in the right information 400, generates the license ticket 2 indicating only the parental usage restriction, "Continuous usage duration: 1 hour", for example, and generates the license ticket 3 indicating the logical product of these usage rules, "Continuous usage duration: 1 hour", and then sends it to the requesting child terminal 150. Under this method, the child terminal 150 does not require a special structure for interpreting the parental usage restriction only if it is equipped with a function of interpreting a license ticket, even if a content on which a parental usage restriction is set. Therefore, there is an effect that the child terminal 150 that is an ordinary NetDRM content reproduction terminal can be put under the parental control in the parental control system 100 according to the present embodiment.

FIG. 18B shows a processing method, under which the license ticket 1 and the license ticket 2 are respectively sent to the child terminals 150 that request them, and the logical product of the content usage rules indicated by the license tickets 1 and 2 is carried out at the side of the child terminal 150 that receives them, without integrating these license tickets into one. Since the license ticket 2 is different from an ordinary license ticket in data structure, a new structure is necessary in the license ticket processing unit 154 for interpreting the license ticket 2 in the child terminal 150, carrying out the logical product between the usage rules of the license tickets 1 and 2, and controlling the content reproduction unit 156 according to the usage rule of the logical product, when the license ticket is issued under this method. However, there is an effect that the processing load on the right management server 110 for integrating the license ticket 1 and the license ticket 2 in the license ticket generation unit 117 to generate the license ticket 3 can be reduced.

Furthermore, in FIG. 18C, the license ticket generation unit 117 integrates the license ticket 1 and the license ticket 2 to generate the license ticket 3 in the right management server 110. However, the generated license ticket 3 is different from an ordinary license ticket because it is the license ticket in which the parental usage restriction indicated by the license ticket 2, the item of "Continuous usage duration: 1 hour", for example, is appended to the original usage rule indicated by the license ticket 1, the item of "Continuous usage duration: 3 hours", for example. Although only the item of "Continuous usage duration" will be explained in this example, the parental usage restrictions corresponding to all the items on which the parental usage restrictions are set are appended to the license ticket 3. In the child terminal 150 that receives the license ticket 3 generated as above, the license ticket processing unit 154 carries out the logical product between two parameters if there are these two parameters for the identical item of the content usage rule, and controls reproduction by the content reproduction unit 156 based on the logical product.

Figure 19:
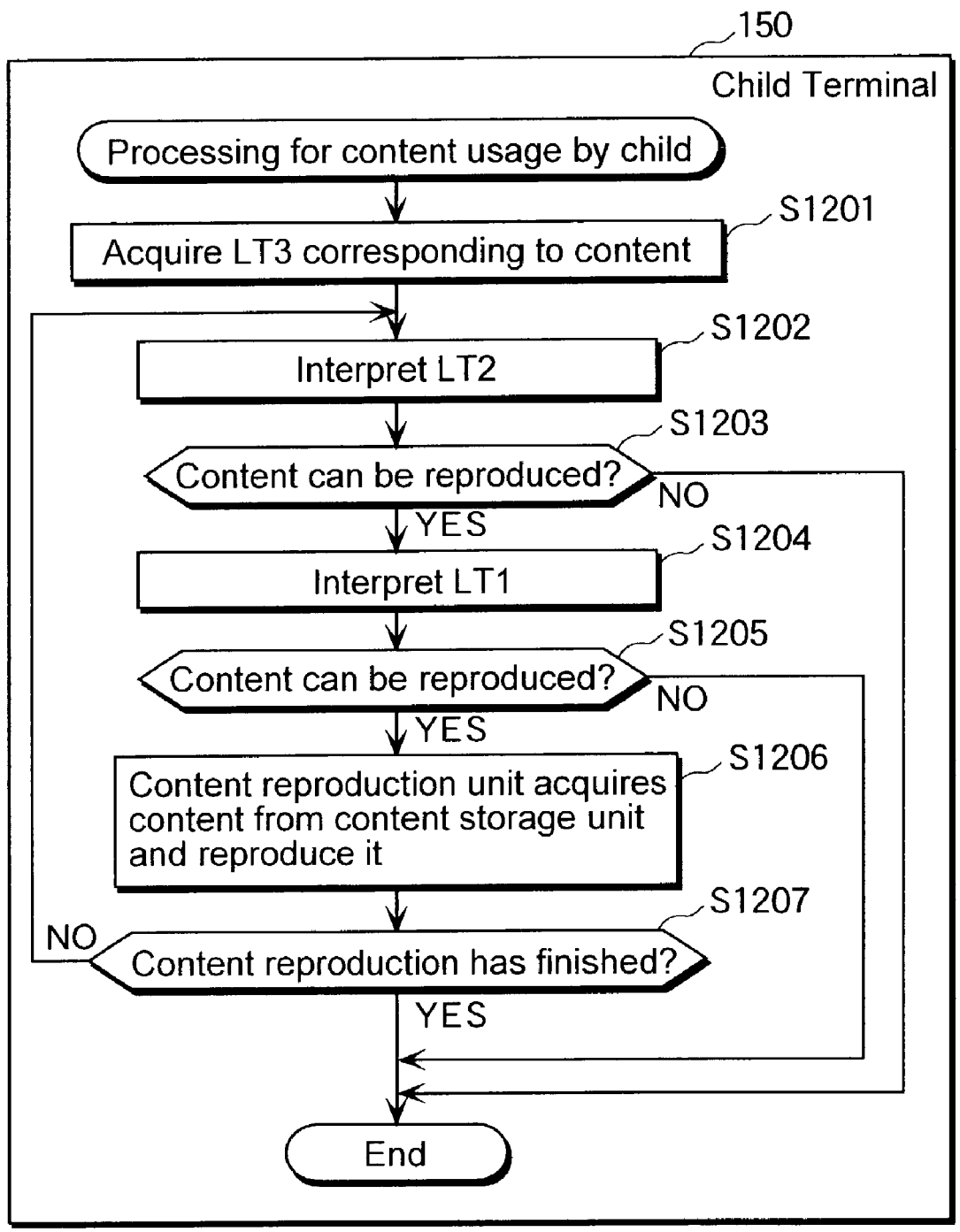
FIG. 19 is a flow chart that shows a processing procedure executed by each unit of the child terminal when the child terminal of the user "Konatsu Edogawa" who receives the license ticket 3 generated by integrating the license ticket 1 and the license ticket 2 uses a content "Animation: Planet of the Cats (Vol. 1)".

In this embodiment, the license ticket 3 is generated by appending the items corresponding to the parental usage restrictions indicated by the license ticket 2 to the items of the original usage rules indicated by the license ticket 1. However, as another method, the license ticket 3 may be generated by integrating the license ticket 2 to the tail of the license ticket 1, and sent to the child terminal 150. FIG. 19 is a flow chart that shows a processing procedure executed by each unit of the child terminal 150 when the child terminal 150 of the user "Konatsu Edogawa" who receives the license ticket 3 generated by integrating the license ticket 1 and the license ticket 2 uses a content "Animation: Planet of the Cats (Vol. 1)". In response to the content reproduction instruction inputted from the input operation unit not shown here of the child terminal 150 by the user "Konatsu Edogawa", the license ticket processing unit 154 acquires the license ticket 3 from the license ticket storage unit 153 (S1201), interprets the license ticket 2 combined to the tail of the license ticket 1, and decides whether the reproduction of the content is permitted or not (S1202).

When the reproduction of the content is not permitted as a result of the interpretation of the license ticket 2 (S1203), for example, a flag for prohibiting the usage of the content is set in the parental usage restriction indicated by the license ticket 2, or the license effective period has expired, the license ticket processing unit 154 displays a message such as "You cannot use this content" on the display panel of the child terminal 150, and completes the processing. When the child user "Konatsu Edogawa" makes the license ticket issuance request for using the content "Animation: Planet of the Cats (Vol. 1)" on May 5, 2002 before the summer holidays, for example, the license ticket processing unit 154 decides that the reproduction of the content is not permitted because the effective period start time for the license ticket 2 is "9 o'clock on Jul. 20, 2002", and therefore, the effective period of the license ticket 3 has not yet started. As a result of the decision, the license ticket processing unit 154 displays the message "You cannot use this content", and completes the processing.

When the reproduction of the content under the reproduction instruction is permitted as a result of the interpretation of the license ticket 2 (S1203), the license ticket processing unit 154 further interprets the license ticket 1 (S1204), and decides whether the reproduction of the content is permitted or not (S1205). When the reproduction of the content is not permitted, the license ticket processing unit 154 performs the processing same as that in the case where the reproduction of the content is not permitted in Step S1203, and completes the processing. When the reproduction of the content under the reproduction instruction is permitted as a result of the interpretation of the license ticket 1 (S1205), the license ticket processing unit 154 permits the content reproduction unit 156 to reproduce the content. The content reproduction unit 156 acquires the content "Animation: Planet of the Contents (Vol. 1)" from the content storage unit 155, and decrypts it using the content key included in the license ticket 1 to reproduce it (S1206). Note that the reproduction of the content includes printing, display and writing upon an external medium of the content.

The license ticket processing unit 154 confirms at regular time intervals whether the content reproduction unit 156 continues reproducing the content or not (S1207), and if it continues, interprets the license ticket 2 again, and decides whether the reproduction of the content is permitted or not (S1202). When the reproduction of the content is permitted depending upon the reproduction condition at that time, as a result of the interpretation of the license ticket 2 (S1203), the license ticket processing unit 154 further interprets the license ticket 1 (S1204), and decides whether the reproduction of the content is permitted or not at that time (S1205).

When the reproduction of the content is not permitted depending upon the reproduction condition at that time (S1203), as a result of the interpretation of the license ticket 2 (S1202), the license ticket processing unit 154 displays a message on the display screen of the child terminal 150, and completes the processing. Assume that the child user "Konatsu Edogawa" makes the license ticket issuance request for using the content "Animation: Planet of the Cats (Vol. 1)" on Aug. 15, 2002 during the summer holidays, and the reproduction of the content "Animation: Planet of the Cats (Vol. 1)" is permitted according to the license tickets 1 and 2. When the reproduction duration of the content "Animation: Planet of the Cats (Vol. 1)" exceeds one hour, the license ticket processing unit 154 stops the content reproduction unit 156 reproducing the content according to the longest usage duration 413 of the license ticket 2, "60 minutes", and displays the message "You cannot use this content" and completes the processing.

If the reproduction of the content is permitted at that time (S1205), as a result of the interpretation of the license ticket 1 (S1204), the license ticket processing unit 154 makes the content reproduction unit 156 to further continue the reproduction of the content (S1206). As described above, since the license ticket processing unit 154 monitors the reproduction condition of the content by the content reproduction unit 156, and controls the content reproduction unit 156 at regular time intervals with collating it with the license tickets 1 and 2, the child terminal 150 can reproduce the content faithfully according to the parental usage restriction of the child terminal 150 set by the parent user.

Figure 20:
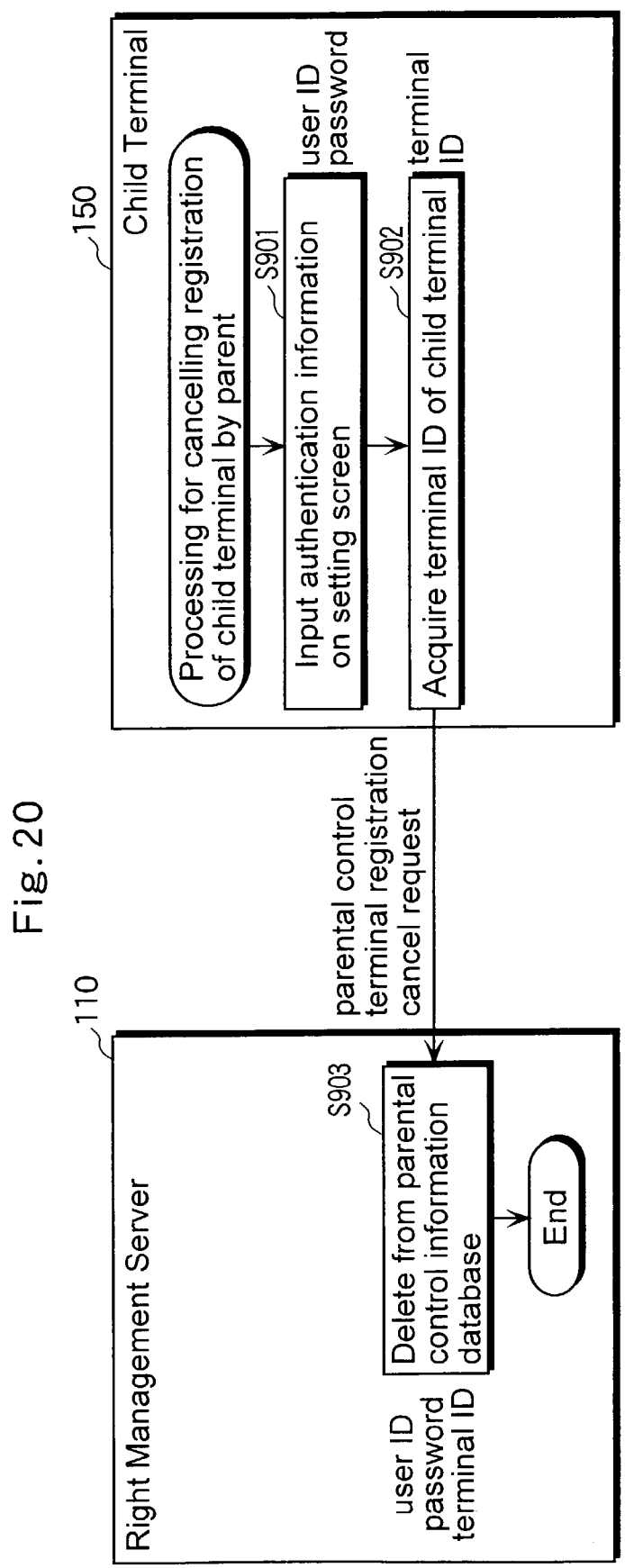
FIG. 20 is a flow chart that shows a processing procedure executed when the parent user "Nagaharu Edogawa" cancels the registration of the child terminal with the terminal ID "PAN333" which has been already registered according to the processing procedure as shown in FIG. 8.
Figure 21:
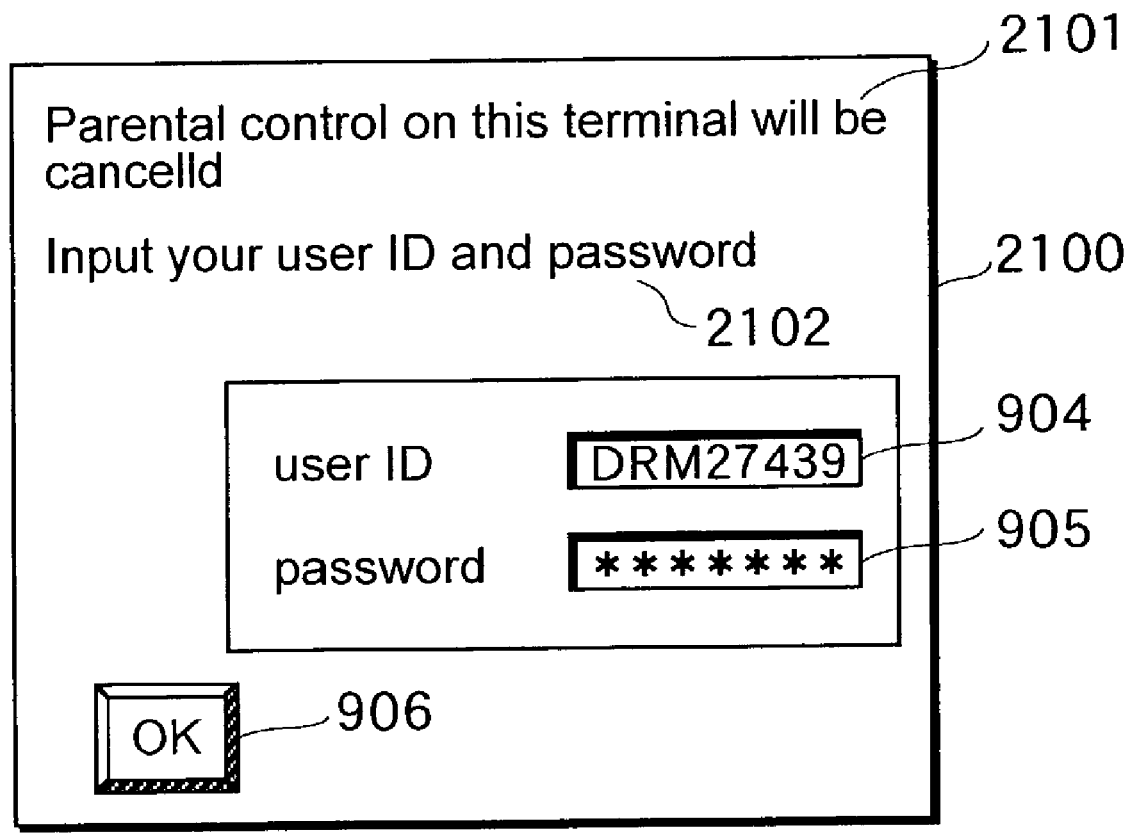
FIG. 21 is a diagram that shows a sample of a parental control terminal registration cancel screen which is displayed on the child terminal in response to the parental control terminal registration cancel request from the child terminal.

FIG. 20 is a flow chart that shows a processing procedure executed when the parent user "Nagaharu Edogawa" cancels the registration of the child terminal 150 with the terminal ID 301 "PAN333" which has been already registered according to the processing procedure as shown in FIG. 8. Assume that the parent user "Nagaharu Edogawa" decides to cancel the parental usage restriction on his elder daughter "Konatsu Edogawa" who has entered a high school. "Nagaharu Edogawa" has access to the right management server 110 via the child terminal 150 of his elder daughter "Konatsu Edogawa", and sends it the parental control terminal registration cancel request of the child terminal 150. FIG. 21 is a diagram that shows a sample of a parental control terminal registration cancel screen 2100 which is displayed on the child terminal 150 in response to the parental control terminal registration cancel request from the child terminal 150. As shown in this figure, on a parental control terminal registration cancel screen 2100, a message 2101, "Parental control on this terminal will be cancelled" and a guide message 2102 for guiding an input on the parental control terminal registration cancel screen 2100, "Input your user ID and password" are displayed. Below the guide message 2102, a user ID input box 904, a password input box 905 and an OK button 906 are displayed. The user ID input box 904, the password input box 905 and the OK button 906 have the same functions as those described in FIG. 9.

When the parent user "Nagaharu Edogawa" correctly inputs the authentication user ID 217 "DRM27439" and the password 218 "NA*I*SHO", which are the authentication information 610, into the user ID input box 904 and the password input box 905, and pushes the OK button 906 (S901), the communication unit 152 reads out the terminal ID 301 "PAN333" of the child terminal 150 from a ROM of itself (S902), attaches it to the parental control terminal registration cancel request including the authentication information 610 which is inputted on the parental control terminal registration cancel screen 2100, and sends it to the right management server 110.

In the right management server 110 that receives this parental control terminal registration cancel request, the parental control information management unit 118 searches the parental control information 600 using the authentication information 610 "DRM27439/NA*I*SHO" as a key, and if there is the parental control information 600 whose authentication information 610 is identical to this key, further searches the parental control information 600 corresponding to the terminal ID 301 "PAN333" among the parental control information 600, and deletes all the corresponding parental control information 600 from the parental control information database 114 (S903). The parental control information management unit 118 notifies the child terminal 150 that it cancelled the parental control terminal registration of the child terminal 150 (the terminal ID 301 "PAN333") and completes the processing. On the other hand, if there is no parental control information 600 whose authentication information 610 is identical to the key, or there is no parental control information 600 corresponding to the terminal ID 301 "PAN333" in the parental control information database 114, the parental control information management unit 118 notifies the child terminal 150 that the concerned child terminal 150 has not been registered, and completes the processing.

As described above, according to the parental control system 100 of the first embodiment, the right management server 110 that centrally manages the content usage right in the NetDRM content distribution system holds the parental control information 600, generates a child license ticket to which a parental usage restriction is added, and sends it back to the requesting child terminal 150. Therefore, the parental usage restriction can be easily modified, added and expanded just by expanding or reducing the usage rule in the right information 400 under the management of the right management server 110. As a result, there are effects that the right management server 110 can add the parental usage restrictions on the right information 400 and the license ticket in various manners, and restrain the load on the child terminal 150 in the parental control system 100 so as to realize the child terminal 150 in a simple structure. Furthermore, the license ticket processing unit 154 of the child terminal 150 monitors the content reproduction condition of the content reproduction unit 156 at regular time intervals, and collates with the usage rule of the license ticket. Therefore, there is an effect that the content reproduction processing executed by the content reproduction unit 156 can be controlled faithfully according to the usage rule of the license ticket, even if the content is reproduced continuously.

Also, it is assumed that, in the parental control system 100 of the first embodiment, the parent user sets a standby time for having the license ticket generation unit 117 delay the generation of the license ticket in the parental control information 600, in response to the license ticket issuance request from the child terminal 150, and during that standby time, the parent terminal 140 or the parent user makes the parental usage restriction setting request. In this case, the parent user can access the right management server 110 and set the parental restriction on the license ticket requested by the child user during the time from the child's license ticket issuance request up to his receipt of the corresponding license ticket. Therefore, there is an effect that the parent user can cancel the issuance of the license ticket requested by the child user before it is completed or modify the requested usage number or usage duration.

Furthermore, in the first embodiment, the content usage restriction is put on the child terminal 150 in such a way that the license ticket generation unit 117 in the right management server 110 adds the usage restriction based on the parental control information 600 to the license ticket. However, the usage restriction may be put in other methods. For example, a signal or a command may be set in advance for suspending the reproduction by the content reproduction unit 156 of the child terminal 150 between the parent terminal 140 and the right management server 110 and between the child terminal 150 and the right management server 110 in the parental control system 100. In this method, the parent user inputs the signal or the command on the parent terminal 140 so as to temporarily suspend or cancel the reproduction by the content reproduction unit 156 via the right management server 110.

In the first embodiment, in response to the license ticket issuance request from the child terminal 150 on which the parental usage restriction is set, the right management server 110 does not have the child terminal 150 exercise the portion of the right that is to be deducted from the original right information 400 which is expected to be used on the child terminal 150, but has it use the content only for the portion of the usage on which the restriction is set. Therefore, the right management server 110 may store the content use history by each user in the right management server 110, and issue an additional license ticket as a customer service for the child terminal 150 within a predetermined range depending upon the content usage amount by the user of the concerned child terminal 150, his parent user, or a user of another child terminal 150 whose credit card number 219 is identical to that of the parent user. This can be realized within the range of the parental usage restriction even if the license ticket issuance request from the child terminal 150 exceeds the range of the content usage right corresponding to the right information 400 of the child user, when the content usage for one month exceeds a certain amount of money for the whole family of the user of the terminal 150 in total.

In the first embodiment, since the encrypted content can be received from the content distribution server 130 on the communication network 160 as needed, the user who received the content in advance has stored it in the content storage unit 155, and purchases the license ticket of the content when he actually uses the content. However, the parental control system according to the present invention is not limited to the first embodiment, and the right management server 110 may dynamically issue the license ticket before or in parallel with the distribution of the content, if the content is a stream reproduction content or an on-line game, etc.

In the first embodiment, when the parental control terminal registration request is made, the user information management unit 115 conducts authentication using the authentication information 610 included in the parental control terminal registration request, and collates the credit card number 219 of the child terminal 150 registered by the parental control terminal registration request with that of the parent user whose authentication information 610 is registered so as to confirm the parent-child relationship between the user who makes the parental control terminal registration request and the user of the child terminal 150. However this parent-child relationship need not always be confirmed. In other words, the parental control terminal registration of the child terminal 150 may be made only according to the authentication using the authentication information 610. In this case, the registration of the child terminal 150 in the terminal information database 112, the registration of the child user in the user database 111 and the purchase of the content usage right for the child user may be omitted.

In the first embodiment, in response to the license ticket issuance request from the child terminal 150 whose terminal ID 301 is not registered in the parental control information database 114, the license ticket generation unit 117 generates the license ticket same as that for the adults without parental usage restriction, and sends it to the child terminal 150. However, the present invention is not always limited to this embodiment. The license ticket issuance processing may be interrupted so as to stop the issuance of the license ticket by regarding all the terminals whose authentication user IDs 217 and passwords 218 are not registered in the user information 200 as child terminals 150 which are prohibited from using contents. Also, in the first embodiment, the license ticket that is the same as that for the adults is generated so as to send it to the child terminal 150 whose terminal ID 301 only is registered in the parental control information database 114 but on which the parental usage restriction is not set. However, it may be configured not to issue any license ticket to the child terminal 150 by interpreting this (the registration of the terminal ID 301 only in the parental control information database 114) as parental control information 600 to the effect of completely prohibiting the content usage by the child terminal 150.

In the first embodiment, it is assumed that each child terminal 150 is used by a specific user. However, the parental control system of the present invention is not limited to this embodiment. When a plurality of children use one child terminal 150, the request unit 151 of the child terminal 150 may request the user to input his authentication user ID 217 on the menu screen per entry, and send each license ticket issuance request including the terminal ID 301 of the child terminal 150 and the inputted authentication user ID 217. In this case, the parental control information unit 118 prepares and manages the parental control information 600 in the parental control information database 114 per terminal ID 301, and further per authentication user ID 217 of each child user, reads out the parental control information 600 corresponding to the authentication user ID 217 included in the license ticket issuance request from among the parental control information 600 identified with the terminal ID 301, and passes the usage restriction by the read-out parental control information 600 to the license ticket generation unit 117.

In the first embodiment, the authentication user ID 217 and the password 218 are used as the authentication information 610 for setting the parent user to set the parental usage restriction on the child terminal 150. However, the present invention is not limited to this embodiment. Either one of them, the terminal ID 301 of the parent terminal 140, or specific information generated by an arbitrary system may be used for authentication.

In the flow chart as shown in FIG. 10, the parental user performs the processing for setting a parental usage restriction in the order of the authentication for the parent user, selection of the child terminal 150 on which the parental usage restriction is to be set, selection of the content group on which the parental usage restriction is to be set, and setting of the parental usage restriction. However, this processing order may be changed, and if the parent user knows the terminal ID 301 of each child terminal 150 or what kind of right information 400 is to be used on which child terminal 150, he needs not input according to the parental usage restriction setting screen of the right management server 110, but may input the terminal ID 301, the right information ID 403 and the content ID 422 directly on another input screen.

Furthermore, in the flow chart as shown in FIG. 19, the child terminal 150 interprets the license ticket 2 and then interprets the license ticket 1 as the processing procedure for the content usage. However, the present invention is not limited to that, and the child user may interpret the license ticket 1 first, and then interpret the license ticket 2.

Also, in this flow chart, the child terminal 150 once stores the license ticket received from the right management server 110 in the license ticket storage unit 153, but the present invention is not limited to that. The child terminal 150 may interpret the license ticket just after acquiring it from the right management server 110, and start reproduction of the content.

Furthermore, in the first embodiment, in response to the license ticket issuance request from the child terminal 150, the license ticket generation unit 117 does not interpret the parental usage restriction passed from the parental control information management unit 118, but just finds out the logical product of the corresponding usage rules so as to generate the license ticket 3 indicating the usage rule of the logical product, even if it performs any processing. However, the present invention is not limited to that, and the license ticket generation unit 117 may interpret the parental usage restriction passed from the parental control information management unit 118, and send a notice to the child terminal 150 that the reproduction of the content is not permitted, without generating a license ticket if the license ticket under the license ticket issuance request does not permit the reproduction of the corresponding content group. Also, if the license ticket generation unit 117 interprets the parental usage restriction passed from the parental control information management unit 118 after generating the license ticket 1 and finds out the logical product of the corresponding usage rules, or if the reproduction of the corresponding content is not permitted because its effective period has expired or it is an adult one, it may abandon the license ticket 1.

In the first embodiment, the parental usage restrictions set by the parent user are all described in the license ticket 2, but the present invention is not limited to that. The parental usage restrictions which are described in the license ticket may include information indicating whether the content can be used or not and the supplementary information such as usage number or usage duration. In this case, as for the complicated parental usage restriction which is customized by the parent user, a flag indicating whether there is such a parental usage restriction or not can be described in the license ticket. And if it is indicated that the customized parental usage restriction is set on the license ticket, the child terminal 150 may access the right management server 110 as needed for inquiry, further interpret the parental usage restriction that is an answer to that inquiry, and decide whether the content can be used or not.

Furthermore, in the first embodiment, the license ticket 1 and the license ticket 2 respectively indicate the usage rules that can derive the consistent logical product, but the present invention is not limited to that. Even if the license ticket 1 and the license ticket 2 are inconsistent with each other, the priority may be set for indicating which usage rule should be adopted if they are inconsistent.

The Second Embodiment

The second embodiment of the present invention will be explained below in detail with reference to figures.

Figure 22:
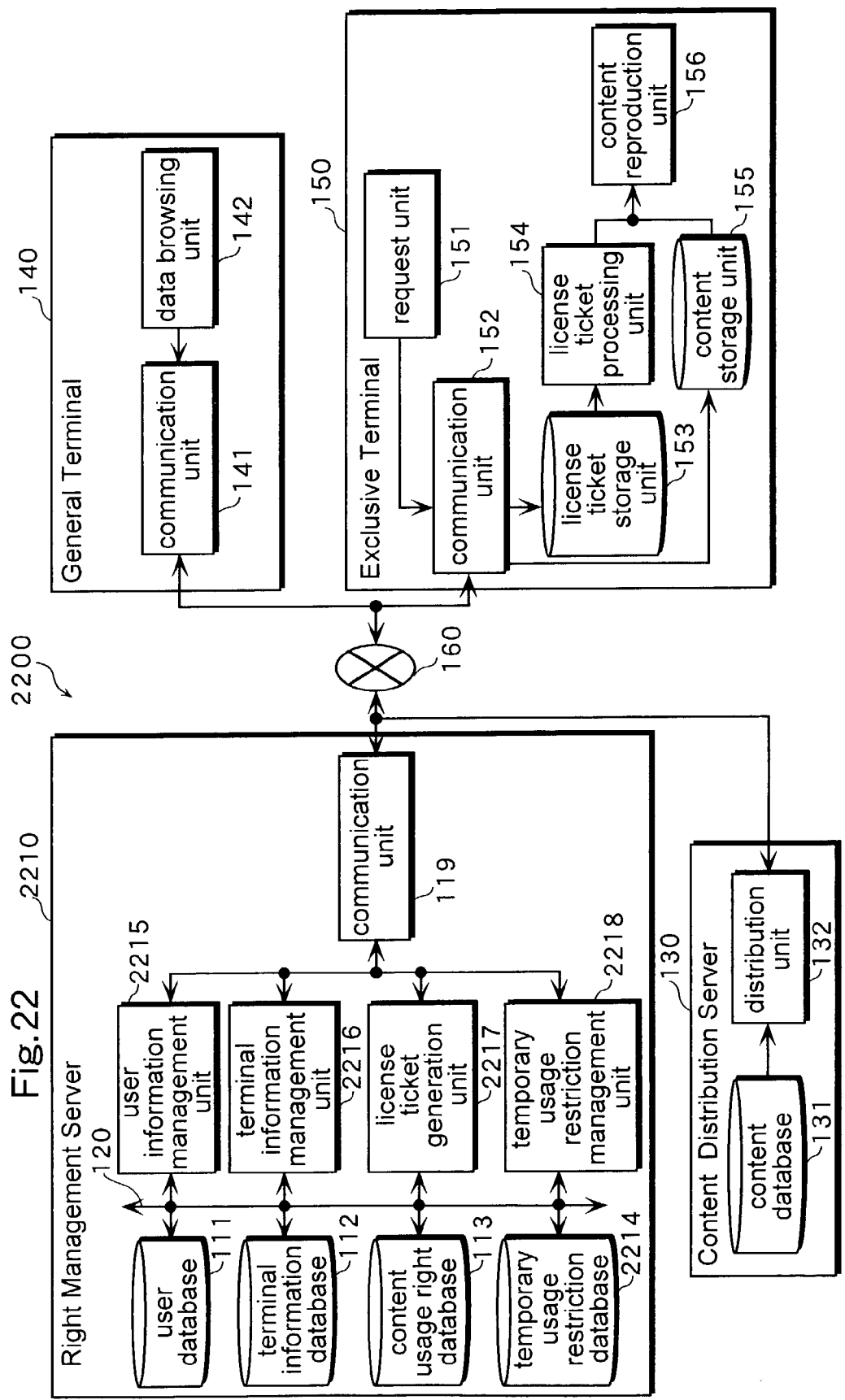
FIG. 22 is a block diagram that shows a structure of a temporary usage restriction system according to the second embodiment of the present invention.

FIG. 22 is a block diagram that shows a structure of a temporary usage restriction system 2200 according to the second embodiment of the present invention. In this figure, as for the components identical to those of the parental control system according to the first embodiment as shown in FIG. 1, the same numerical references are attached to them, and the explanation of them will be omitted. Also, since a general terminal 140 and an exclusive terminal 150 in FIG. 22 have the same structures as the parent terminal 140 and the child terminal 150 in FIG. 1, respectively, the same numerical references are attached to them, and the explanation of them will be omitted. The temporary usage restriction system 2200 is a NetDRM content distribution system that permits registration of plurality of users on one terminal. It includes a right management server 2210, a content distribution server 130, a general terminal 140, an exclusive terminal 150 and a communication network 160. In the temporary usage restriction system 2200 of the second embodiment, since there is no distinction of users of the terminals between a parent and a child, and there is also no difference of functions between the general terminal 140 and the exclusive terminal 150, the following explanation will be made on the assumption that each user uses the exclusive terminal 150.

The right management server 2210 is a server for centrally controlling a license in the NetDRM content distribution system, and putting restrictions on the content usage by another person when a user has the other person use temporarily the terminal registered for the user himself. It includes a user database 111, a terminal information database 112, a content usage right database 113, a temporary usage restriction database 2214, a user information management unit 2215, a terminal information management unit 2216, a license ticket generation unit 2217, a temporary usage restriction management unit 2218, a communication unit 119 and a bus 120.

The temporary usage restriction database 2214 stores in itself a temporary usage restriction on a temporary user's usage of a content which is generated by the temporary usage restriction management unit 2218 according to a temporary usage restriction setting request by a user per terminal ID of the exclusive terminal 150 and user ID of the temporary user registered in the temporary usage restriction database 2214 in advance. Differently from the user information management unit 115 of the first embodiment, the user information management unit 2215 performs authentication processing for all the users who send requests to the right management server 2210, and accepts registration of the authentication information 610 (the authentication user IDs 217 and the passwords 218) for all the users who are to be registered to obtain the authentication by the right management server 2210. The user information management unit 2215 further identifies the user based on the authentication information 610 or the authentication user ID 217 according to the notice from the temporary usage restriction management unit 2218, and notifies the temporary usage restriction management unit 2218 of the user ID 203 of the identified user.

The terminal information management unit 2216 registers the terminal ID 301 in the terminal information 300 and the corresponding user ID 203 of the temporary user, or deletes the user ID 203 of the temporary user corresponding to the terminal ID 301 in the terminal information 300, according to the temporary user registration instruction or the temporary user registration deletion instruction from the temporary usage restriction management unit 2218. Also, the terminal information management unit 2216 identifies users who are registered in the terminal information 300 based on the terminal IDs 301 which are attached to various requests received in the communication unit 119. When the license ticket generation unit 2217 receives, from the terminal for which a plurality of users are registered, the license ticket issuance request in which the owner of the right information 400, the basis for the issuance of the license ticket, is not identified, it identifies the right information 400 that permits the usage of the requested content among the right information 400 corresponding to a plurality of user IDs 203 further corresponding to one terminal ID 301 in the terminal information 300. When there are a plurality of the identified right information 400, the license ticket generation unit 2217 further displays the user name of the owner of each right and the balance available for the content on the exclusive terminal 150 so that the user can select one of the identified right information 400. On the other hand, when the license ticket generation unit 2217 receives, from the terminal for which a plurality of users are registered, the license ticket issuance request in which the owner of the right information 400 is identified with the authentication information 610, it generates the license ticket based on the right information 400 of the user identified with the authentication information 610 for the exclusive terminal 150. Upon receiving the notice from the temporary usage restriction management unit 2218, the license ticket generation unit 2217 issues the license ticket with the temporary usage restriction registered in the temporary restriction database 2214 being appended to, in response to the license ticket issuance request from the temporary user registered in the temporary usage restriction database 2214.

In response to the requests from the user which are received in the communication unit 119, the temporary usage restriction management unit 2218 searches the temporary usage restriction database 2214 using the terminal ID 301 attached to the request, and decides whether the requesting exclusive terminal 150 is registered in the temporary usage restriction database 2214 or not. If it is registered in the temporary usage restriction database 2214, the temporary usage restriction management unit 2218 identifies the user based on the authentication information 610 included in the request. If the identified user is a temporary user, the temporary usage restriction management unit 2218 decides whether the request is permitted by the temporary usage restriction or not, and notifies each of the corresponding units to meet the request if it is permitted. If it is not permitted, the temporary usage restriction management unit 2218 has the communication unit 119 send the notice to the effect that the request cannot be met, and completes the processing for responding the request in the right management server 2210. When the requesting exclusive terminal 150 is not registered in the temporary usage restriction database 2214, nor it is not a temporary user, the temporary usage restriction management unit 2218 performs an ordinary processing for responding to the request.

When the temporary usage restriction management unit 2218 receives a temporary user registration request from a user who is not prohibited to make this request under the temporary usage restriction, it accepts the input from the user interactively, and registers the temporary user in the concerned terminal. More specifically, when the temporary usage restriction management unit 2218 receives the temporary user registration request from the user who is not prohibited to make this request under the temporary usage restriction, it requests the requesting exclusive terminal 150 to input the authentication user ID 217 of the temporary user on an interactive screen. Once receiving the authentication user ID 217 of the temporary user from the exclusive terminal 150, the temporary usage restriction management unit 2218 notifies the user information management unit 2215 of the authentication user ID to have it identify the user ID 203 of the temporary user. Next, the temporary usage restriction management unit 2218 notifies the terminal information management unit 2216 of the identified user ID 203, and instructs it to register the user ID 203 of the temporary user in the terminal information 300 correspondingly to the terminal ID 301 attached to the request. When the request which is permitted under the temporary usage restriction is the license ticket issuance request, for example, the temporary usage restriction management unit 2218 notifies the license ticket generation unit 2217 that the temporary user makes the request, and further notifies it of the temporary usage restriction which is set on the temporary user.

FIG. 23 is a diagram that shows a sample of a data structure of a temporary usage restriction 2300 stored in the temporary usage restriction database 2214 as shown in FIG. 22. As shown in this figure, in the temporary usage restriction database 2214, the temporary usage restriction 2300 is stored correspondingly to the terminal ID 301 of the exclusive terminal 150, the temporary user's ID 2310 and the right owner user's ID 2311. The temporary usage restriction 2300 is further described per right information ID 403 of the right information 400 which can be used in the exclusive terminal 150. Since the temporary usage restriction 2300 is stored correspondingly to the right owner user's ID, it can be set for each user of the right owner and for each right information 400 more specifically. Also, the effective period start time 404 of the right which the temporary user can use is not limited as the right effective period, but the effective period end date is just set here. However, both of the effective period start time and end time may be set, as in the case of the parental control information 600 as shown in FIG. 6.

The items that are the same as those of the parental control information 600 as shown in FIG. 6 can be set for the temporary usage restriction 2300 as well as the items such as a terminal operation restriction 2301 and a terminal registration expiration date 2302. A request ID for identifying a request which an original user can permit for a temporary user is described in the terminal operation restriction 2301. This terminal operation restriction 2301 is provided for preventing the right management server 110 from responding and executing the request which should not be made by users other than the original user, although it is desirable for the original user to make requests freely using his own exclusive terminal 150. The requests which should not be made by other users than the original user includes, for example, a request on right transfer (such as right return or assignment). An expiration date for registering the temporary user in the terminal information 300 in the terminal information database 112 is described in the terminal registration expiration date 2302. Thereby, when the date described in the terminal registration expiration date 2302 expires, the temporary user's ID 2310 registered in the terminal information 300 in the terminal information database 112 is deleted. The temporary usage restriction 2300 corresponding to the terminal ID 301 registered in the temporary usage restriction database 2214 and the temporary user's ID 2310 is also deleted.

Figure 24:
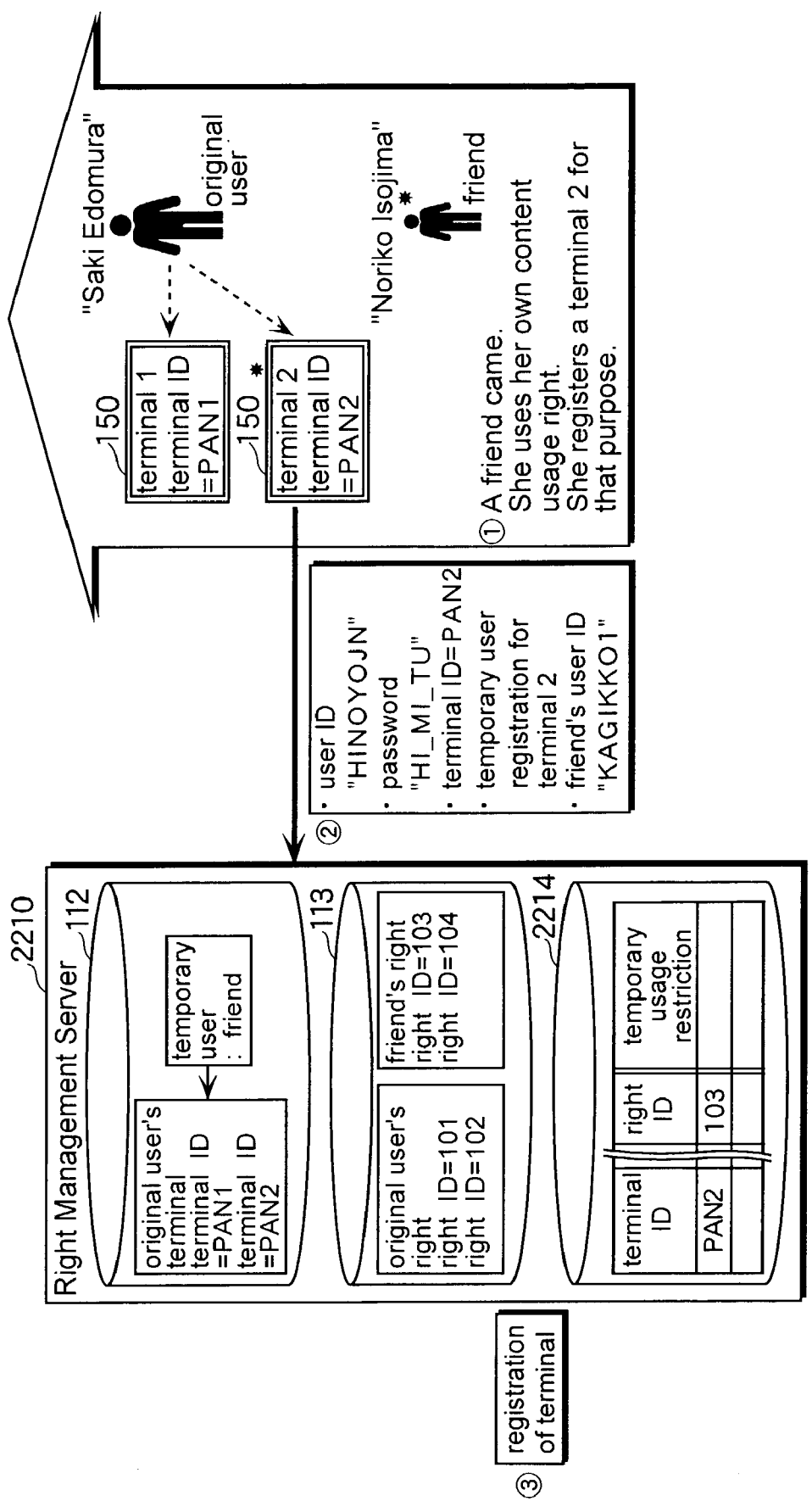
FIG. 24 is a diagram that shows a processing procedure executed when a user sets a temporary usage restriction on a temporary user.

FIG. 24 is a diagram that shows a processing procedure executed when a user sets a temporary usage restriction on a temporary user. Assume that "Noriko Isojima", a user of the NetDRM content distribution system stays during holidays in the house of her friend "Saki Edomura" who is also a user of the Net DRM content distribution system, and they play a content at the same time. "Saki Edomura" registers a terminal 1 (the terminal ID 301 "PAN1") and a terminal 2 (the terminal ID 301 "PAN2") in the terminal information database 112 as exclusive terminals 150 for herself, and owns the right of the right information ID 403 "101" and "102". Furthermore, she registers her authentication information 610, that is, the authentication user ID 217 "HINOYOJN" and the password 218 "HI_MI_TU" in the user database 111. On the other hand, her friend "Noriko Isojima" owns the right of the right information ID 403 "103" and "104" in the content usage right database 113, and registers her authentication information 610, that is, the authentication user ID 217 "KAGIKKO1" and the password 218 "OSHIENAI" in the user database 111. Since both of the original user "Saki Edomura" and her friend "Noriko Isojima" have the right of the right information ID 403 "102" and the right of the right information ID 403 "103" which are the usage rights for the same content "On-line game: Panalis", respectively, the original user has her friend use the terminal 2 registered for the user herself, and the friend plays the content "On-line game: Panalis" together with the original user using her own right of the right information ID 403 "103".

Figure 25:
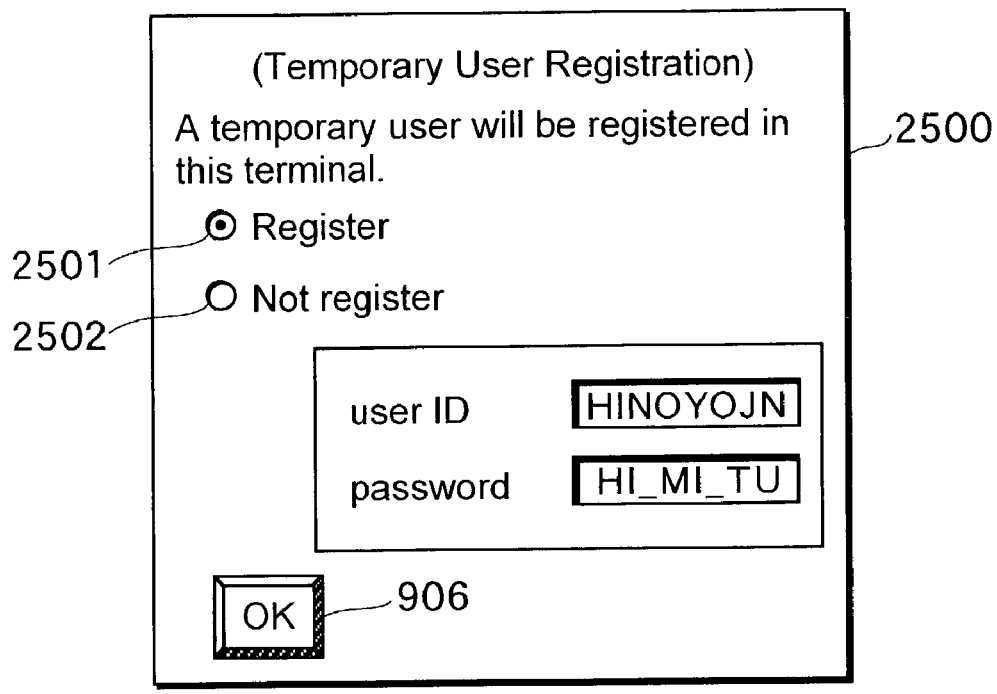
FIG. 25 is a diagram that shows a sample of an input screen displayed for a temporary user registration request selected on the initial screen.

The original user first selects a button "Temporary User Registration" on the initial screen of the terminal 2, and inputs the authentication user ID 217 "HINOYOJN" and the password 218 "HI_MI_TU" on the next screen. FIG. 25 is a diagram that shows a sample of an input screen 2500 displayed for the temporary user registration request selected on the initial screen. As shown in this figure, a check buttons 2501 and 2502 for selecting either "Register" or "Not register" are displayed on the input screen 2500, and below them, a user ID input box 904, a password input box 905 and an OK button 906 are displayed. The user ID input box 904, the password input box 905 and the OK button 906 have the same functions as those described in FIG. 9. In this sample, the authentication user ID 217 "HINOYOJN" of the original user "Saki Edomura" is described in the user ID input box 904, and the password 218 "HI_MI_TU" is described in the password input box 905. Also, the check button 2501 is checked for selecting "Register".

Figure 26:
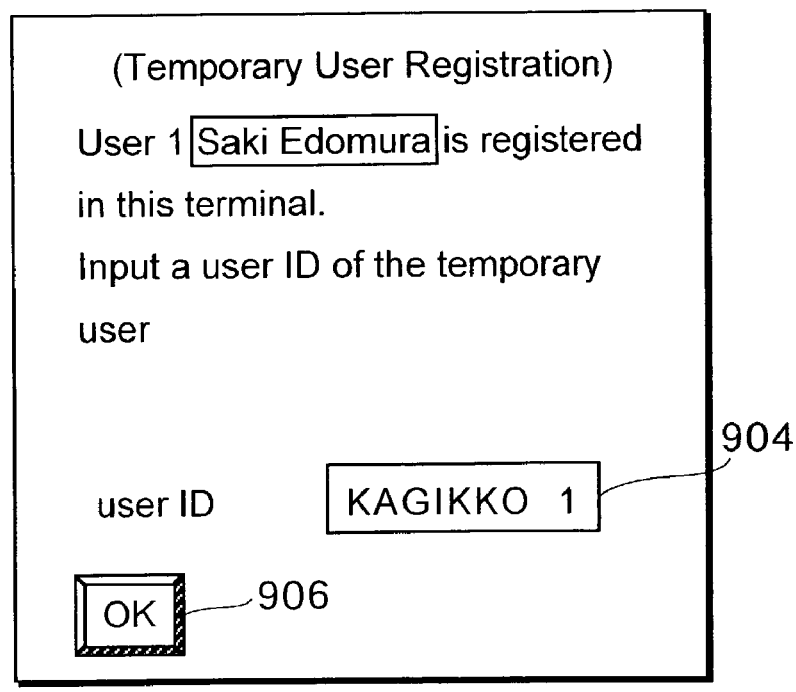
FIG. 26 is a diagram that shows a sample of an input screen that requests an input of a user ID to identify a temporary user in response to the temporary user registration request.

When the original user "Saki Edomura" pushes the OK button 906 on the screen, the terminal ID 301 "PAN2" is automatically read out from inside of the terminal 2, and sent to the right management server 2210 together with the temporary user registration request. In the right management server 2210 that receives them, the temporary usage restriction management unit 2218 searches the temporary usage restriction database 2214 using the terminal ID 301 "PAN2", and checks whether the terminal 2 is registered in the temporary usage restriction database 2214 or not. As a result of the check, it is found that the terminal 2 of the terminal ID 301 "PAN2" has not yet been registered in the temporary usage restriction database 2214. Also, the user ID 203 "USO450" of the original user "Saki Edomura" is identified by the user information management unit 2215 based on the authentication information 610 of the original user (the authentication user ID 217 "HINOYOJN" and the password 218 "HI_MI_TU"), and confirmed to be identical to the user ID 203 "USO450" identified by the terminal information management unit 2216. As a result, since the original user "Saki Edomura" is the user having the legitimate right who is registered correspondingly to the terminal 2 of the terminal ID 301 "PAN2", the temporary usage restriction management unit 2218 accepts the temporary user registration request from the terminal 2. The right management server 2210 sends the next input screen to the requesting terminal 2, and requests the input of the authentication user ID 217 of the temporary user. FIG. 26 is a diagram that shows a sample of an input screen 2600 that requests an input of a user ID to identify a temporary user in response to the temporary user registration request. As shown in this figure, on the input screen 2600, it is reported that the original user "Saki Edomura" is registered correspondingly to the terminal 2, and further, the user ID input box 904 for requesting the input of the authentication user ID 217 to identify the user whom the original user wants to register as a temporary user is displayed.

Figure 27:
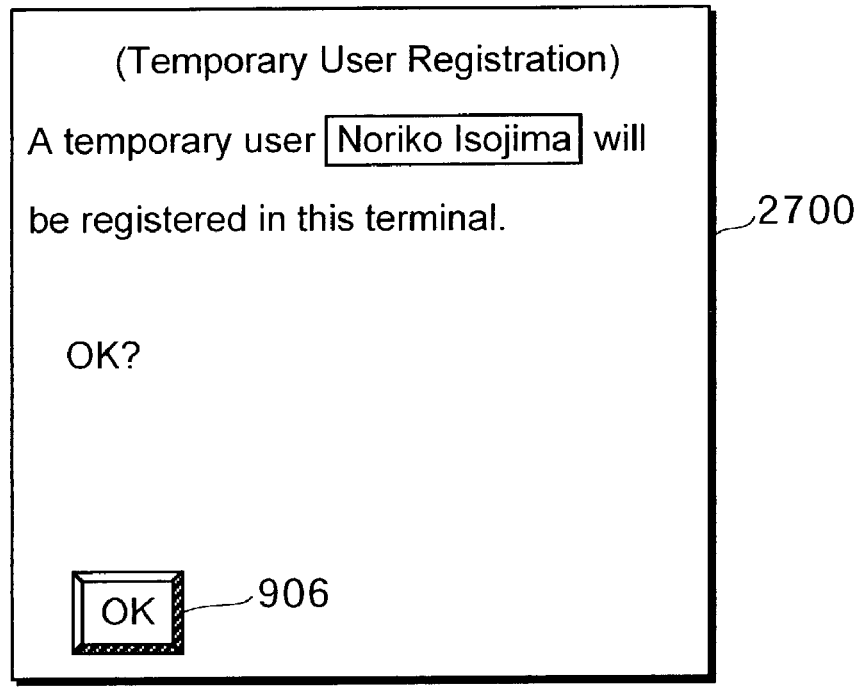
FIG. 27 is a diagram that shows a sample of a confirmation screen that confirms the temporary user identified by inputting the authentication user ID.

The original user "Saki Esomura" inputs the authentication user ID 217 "KAGIKKO1" of her friend "Noriko Isojima" that she tells, pushes the OK button 906 and sends the input to the right management server 2210. The right management server 2210 that receives it identifies the user ID 203 "USO086" of her friend based on the authentication user ID 217 "KAGIKKO1", and sends the confirmation screen displaying the identified user name 212 to the terminal 2. FIG. 27 is a diagram that shows a sample of the confirmation screen 2700 that confirms the temporary user identified by inputting the authentication user ID 217. When the message that "The temporary user "Noriko Isojima" will be registered in this terminal. OK?" on the confirmation screen 2700, the original user confirms the friend's name, pushes the OK button 906, and then sends it to the right management server 2210. In the right management server 2210, the terminal information management unit 2216 registers the user ID 203 "USO086" of the friend correspondingly to the terminal ID 301 "PAN2" in the terminal information 300 in the terminal information database 112, and the temporary usage restriction management unit 2218 registers the terminal ID 301 "PAN2" and the user ID 203 "USO086" in the temporary usage restriction database 2214.

Furthermore, in the right management server 2210, the temporary usage restriction management unit 2218 notifies the terminal information management unit 2216 of the terminal ID 301 "PAN2" so as to have it identify all the user IDs 203 corresponding to the terminal ID 301 "PAN2", and has the license ticket generation unit 2217 search for the right information IDs 403 of the right information 400 corresponding to all the identified user IDs 203. The temporary usage restriction management unit 2218 registers the right information IDs 403 which the license ticket generation unit 2217 has found in the corresponding portions in the temporary usage restriction database 2214 for every user ID 203 of the right owner.

Figure 28:
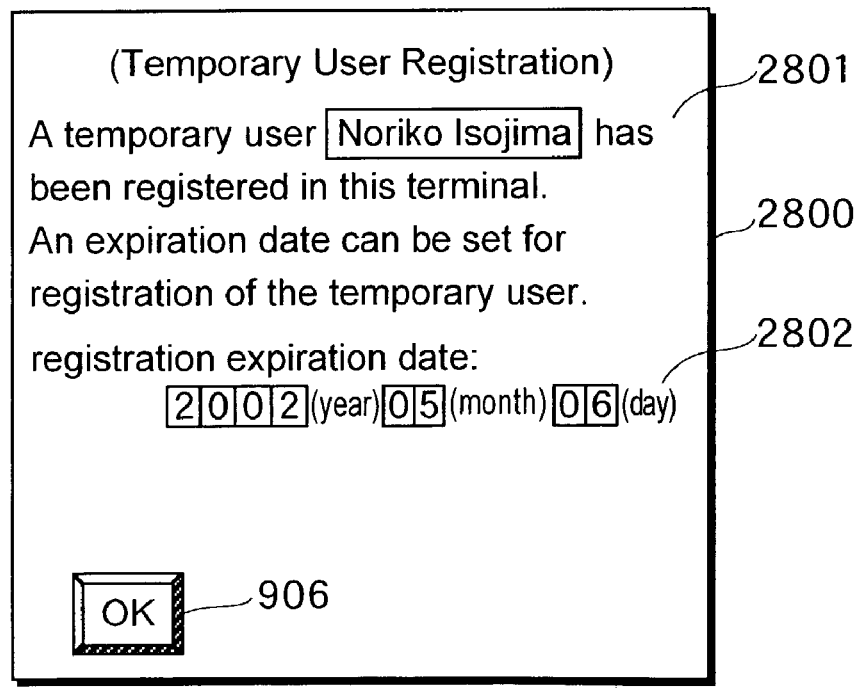
FIG. 28 is a diagram that shows a sample of an input screen that displays the registration result of the temporary user to the user and accepts a setting of a registration expiration date of the temporary user.

FIG. 28 is a diagram that shows a sample of an input screen 2800 that displays the registration result of the temporary user to the user and accepts a setting of a registration expiration date of the temporary user. As shown in this figure, the right management server 2210 further sends the input screen 2800 indicating a guide message 2801 that "A temporary user "Noriko Isojima" has been registered in this terminal. An expiration date can be set for registration of the temporary user.", and an input box 2802 of "registration expiration date: ☐☐☐☐ (year) ☐☐ (month) ☐☐ (day)". Assume that the friend "Noriko Isojima" plans to go back home on May 6. When "20020506" is inputted in blanks of "registration expiration date: ☐ ☐ ☐ ☐ (year) ☐ ☐ (month) ☐ ☐ (day)" and the OK button 906 is pushed, the input of the registration expiration date on the input screen 2800, "20020506" is sent to the right management server 2210. This registration expiration date "20020506" is described in the items of the terminal registration expiration dates 2302 of all the temporary usage restrictions 2300 corresponding to the terminal ID 301 "PAN2" in the temporary usage restriction database 2214 and the temporary user's ID 2310.

Figure 29:
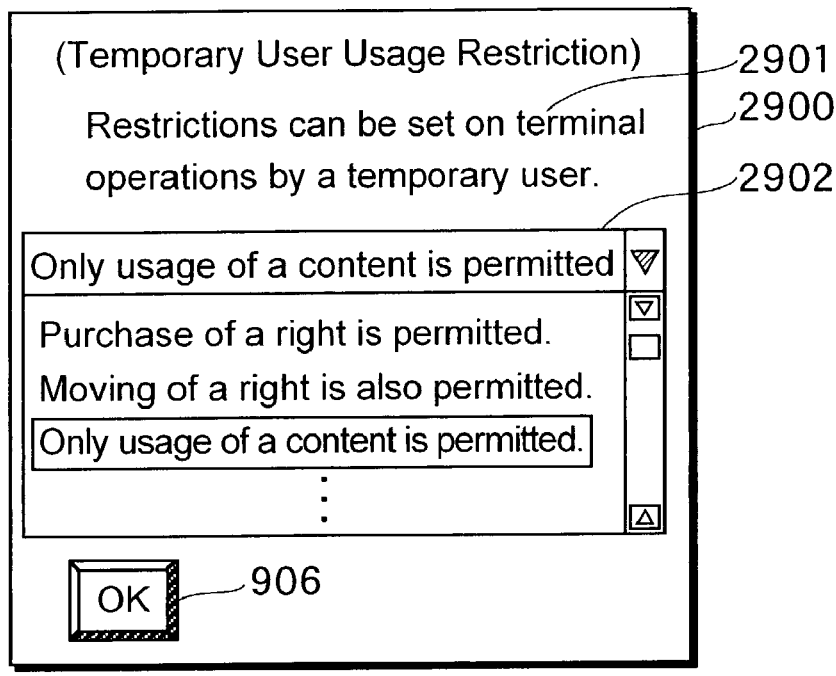
FIG. 29 is a diagram that shows a sample of an input screen for setting a restriction on the terminal operation by the temporary user.

Then, the right management server 2210 sends an input screen for setting a restriction on the terminal operation by the temporary user to the terminal 2. FIG. 29 is a diagram that shows a sample of an input screen 2900 for setting a restriction on the terminal operation by the temporary user. As shown in this figure, a guide message 2901 that "Restrictions can be set on terminal operations by a temporary user" and a selection input box 2902 for the original user to select one from a displayed list of choices of the terminal operation restrictions predetermined by the server are displayed on the input screen 2900. In the list of the choices of the terminal operation restrictions, "Purchase of a right is permitted", "Moving of a right is also permitted" and "Only usage of a content is permitted" and others are displayed. Each of these choices of the restrictions corresponds to an ID of the processing for the terminal operation restriction by the temporary user. When the original user "Saki Edomura" selects "Only usage of a content is permitted" and pushes the OK button 906, the ID for the corresponding processing is sent from the terminal 2 to the right management server 2210.

Figure 30:
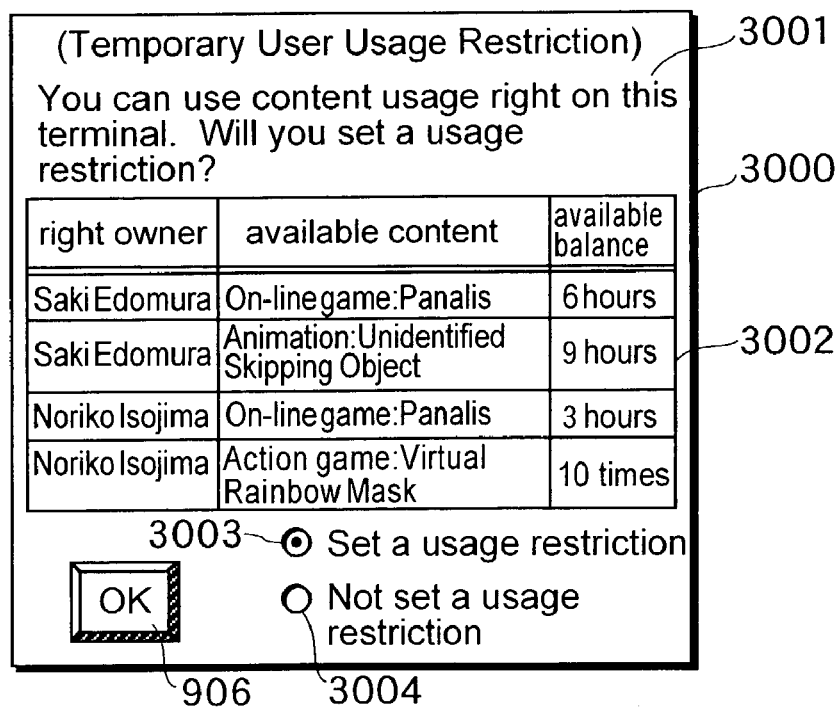
FIG. 30 is a diagram that shows a sample of an input screen that asks the user if he sets the usage restriction on the right usage by the temporary user.

In the right management server 2210 that receives the ID selected on the input screen 2900, the temporary usage restriction management unit 2218 describes an ID indicating an acceptance of "License ticket issuance request only" in all the items of the terminal operation restriction 2301 of the temporary usage restriction 2300 corresponding to the terminal ID 301 "PAN2" in the temporary usage restriction database 2214 and the temporary user's ID 2310. The temporary usage restriction management unit 2218 further lists and displays the rights owned by respective users registered in the terminal ID 301 "PAN2" to the user, prepares an input screen for inquiring whether the usage restriction is to be set or not on the temporary user's use of these rights, and sends it to the terminal 2. FIG. 30 is a diagram that shows a sample of an input screen 3000 for inquiring whether the usage restriction is to be set on the right usage by the temporary user. As shown in this figure, on the input screen 3000, a guide message 3001 "You can use content usage right on this terminal. Will you set a usage restriction?", contents that the temporary user can use on the terminal 2 and the balance available for the use of the contents, and the corresponding right owners are displayed as a right list 3002. On the bottom of the input screen 3000, check buttons 3003 and 3004 for selecting either "Set a usage restriction" or "Not set a usage restriction" are displayed. In this sample, the content usage right of "On-line game: Panalis" for 6 hours and the content usage right of "Animation: Unidentified Skipping Object" for 9 hours are displayed as the rights owned by the original user "Saki Edomura". Also, the content usage right of "On-line game: Panalis" for 3 hours and the content usage right of "Action game: Virtual Rainbow Mask" for 10 times are displayed as the rights owned by the friend "Noriko Isojima". The original user "Saki Edomura" wants to let her friend "Noriko Isojima" use her own usage right because the balance available for the content usage right of "On-line game: Panalis" for "Noriko Isojima" is very little. However, it is no good for the original user if the friend uses the content as much as she likes, so the original user checks the check button 3003 for selecting "Set a usage restriction". When she pushes the OK button 906, a command requesting the setting of more detailed content usage restriction is sent to the right management server 2210.

Figure 31:
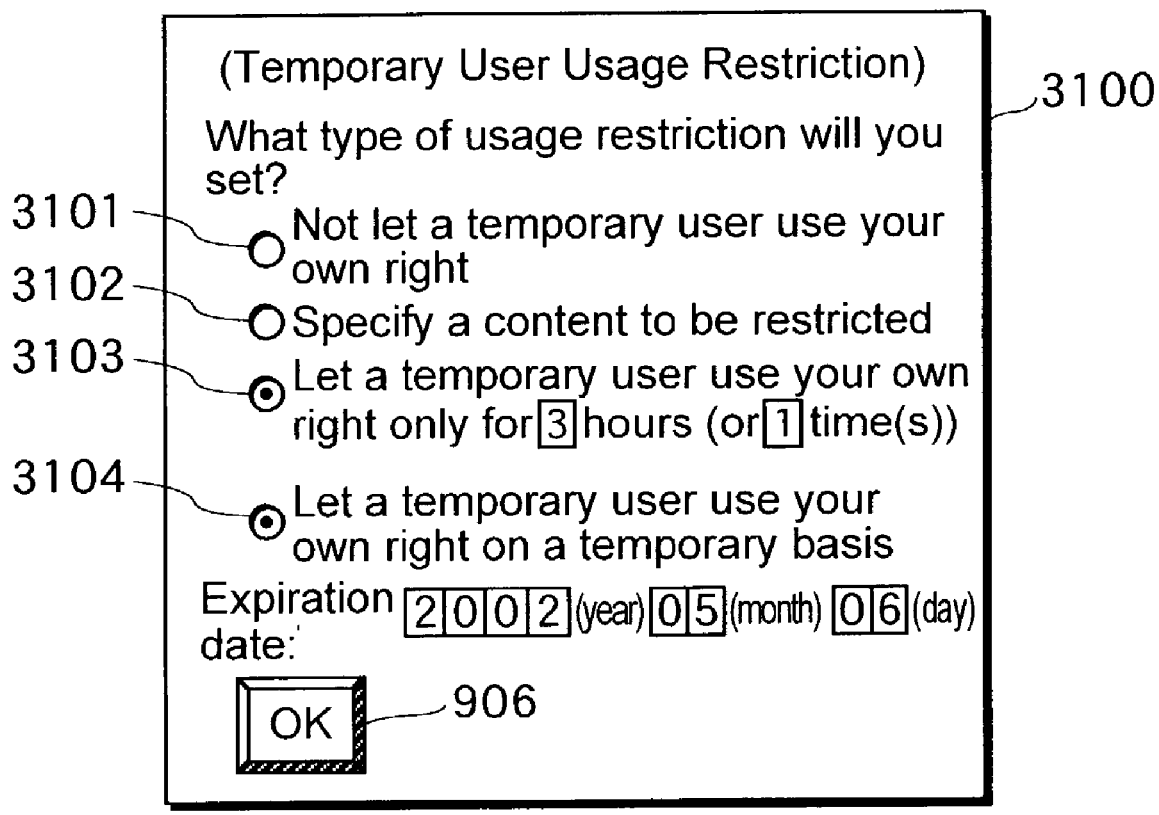
FIG. 31 is a diagram that shows a sample of an input screen that lists choices of the temporary usage restrictions and accepts the selection of restrictions by the user among them.

In the right management server 2210 that receives the command, the temporary usage restriction management unit 2218 reads out a temporary usage restriction template indicating the assumed choices of the temporary usage restrictions from the temporary usage restriction database 2214 to list them, and prepares an input screen for accepting the input for the user's selection. FIG. 31 is a diagram that shows a sample of an input screen 3100 that lists choices of the temporary usage restrictions and accepts the restrictions selected by the user among them. As shown in this figure, on the input screen 3100, a check button 3101 indicating "Not let a temporary user use your own right", a check button 3102 indicating "Specify a content to be restricted", a check button 3103 indicating "Let a temporary user use your own right only for ☐ hours (or ☐ times)", and a check button 3104 indicating "Let a temporary user use your own right on a temporary basis. Expiration date: ☐ ☐ ☐ ☐ (year) ☐ ☐ (month) ☐ ☐ (day)" are displayed. In this sample, the check buttons 3103 and 3104 are checked, and "3" and "1", and "2002", "05" and "06" are inputted in the input boxes ☐ for accepting the input of supplementary information, respectively. The above check buttons correspond to the IDs of the choices of the temporary usage restrictions in the temporary usage restriction template. When the OK button 906 is pushed, the ID of the choice of the temporary usage restriction selected by checking the check button and the result of the input into the corresponding supplementary information input box are sent to the right management server 2210.

In the right management server 2210 that receives them, the temporary usage restriction management unit 2218 describes the received ones from the terminal 2 into the corresponding items in the temporary usage restriction 2300. In this sample, the temporary usage restriction 2300 is set on the right information 400 of the right information IDs 403 "101 and "102", which are "the rights of the original user", based on the check button 3103 and the inputs into the corresponding input boxes on the input screen 3100. "180" (minutes) and "1" are described in the cumulative usage time restriction 605 and the usage number restriction 603 not shown in the figure of the temporary usage restriction 2300, respectively. Also, "20020506" is described in the right expiration date 2303 as shown in FIG. 23 of the temporary usage restriction 2300 corresponding to the right information 400 of the right information IDs 403 "101" and "102", which are "the rights of the original user", based on the check button 3104 and the inputs into the corresponding input boxes on the input screen 3100.

Furthermore, when the check button 3101 indicating "Not let a temporary user use your own right" is selected (although it is not selected in this sample), "0" (minute) and "0" are described in the cumulative usage time restriction 605 and the usage number restriction 603, respectively, of the temporary usage restriction 2300 corresponding to the right information 400 of the right information IDs 403 "101" and "102", which are "the rights of the original user". Note that a flag prohibiting content usage may be set in another item not shown here. Also, when the check button 3102 indicating "Specify a content to be restricted" is selected, the right management server 2210 generates a new input screen for accepting an input for selecting a content from among a list of all the contents available on the terminal 2, sends it to the exclusive terminal 150, and receives the right information ID 403 corresponding to the content selected on the input screen in return. The right management server 2210 further generates an input screen for setting a temporary usage restriction corresponding to the selected right information ID 403 and sends it to the exclusive terminal 150. By repeating this processing for each of the specified content, the right management server 2210 sets the temporary usage restriction on each right specified by the user.

Figure 32:
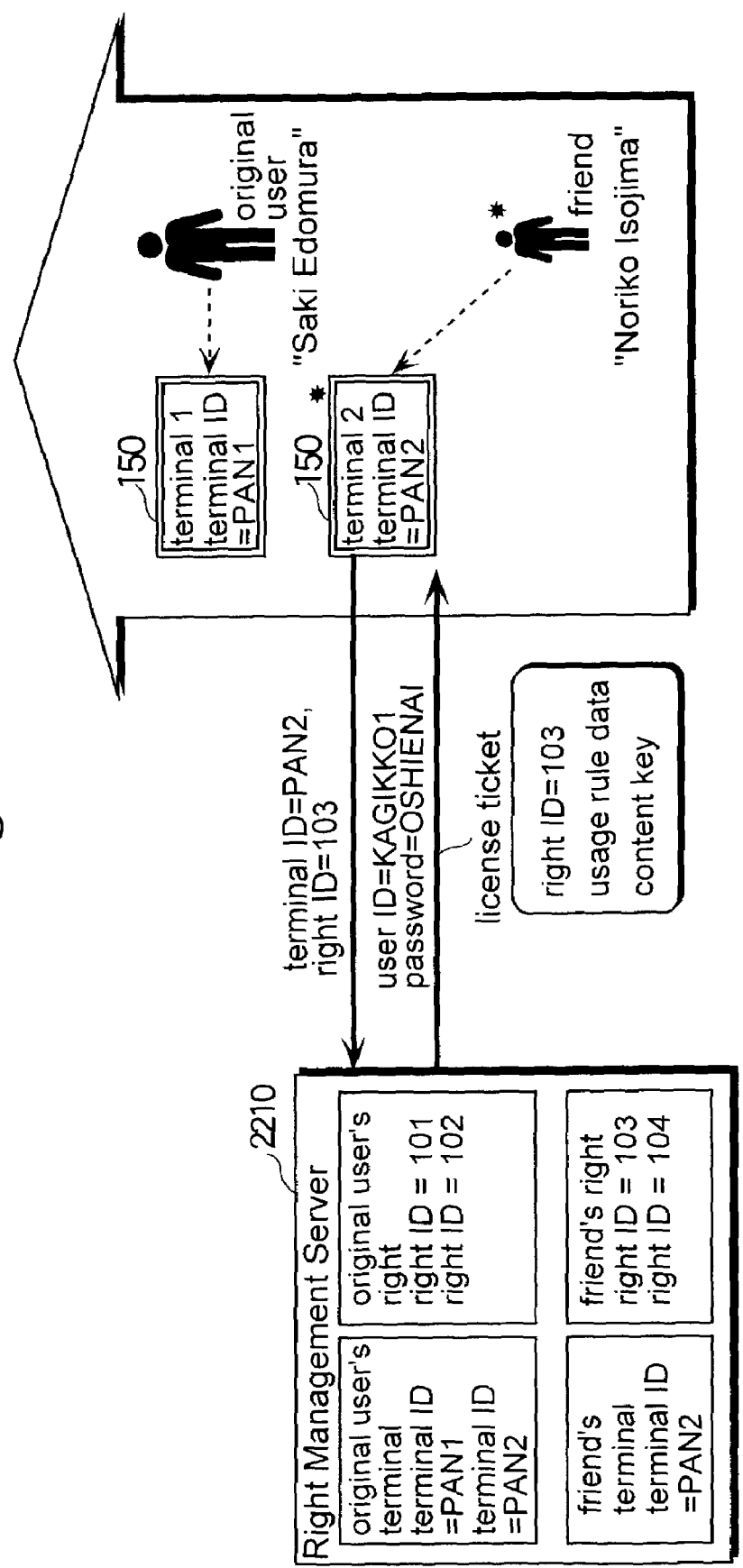
FIG. 32 is a diagram that shows a flow of the processing executed when the temporary user "Noriko Isojima" uses a content "On-line game: Panalis" using the terminal 2 on which the temporary usage restriction is set.

FIG. 32 is a diagram that shows a flow of the processing executed when the temporary user "Noriko Isojima" uses a content "on-line game: Panalis" using the terminal 2 on which the temporary usage restriction is set. The temporary user "Noriko Isojima" makes the license ticket issuance request on the terminal 2 in order to use the content "on-line game: Panalis". The temporary user "Noriko Isojima" selects the content "on-line game: Panalis" whose right is owned by "Noriko Isojima" from among the list of contents displayed similarly to that shown on FIG. 30 on the license ticket issuance request screen, inputs the authentication user ID 217 "KAGIKKO1" and the password 218 "OSHIENAI" in the authentication information input box, and pushes the OK button on the screen. As a result, the right information ID 403 of the right information 400 corresponding to the content selected on the license ticket issuance request screen, the authentication information 610 and the terminal ID 301 indicating the terminal 2 on which the request is made are sent to the right management server 2210.

In the right management server 2210 that receives them, the terminal information management unit 2216 identifies the user ID 203 of the user registered in the terminal information 300 based on the terminal ID 301 attached to the license ticket issuance request received in the communication unit 119. The user information management unit 2215 identifies the user ID 203 of the requesting user "Noriko Isojima" based on the authentication information 610 (the authentication user ID 217 "KAGIKKO1" and the password 218 "OSHIENAI") included in the license ticket issuance request. The temporary usage restriction management unit 2218 checks whether the user ID 203 identical to the user ID 203 identified by the user information management unit 2215 exists in the user ID 203 identified by the terminal information management unit 2216 or not, and if it does not exist, sends a screen displaying a notice that "'Noriko Isojima' cannot use this terminal because the user is not registered" or the like to the terminal 2, and completes the processing for meeting the license ticket issuance request.

Since the user "Noriko Isojima" of the user ID 203 "USO086" is registered for the terminal 2 of the terminal ID 301 "PAN2" in the terminal information 300, the temporary usage restriction management unit 2218 further searches the temporary usage restriction database 2214, and checks whether the requesting terminal 2 and user are registered in the temporary usage restriction database 2214 or not. If the requesting user is not a temporary user, the temporary usage restriction management unit 2218 notifies the license ticket generation unit 2217 that the requesting user is not a temporary user, and instructs it to meet the license ticket issuance request. Since the user "Noriko Isojima" is a temporary user registered in the temporary usage restriction database 2214 in this example, the temporary usage restriction management unit 2218 decides whether the license ticket issuance request made by the temporary user "Noriko Isojima" is permitted by the temporary usage restriction or not. Since it is described in the terminal operation restriction 2301 of the temporary usage restriction 2300 as shown in FIG. 23 that the license ticket issuance request is only permitted to the temporary user, the temporary usage restriction management unit 2218 instructs the license ticket generation unit 2217 to meet the license ticket issuance request. At that time, the temporary usage restriction management unit 2218 notifies the license ticket generation unit 2217 that the requesting user is a temporary user, and if any temporary usage restriction is set on the right information 400 of the right information ID 403 "103" of the concerned temporary user, it notifies the license ticket generation unit 2217 of the temporary usage restriction to be set.

Since the temporary user "Noriko Isojima" requests the issuance of the license ticket using her own right (the right information ID 403 "103") in this example, any temporary usage restriction is not set on the license ticket to be issued. If the temporary user "Noriko Isojima" requests to issue the license ticket for using the content "on-line game: Panalis" for "3 hours", the license ticket generation unit 2217 in the right management server 2210 issues the license ticket of the right information ID 403 "103" including the content key of the content "on-line game: Panalis" and the usage rule data indicating that the usage of this content for "3 hours" is permitted to the terminal 2.

On the other hand, assume that the temporary user "Noriko Isojima" selects the right information 400 of the right information ID 403 "101" whose right is owned by "Saki Edomura" from among the list as shown in FIG. 30, and requests to issue the license ticket for using the content "on-line game: Panalis" for "5 hours". Since the temporary usage restriction for permitting usage of "3 hours" only for a temporary user is set in the right information 400 of the right information ID 403 "101" with the input on the input screen 300 for setting the temporary usage restriction as shown in FIG. 31, the temporary usage restriction management unit 2218 notifies the license ticket generation unit 2217 of the temporary usage restriction (the effective period end time 405 "20020506" and the cumulative usage time "180" (minutes)) set on the right information 400 of the right information ID 403 "101", and instructs it to generate the temporary user license ticket.

The temporary user license ticket is generated in the same way as the child license ticket which is generated by the license ticket generation unit 117 in the parental control system 100 of the first embodiment. The license ticket 1 indicating ordinary content usage rules, that is, permitting usage of the content "on-line game: Panalis" for "5 hours", and the license ticket 2 indicating the temporary usage restrictions (the effective period end time 405 "20020506" and the cumulative usage time 414 "180" (minutes)) are generated by the license ticket generation unit 2217, and then the license ticket 3 that is a composition of the license tickets 1 and 2, indicating the effective period end time 405 "20020506" and the cumulative usage time 414 "180" (minutes), is generated, and then sent to the terminal 2. When the user "Noriko Isojima" uses the content "On-line game: Panalis" using this license ticket 3, her usage of the content is limited to "3 hours" according to the preset temporary usage restriction, although she requests the usage of "5 hours".

As described above, according to the temporary usage restriction system 2200 of the second embodiment, there is an effect that the temporary usage restrictions can be set in detail depending upon the cases for the temporary user who temporarily uses a content on another person's terminal, using the same structure as that of the parental control system 100 of the first embodiment.

In the temporary usage restriction system 2200 of the second embodiment, the terminal operation restriction 2301 and the terminal registration expiration date 2302 are added to the parental control information 600 as described in the first embodiment. However, the terminal operation restriction 2301 may be included in the parental control information 600. Also, in the temporary usage restriction system 2200, the right expiration date 2303 and the terminal registration expiration date 2302 are not specified in detail in time, but in year, month and day format. However, the present invention is not limited to that, and the right expiration date 2303 and the terminal registration expiration date 2302 may also be specified in more detail in year, month, day and time format. Furthermore, in the right expiration date 2303 and the terminal registration expiration date 2302, the date and time when these right and registration become effective may be specified, of course.

In the content usage right database 113 according to the first and second embodiments, the right information 400 is stored correspondingly to the users. However, the right information 400 need not be stored correspondingly to the users, but may be stored correspondingly to the terminals.

In the above embodiments, the authentication information 610 (the authentication user ID 217 and the password 218) is inputted by a user manually, but the present invention is not limited to that. For example, the right management server 2210 issues an IC card in which the authentication information 610 predetermined for each user is written to the user. In this case, the authentication information 610 of the user can be read out automatically from the IC card, on the condition that the user always inserts the IC card into each terminal when he uses a content on the terminal or sends any request to the right management server 2210.

INDUSTRIAL APPLICABILITY

The present invention can also be realized as a license management server or a terminal device that configures this license management system, as a usage restriction method, particularly a parental control method, executed by the license management server or the terminal device, or as a program that causes a general-purpose computer device to function a characteristic step in the usage restriction method and the parental control method. Also, such a program can be distributed via a recording medium such as a CD-ROM or a communication network.

The invention claimed is:

1. A license management server device for managing content usage on a terminal device, the license management server device comprising:
  a license information storage unit operable to store license information indicating a usage rule of a content for each terminal device or user;
  a usage restriction information management unit operable to acquire from a first terminal device or a first user an instruction to put a restriction on content usage on a second terminal device or by a second user, and usage restriction information indicating details of the restriction, and hold the usage restriction information; and
  a ticket issuance unit operable to acquire an instruction to request the content usage from the second terminal device or the second user, generate a license ticket that is information for permitting the content usage on the second terminal device or by the second user, under a usage rule with the restriction indicated by the usage restriction information which is held in the usage restriction information management unit, and send the license ticket to the second terminal device or the second user.

2. The license management server device according to claim 1,
  wherein the ticket issuance unit is operable to generate the license ticket by combining information indicating the usage rule for the requested content usage and information indicating the usage rule with the restriction.

3. The license management server device according to claim 1,
  wherein the ticket issuance unit is operable to acquire the instruction to request the content usage from the second terminal device or the second user, and send a first license ticket that is information for permitting the content usage under the usage rule indicated by the license information and a second license ticket indicating the usage rule with the restriction indicated by the usage restriction information, to the second terminal device or the second user.

4. The license management server device according to claim 1,
  wherein the usage restriction information indicates details of the restriction which is to be put on the content usage on the second terminal device, and
  the ticket issuance unit is operable to acquire the instruction to request the content usage from the second terminal device, generate the license ticket for permitting the content usage for any content on the second terminal device, under the usage rule with the restriction indicated by the usage restriction information, and send the license ticket to the second terminal device.

5. The license management server device according to claim 1,
  wherein the usage restriction information indicates details of the restriction which is to be put on the content usage by the second user, and
  the ticket issuance unit is operable to acquire the instruction to request the content usage from the second user, generate the license ticket for permitting the content usage by the second user, under the usage rule with the restriction indicated by the usage restriction information, and send the license ticket to the second user.

6. The license management server device according to claim 1,
  wherein the usage restriction information indicates details of the restriction which is to be put on the content usage on the second terminal device depending upon a content to be used, and
  the ticket issuance unit is operable to acquire the instruction to request the content usage from the second terminal device, generate the license ticket for permitting the usage of the requested content on the second terminal device, under the usage rule with the restriction indicated by the usage restriction information, and send the license ticket to the second terminal device.

7. The license management server device according to claim 1,
  wherein the usage restriction information indicates details of the restriction which is to be put on the content usage by the second user depending upon a content to be used, and
  the ticket issuance unit is operable to acquire the instruction to request the content usage from the second user, generate the license ticket for permitting the usage of the requested content by the second user, under the usage rule with the restriction indicated by the usage restriction information, and send the license ticket to the second user.

8. The license management server device according to claim 7,
wherein the ticket issuance unit is operable to acquire the instruction to request the content usage from the second terminal device or the second user, and does not accept the instruction when the restriction indicated by the usage restriction information is not put on the content.

9. The license management server device according to claim 6,
wherein the ticket issuance unit is operable to acquire the instruction to request the content usage from the second terminal device or the second user, and does not accept the instruction when the restriction indicated by the usage restriction information is not put on the content.

10. The license management server device according to claim 1, further comprising a stop unit operable to acquire an instruction to stop the usage on the second terminal device or by the second user from the first terminal device or the first user, and send a usage stop signal for stopping the usage on the second terminal device or by the second user immediately to the second terminal device or the second user.

11. The license management server device according to claim 1, further comprising a personal information storage unit operable to store personal information about the first user and the second user,
wherein the usage restriction information management unit is operable to hold the usage restriction information acquired from the first user for the second terminal device or the second user when there is a predetermined relationship between the first user and the second user based on the personal information.

12. The license management server device according to claim 11,
wherein the ticket issuance unit is operable to not send the license ticket to the second terminal device or the second user when the usage restriction information for the second terminal device or the second user is not held in the usage restriction information management unit.

13. The license management server device according to claim 11,
wherein the personal information storage unit includes:
a payment information management unit operable to manage payment information that specifies a payment method of each user of the first terminal device or the first user, and of the second terminal device or the second user, for purchasing a license from the license management server device; and
an identification information management unit operable to accept registration of identification information for specifying that one terminal device or one user among terminals or users having payment information identical to the payment information managed in the payment information management unit is the first terminal device or the first user, and
the usage restriction information management unit is operable to register the second terminal device or the second user in response to a request from the first terminal device or the first user having the registered identification information, and hold the usage restriction information for the registered second terminal device or second user.

14. The license management server device according to claim 1,
wherein the first terminal device and the second terminal device are identical terminal devices.

15. The license management server device according to claim 14, further comprising:
a terminal device management unit operable to accept a registration request of the terminal device used by the first user from the first user, and register the terminal device; and
a second user registration unit operable to accept a registration request of the second user for the terminal device from the first user registered for the terminal device, and register the second user in the terminal device management unit for the identical terminal device for the first user,
wherein the ticket issuance unit is operable to acquire the instruction to request the content usage by the second user from the terminal device, generate the license ticket that is information for permitting the content usage by the second user on the terminal device, under the usage rule with the restriction indicated by the usage restriction information which is held in the usage restriction information management unit, and send the license ticket to the second user.

16. The license management server device according to claim 15,
wherein the usage restriction information management unit is operable to acquire from the first user the usage restriction information specifying a usage expiration date of the terminal device by the second user, and hold the usage restriction information, and
the license management server device is operable to not accept the instruction by the second user from the terminal device when the usage expiration date specified by the usage restriction information has passed.

17. The license management server device according to claim 16,
wherein the usage restriction information management unit is operable to delete the registration of the second user for the terminal device from the terminal device management unit when the usage expiration date specified by the usage restriction information has passed, and
the license management server device is operable to not accept the instruction from the terminal device by the second user who is not registered in the terminal device management unit.

18. The license management server device according to claim 17, further comprising:
an authentication information management unit operable to accept registration request of authentication information for identifying and authenticating the first user or the second user from the first user or the second user himself;
a terminal registration decision unit operable to acquire the authentication information of the first user or the second user from the terminal device, and decide whether or not the first user or the second user identified with the authentication information is registered for the terminal device; and
a usage restriction unit operable not to accept the instruction from the terminal device when the first user or the second user is not registered as a result of the decision by the terminal registration decision unit.

19. The license management server device according to claim 15,
wherein the usage restriction information management unit is operable to acquire from the first user an instruction to limit a range of a request that the second user can give the license management server device using the terminal device and usage restriction information indicating the limited range, and hold the instruction and the usage restriction information, and
the license management server device is operable to not accept the instruction made by the second user beyond the range indicated by the usage restriction information from the terminal device.

20. The license management server device according to claim 1, further comprising:
a history storage unit operable to store a usage history of a content on the second terminal device or by the second user; and
a usage amount decision unit operable to decide whether or not a past usage amount of the content on the second terminal device or by the second user exceeds a predetermined reference amount,
wherein the ticket issuance unit is operable to acquire, from the second terminal device or the second user whose usage amount is decided to exceed the reference amount by the usage amount decision unit, an instruction to request the content usage that exceeds the range of the usage rule indicated by the license information, and send a license ticket that exceeds the usage rule indicated by the license information by a predetermined amount within the range of restriction indicated by the usage restriction information, to the second terminal device or the second user.

21. A license management system comprising a license management server device for managing content usage on a terminal device and a plurality of terminal devices that request content usage to the license management server device,
wherein the license management server device includes:
a license information storage unit operable to store license information indicating a usage rule of a content for each terminal device or a user;
a usage restriction information management unit operable to acquire an instruction to put a restriction on content usage on a second terminal device or by a second user and usage restriction information indicating details of the restriction, from a first terminal device or a first user, and hold the usage restriction information; and
a ticket issuance unit operable to acquire an instruction to request the content usage from the second terminal device or the second user, generate a license ticket that is information for permitting the content usage on the second terminal device or by the second user, under a usage rule with the restriction indicated by the usage restriction information which is held in the usage restriction information management unit, and send the license ticket to the second terminal device or the second user,
the first terminal device includes a usage restriction information sending unit operable to send the usage restriction information that is the instruction of the first user to put a restriction on the content usage on the second terminal device or by the second user to the license management server device, and the second terminal device includes:
an issuance request unit operable to request the license management server device to issue the license ticket based on a request from the second user;
an acquisition unit operable to acquire the license ticket for permitting the requested content usage under the usage rule with the restriction, from the license management server device; and
a usage unit operable to use the content according to the acquired license ticket.

22. The license management system according to claim 21,
wherein in the license management server device, the ticket issuance unit is operable to generate a license ticket including the information indicating the usage rule and the information indicating the restriction, and
in the second terminal device, the usage unit is operable to find a logical product of the usage rule described in an item indicating the usage rule and the usage rule with the restriction described in a corresponding predetermined item in the acquired license ticket, and use the content according to a usage rule that is the logical product.

23. The license management system according to claim 21,
wherein in the license management server device, the ticket issuance unit is operable to acquire from the second terminal device or the second user an instruction to request the content usage on the second terminal device or by the second user, and send a first license ticket that is information for permitting the content usage under the usage rule indicated by the license information and a second license ticket indicating the usage rule with the restriction indicated by the usage restriction information, to the second terminal device or the second user,
in the second terminal device, the acquisition unit is operable to acquire the first license ticket and the second license ticket from the license management server device, and
the usage unit is operable to find a logical product of the usage rule of the first license ticket and the corresponding usage rule of the second license ticket with the restriction, and use the content according to a usage rule that is the logical product.

24. The license management system according to claim 21,
wherein in the license management server device, the usage restriction information is operable to indicate details of the restriction which is to be put on the content usage on the second terminal device, and
the ticket issuance unit is operable to acquire the instruction to request the content usage from the second terminal device, generate the license ticket for permitting the content usage for any content on the second terminal, under the usage rule with the restriction indicated by the usage restriction information, and send the license ticket to the second terminal.

25. The license management system according to claim 21,
wherein in the license management server device, the usage restriction information is operable to indicate details of the restriction which is to be put on the content usage by the second user, and
the ticket issuance unit is operable to acquire the instruction to request the content usage from the second user, generate the license ticket for permitting the content usage for any content by the second user, under the usage rule with the restriction indicated by the usage restriction information, and send the license ticket to the second user.

26. The license management system according to claim 21,
wherein in the license management server device, the usage restriction information is operable to indicate details of the restriction which is to be put on the content usage on the second terminal device depending upon a content to be used, and
the ticket issuance unit is operable to acquire the instruction to request the content usage from the second terminal device, generate the license ticket for permitting the usage of the requested content on the second terminal device, under the usage rule with the restriction indicated by the usage restriction information, and send the license ticket to the second terminal device.

27. The license management system according to claim 21,
wherein in the license management server device, the usage restriction information is operable to indicate details of the restriction which is to be put on the content usage by the second user depending upon a content to be used, and
the ticket issuance unit is operable to acquire the instruction to request the content usage from the second user, generate the license ticket for permitting the usage of the requested content by the second user, under the usage rule with the restriction indicated by the usage restriction information, and send the license ticket to the second user.

28. The license management system according to claim 21,
wherein the license management server device further includes a stop unit operable to acquire an instruction to stop the usage on the second terminal device or by the second user from the first terminal device or the first user, and send a usage stop signal for stopping the usage on the second terminal device or by the second user immediately to the second terminal device or the second user, and
the second terminal device further includes a usage stop unit operable to receive the usage stop signal from the license management server device and stop an operation of the usage unit.

29. The license management system according to claim 21,
wherein the license management server device further includes:
a payment information management unit operable to manage payment information that specifies a payment method of each user of the first terminal device or the first user, and the second terminal device or the second user, for purchasing a license from the license management server device; and
an identification information management unit operable to accept registration of identification information for specifying that one terminal device or one user among terminals or users having the identical payment information registered is the first terminal device or the first user, and
the usage restriction information management unit is operable to register the second terminal device or the second user in response to a request from the first terminal device or the first user having the registered identification information, and hold the usage restriction information for the registered second terminal device or second user.

30. The license management system according to claim 21,
wherein the first terminal device and the second terminal device are identical terminal devices.

31. The license management system according to claim 30,
wherein the license management server device further includes:
a terminal device management unit operable to accept registration request of the terminal device used by the first user from the first user, and register the terminal device; and
a second user registration unit operable to accept registration request of the second user for the terminal device from the first user registered for the identical terminal device, and register the second user in the terminal device management unit for the identical terminal device for the first user, and
the usage restriction information management unit is operable to acquire from the terminal device or the first user an instruction to put a restriction on content usage by the second user using the terminal device and usage restriction information indicating details of the restriction, and hold the usage restriction information,
the ticket issuance unit is operable to acquire the instruction to request the content usage by the second user from the terminal device, generate a license ticket that is information for permitting the content usage by the second user on the terminal device, under a usage rule with the restriction indicated by the usage restriction information which is held in the usage restriction information management unit, and send the license ticket to the second user,
the terminal device further includes a registration request unit operable to request the license management server device to register the second user for the terminal device by the first user registered for the terminal device,
the usage restriction information sending unit is operable to send the usage restriction information that is the instruction from the first user to put a restriction on the content usage by the second user using the terminal device, to the license management server device,
the issuance request unit is operable to request the license management server device to issue the license ticket based on a request from the second user,
the acquisition unit is operable to acquire the license ticket for permitting the requested content usage under the usage rule with the restriction, from the license management server device, and
the usage unit is operable to use the content according to the acquired license ticket.

32. The license management system according to claim 31,
wherein in the license management server device, the usage restriction information management unit is operable to acquire from the first user the usage restriction information specifying a usage expiration date of the terminal device by the second user, and delete the registration of the second user for the terminal device when the usage expiration date specified by the usage restriction information has passed, and the license management server device is operable to not accept the instruction by the second user who is not registered in the terminal device management unit from the terminal device.

33. The license management system according to claim 32,
wherein the license management server device further includes:
an authentication information management unit operable to accept registration of authentication information for identifying and authenticating the first user or the second user from the first user or the second user himself;
a terminal registration decision unit operable to acquire the authentication information of the first user or the second user from the terminal device, and decide whether or not the first user or the second user identified with the authentication information is registered for the terminal device; and
a usage restriction unit operable to not accept the instruction from the terminal device when the first user or the second user is not registered as a result of the decision by the terminal registration decision unit.

34. A usage restriction control method for a license management server device that manages content usage on a terminal device,
wherein the license management server device includes a license information storage unit operable to store license information indicating a usage rule of a content for each terminal device or user, and
the usage restriction control method includes:
a usage restriction setting operation for acquiring from a first terminal device or a first user an instruction to put a restriction on content usage on a second terminal or by a second user, and usage restriction information indicating details of the restriction, and holding the usage restriction information in the usage restriction information management unit; and
a ticket issuing operation for acquiring an instruction to request the content usage from the second terminal device or the second user, generating a license ticket that is information for permitting the content usage on the second terminal device or by the second user, under a usage rule with the restriction indicated by the usage restriction information which is held in the usage restriction information management unit, and sending the license ticket to the second terminal device or the second user.

35. The usage restriction control method according to claim 34,
wherein the license management server device further includes a terminal device management unit operable to accept registration of the terminal device used by the first user from the first user and hold the terminal device,
the usage restriction control method further includes a second user registering operation for accepting registration of the second user for the terminal device from the first user registered for the identical terminal device, and registering the second user in the terminal device management unit for the identical terminal device for the first user, and
in the ticket issuance operation, an instruction to request the content usage by the second user is acquired from the terminal device, the license ticket that is information for permitting the content usage on the terminal device is generated under the usage rule with the restriction indicated by the usage restriction information which is held in the usage restriction information management unit, and the license ticket is sent to the second user.

36. A program embodied on a computer readable storage medium for controlling a usage restriction in a license management server device that manages content usage in a terminal,
the program causing a computer to execute:
a usage restriction setting operation for acquiring from a first terminal device or a first user an instruction to put a restriction on content usage by a second user, and usage restriction information indicating details of the restriction, and holding the usage restriction information in the usage restriction information management unit;
a ticket issuing operation for acquiring an instruction to request the content usage from the second terminal device or the second user, generating a license ticket that is information for permitting the content usage on the second terminal device or by the second user, under a usage rule with the restriction indicated by the usage restriction information which is held in the usage restriction information management unit, and sending the license ticket to the second terminal device or the second user; and
a second user registering operation for accepting registration of the second user for the terminal device from the first user registered for the identical terminal device, and registering the second user in the terminal device management unit for the identical terminal device for the first user.

37. A usage restriction control method for a terminal device that requests a license management server device for content usage that manages content usage, the usage restriction control method comprising:
a usage restriction requesting operation for sending usage restriction information that is information for restricting content usage on a specified terminal device or by a specified user to the license management server device;
a ticket requesting operation for requesting the license management server device to issue a license ticket that is information for permitting content usage under a predetermined usage rule based on a usage restriction request from the specified terminal device or the specified user;
a ticket acquiring operation for acquiring from the license management server device a license ticket for permitting content usage under a usage rule with a restriction based on the usage restriction information; and
a using operation for using the content based on the acquired license ticket.

38. A program embodied on a computer readable storage medium for controlling a usage restriction on a terminal device that requests content usage from a license management server device that manages content usage,
the program causing a computer to execute:
a usage restriction requesting operation for sending usage restriction information that is information for restricting content usage on a specified terminal device or by a specified user to the license management server device;
a ticket requesting operation for requesting the license management server device to issue a license ticket that is information for permitting content usage under a predetermined usage rule based on a usage restriction request from the specified terminal device or the specified user;

a ticket acquiring operation for acquiring from the license management server device a license ticket for permitting content usage under a usage rule with a restriction based on the usage restriction information; and a using operation for using the content based on the acquired license ticket.

* * * * *